US011206200B1

(12) United States Patent
Chitalia et al.

(10) Patent No.: US 11,206,200 B1
(45) Date of Patent: *Dec. 21, 2021

(54) DASHBOARD FOR GRAPHIC DISPLAY OF COMPUTER NETWORK TOPOLOGY

(71) Applicant: Juniper Networks, Inc., Sunnyvale, CA (US)

(72) Inventors: Harshit Naresh Chitalia, Mountain View, CA (US); Avi K. Patel, San Jose, CA (US); Travis Gregory Newhouse, Encinitas, CA (US); Neeren Shripad Patki, Saratoga, CA (US); Sumeet Singh, Saratoga, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/947,230

(22) Filed: Jul. 23, 2020

Related U.S. Application Data

(63) Continuation of application No. 15/987,584, filed on May 23, 2018, now Pat. No. 10,728,121.

(51) Int. Cl.
*H04L 12/26* (2006.01)
*H04L 12/24* (2006.01)
*G06F 3/0481* (2013.01)

(52) U.S. Cl.
CPC ........ *H04L 43/045* (2013.01); *G06F 3/04817* (2013.01); *H04L 41/22* (2013.01)

(58) Field of Classification Search
CPC .... H04L 43/045; H04L 41/22; G06F 3/04817
See application file for complete search history.

(56) References Cited

U.S. PATENT DOCUMENTS 4,939,507 A 7/1990 Beard et al.
7,900,154 B2 3/2011 Savage
(Continued)

FOREIGN PATENT DOCUMENTS

WO 2013/0184846 A1 12/2013

OTHER PUBLICATIONS

Office Action from U.S. Appl. No. 29/648,732, dated Apr. 4, 2019, 6 pp.
(Continued)

*Primary Examiner* — Benjamin M Thieu
(74) *Attorney, Agent, or Firm* — Shumaker & Sieffert, P.A.

(57) ABSTRACT

A policy controller executes algorithms to operate on a list of devices forming a computer network to generate outputs including one or more graphic user interfaces. The graphic user interfaces, when displayed on a display device, provide various versions of a visual representation of a network topology for the actual computer network or a computer network being modeled. The graphic user interfaces include graphic symbols representative of various devices included in the computer network that are arranged into one or more radial arrangements. The graphic user interfaces include graphic lines indicative of the physical interconnections between the devices, the graphic lines extending across the radial arrangement(s) and extending between the graphic symbols representative of devices to provide a visual representation of the interconnections that communicatively couple the devices. Additional graphic symbols and graphic lines represent interconnections between the devices and one or more compute nodes included in the computer network.

20 Claims, 29 Drawing Sheets

(56) References Cited

U.S. PATENT DOCUMENTS

| | | |
|---|---|---|
| D681,656 S | 5/2013 | Lawrence et al. |
| D697,080 S | 1/2014 | Scholz et al. |
| D708,193 S | 7/2014 | Agnew et al. |
| D710,863 S | 8/2014 | Agnew |
| D711,420 S | 8/2014 | Agnew |
| D716,314 S | 10/2014 | Hartley et al. |
| D719,176 S | 12/2014 | Cohen et al. |
| D719,177 S | 12/2014 | Cohen et al. |
| D735,732 S | 8/2015 | Nezhad et al. |
| D743,423 S | 11/2015 | Danielyan et al. |
| D743,424 S | 11/2015 | Danielyan et al. |
| D743,977 S | 11/2015 | Dela Cruz et al. |
| D781,312 S | 3/2017 | Danielyan et al. |
| 9,641,435 B1 | 5/2017 | Sivaramakrishnan |
| D791,805 S | 7/2017 | Segars |
| D801,370 S | 10/2017 | Chawla et al. |
| D805,535 S | 12/2017 | Danielyan et al. |
| D806,120 S | 12/2017 | Elatta |
| D812,634 S | 3/2018 | Tuthill et al. |
| D814,494 S | 4/2018 | Stiansen |
| D832,283 S | 10/2018 | Tellis et al. |
| D834,039 S | 11/2018 | Einspahr et al. |
| D837,234 S | 1/2019 | Elder et al. |
| D840,412 S | 2/2019 | Donini et al. |
| D872,121 S | 1/2020 | Einspahr et al. |
| D879,121 S | 3/2020 | Luchner et al. |
| 2009/0295753 A1 | 12/2009 | King et al. |
| 2015/0052441 A1 | 2/2015 | Degioanni |
| 2015/0058179 A1 | 2/2015 | Pu et al. |
| 2015/0089424 A1 | 3/2015 | Duffield et al. |
| 2017/0054643 A1 | 2/2017 | Fraser |
| 2018/0089272 A1 | 3/2018 | Bath et al. |
| 2018/0285166 A1 | 10/2018 | Roy et al. |
| 2019/0089742 A1 | 3/2019 | Hill |
| 2019/0167764 A1 | 6/2019 | Itani et al. |
| 2019/0294719 A1 | 9/2019 | Beringer et al. |
| 2019/0294720 A1 | 9/2019 | Beringer et al. |
| 2019/0347282 A1 | 11/2019 | Cai et al. |
| 2019/0347589 A1 | 11/2019 | Sullivan et al. |
| 2019/0386891 A1 | 12/2019 | Chitalia et al. |
| 2020/0043244 A1 | 2/2020 | Bhushan et al. |

OTHER PUBLICATIONS

Response to Office Action dated Apr. 4, 2019, from U.S. Appl. No. 29/648,732, filed Jun. 28, 2019, 8 pp.

Final Office Action from U.S. Appl. No. 29/648,732, dated Jan. 2, 2020, 7 pp.

Response to Final Office Action dated Jan. 2, 2020, from U.S. Appl. No. 29/648,732, filed Apr. 2, 2020, 4 pp.

Notice of Allowance from U.S. Appl. No. 29/648,732, dated Jul. 14, 2020, 15 pp.

Prosecution History from U.S. Appl. No. 15/987,584, dated Apr. 4, 2019 through Mar. 20, 2020, 23 pp.

U.S. Appl. No. 29/648,732, filed Mar. 23, 2018, Juniper Networks, Inc. (inventors: Chitalia et al.), entitled Display Screen or Portions Thereof With Graphical User Interface.

DASHBOARD FOR GRAPHIC DISPLAY OF COMPUTER NETWORK TOPOLOGY

This application is a continuation of U.S. application Ser. No. 15/987,584 which was filed on May 23, 2018. The entire content of application Ser. No. 15/987,584 is incorporated herein by reference.

TECHNICAL FIELD

This disclosure relates to the generation and graphic display of topologies associated with computer networks.

BACKGROUND

Virtualized data centers are becoming a core foundation of the modern information technology (IT) infrastructure. In particular, modern data centers have extensively utilized virtualized environments in which virtual hosts, such virtual machines or containers, are deployed and executed on an underlying compute platform of physical computing devices.

Virtualization with large scale data center can provide several advantages. One advantage is that virtualization can provide significant improvements to efficiency. As the underlying physical computing devices (i.e., servers) have become increasingly powerful with the advent of multicore microprocessor architectures with a large number of cores per physical CPU, virtualization becomes easier and more efficient. A second advantage is that virtualization provides significant control over the infrastructure. As physical computing resources become fungible resources, such as in a cloud-based computing environment, provisioning and management of the compute infrastructure becomes easier. Thus, enterprise IT staff often prefer virtualized compute clusters in data centers for their management advantages in addition to the efficiency and increased return on investment (ROI) that virtualization provides.

SUMMARY

This disclosure describes techniques for monitoring, scheduling, and performance management for computing environments, such as virtualization infrastructures deployed within data centers. The techniques provide visibility into operational performance and infrastructure resources. As described herein, the techniques may leverage analytics in a distributed architecture to provide real-time and historic monitoring, performance visibility and dynamic optimization to improve orchestration, security, accounting and planning within the computing environment. The techniques may provide advantages within, for example, hybrid, private, or public enterprise cloud environments. The techniques accommodate a variety of virtualization mechanisms, such as containers and virtual machines, to support multi-tenant, dynamic, and constantly evolving enterprise clouds.

The disclosure describes one or more algorithms that allows a policy controller to output a dashboard that includes graphic user interfaces illustrative of the arrangement and the interconnections between physical devices coupled together as part of a computer network. The physical devices represent the underlay resources, for example the switch fabric including switches, routers and servers, which provide the communication interconnects between hosts within a computer network and/or between the hosts and other devices and/or computer networks that are external to the computer network. Examples of the graphic user interfaces that may be generated using the techniques described in this disclosure include graphic user interfaces providing an illustration of the network topology of the underlay resources of a particular computer network.

The graphic user interfaces described in this disclosure include graphic symbols arranged in a radial arrangement to provide a visual illustration of at least a portion of the physical devices and the interconnections between these physical devices for an actual or a proposed computer network. The radial arrangement of the graphic symbols may include a plurality of graphic symbols representing the physical devices, such as switching devices, routers, and servers of the computer network arranged in one or more circular arrangements relative to one another. The interconnections between the graphic symbols may be illustrated by a plurality of individual lines extending across the interior area or areas encircled by the one or more circular arrangements and extending between the graphic symbols representative of the physical devices. The illustration of the interconnections between the physical devices and other devices of the computer network may include additional lines extending between one or more of the graphic symbols representing the physical devices and one or more graphic representations of the hosts that may be coupled to or that form a part of the computer network being modeled by the graphic user interface.

The placement and the arrangement of the individual graphic symbols representative of the physical devices within the graphic user interfaces may be determined by a variety of factors which are programmed into one or more algorithms used to generate the graphic user interfaces. The algorithms operate on a list of the physical devices and their respective interconnections in order to generate a graphic user interface depicting the topology of the computer network associated with the physical devices. The radial arrangement of graphic symbols representative of the physical devices, along with graphic representation of the interconnections between the physical devices and the one or more hosts of the computer network provides a compact and efficient technique for the generation and presentation of a visual representation of the network topology of the underlay resources associated with a computer network. The placement of the graphic symbols within the graphic user interface may be determined by multiple factors, such as whether the physical device represented by the graphic symbol is or is not directly coupled to a host device of the computer network, and/or by the number of direct connections that the individual physical device has with other physical device(s) in the computer network being modeled. The placement algorithms employed by the techniques described in this disclosure also allows for the simple addition and removal of a physical device or multiple physical devices from the graphic depiction of the topology of the computer network being modeled.

The graphic user interfaces generated by the techniques described in this disclosure may include an interactive modeling process that allows a user to provide user inputs to the processing circuitry generating the graphic user interface. The user inputs allow the user to manually manipulate the placement of individual graphic symbols representing the physical devices depicted by the graphic user interface. Based on the user directed placement of the graphic symbols, the modeling process automatically provides proper spacing between the graphic symbols within the graphic user interface, and/or automatically provides rerouting of the graphic lines representing the interconnects between the physical devices and/or the physical devices and/or one or more hosts included in the computer network based on the placement of the device(s) provided through the user inputs.

In one example, the disclosure describes a computing system comprising a computer network having one or more compute nodes interconnected by a packet-based communications network provided by a set of network devices, one or more policy agents configured to execute on one or more of the compute nodes and one or more of the network devices to monitor performance and usage metrics relating to resources of the compute nodes and the network devices; and a policy controller configured to deploy policies to the policy agents and receive performance and usage metrics from the policy agents, The controller is configured to filter the network devices into a first group comprising any of the network devices that are physically coupled to at least one of the compute nodes and a second group comprising any of the network devices that are not directly coupled to at least one of the compute nodes, sort the network devices in the second group into a ranked order listing based on a number of physical network connections each network device in the second group has with one or more other network devices in the second group, bucket the network devices in the second group into one or more bins based on the ranked order listing, wherein the number of network devices placed into each of the one or more bins is determined by a predetermined number of radial positions around a respective one of one or more radial arrangements. and output a graphic user interface that includes a graphic representation of the topology of the computer network including a plurality of graphic symbols representing the network devices and the compute nodes. The graphic user interface includes a visual representation of the graphic symbols for the network devices arranged in the one or more radial arrangements, and the one or more radial arrangements of graphic symbols includes one or more inner radial arrangements, each of the inner radial arrangements corresponding to a respective one of the bins into which the network devices are bucketed.

In another example, the disclosure is directed to a method comprising generating, by a policy controller, an output comprising a graphic representation of a topology of a computer network, the computer network comprising one or more compute nodes interconnected by a packet-based communications network provided by a set of network devices. The policy controller is configured to filter the network devices into a first group comprising any of the network devices that are physically coupled to at least one of the compute nodes and a second group comprising any of the network devices that are not directly coupled to at least one of the compute nodes, sort the network devices in the second group into a ranked order listing based on a number of physical network connections each network device in the second group has with one or more other network devices in the second group, bucket the network devices in the second group into one or more bins based on the ranked order listing, wherein the number of network devices placed into each of the one or more bins is determined by a predetermined number of radial positions around a respective one of one or more radial arrangements. and output a graphic user interface that includes the graphic representation of the topology of the computer network including a plurality of graphic symbols representing the network devices and the compute nodes. The graphic user interface includes a visual representation of the graphic symbols for the network devices arranged in the one or more radial arrangements, and the one or more radial arrangements of graphic symbols includes one or more inner radial arrangements, each of the inner radial arrangements corresponding to a respective one of the bins into which the network devices are bucketed.

In another example, the disclosure is directed to a computing system comprising a non-transitory computer-readable storage media, and a policy controller having access to instructions stored on the storage media. The policy controller is configured to execute the instructions to perform a method comprising filtering the network devices into a first group comprising any of the network devices that are physically coupled to at least one of the compute nodes and a second group comprising any of the network devices that are not physically coupled to at least one of the compute nodes, sorting the network devices in the second group into a ranked order listing based on a number of physical network connections each network device in the second group has with one or more other network devices in the second group, bucketing the network devices in the second group into one or more bins based on the ranked order listing, wherein the number of network devices placed into each of the one or more bins is determined by a predetermined number of radial positions around a respective one of one or more radial arrangements, and outputting a graphic user interface that includes the graphic representation of the topology of the computer network including a plurality of graphic symbols representing the network devices and the compute nodes. The graphic user interface includes a visual representation of the graphic symbols for the network devices arranged in the one or more radial arrangements, and the one or more radial arrangements of graphic symbols includes one or more inner radial arrangements, each of the inner radial arrangements corresponding to a respective one of the bins into which the network devices are bucketed.

The details of one or more examples of the disclosure are set forth in the accompanying drawings and the description below. Other features, objects, and advantages of the disclosure will be apparent from the description and drawings, and from the claims.

BRIEF DESCRIPTION OF THE DRAWINGS

Like reference numerals refer to like elements throughout the figures and text.

DETAILED DESCRIPTION

Figure 1:
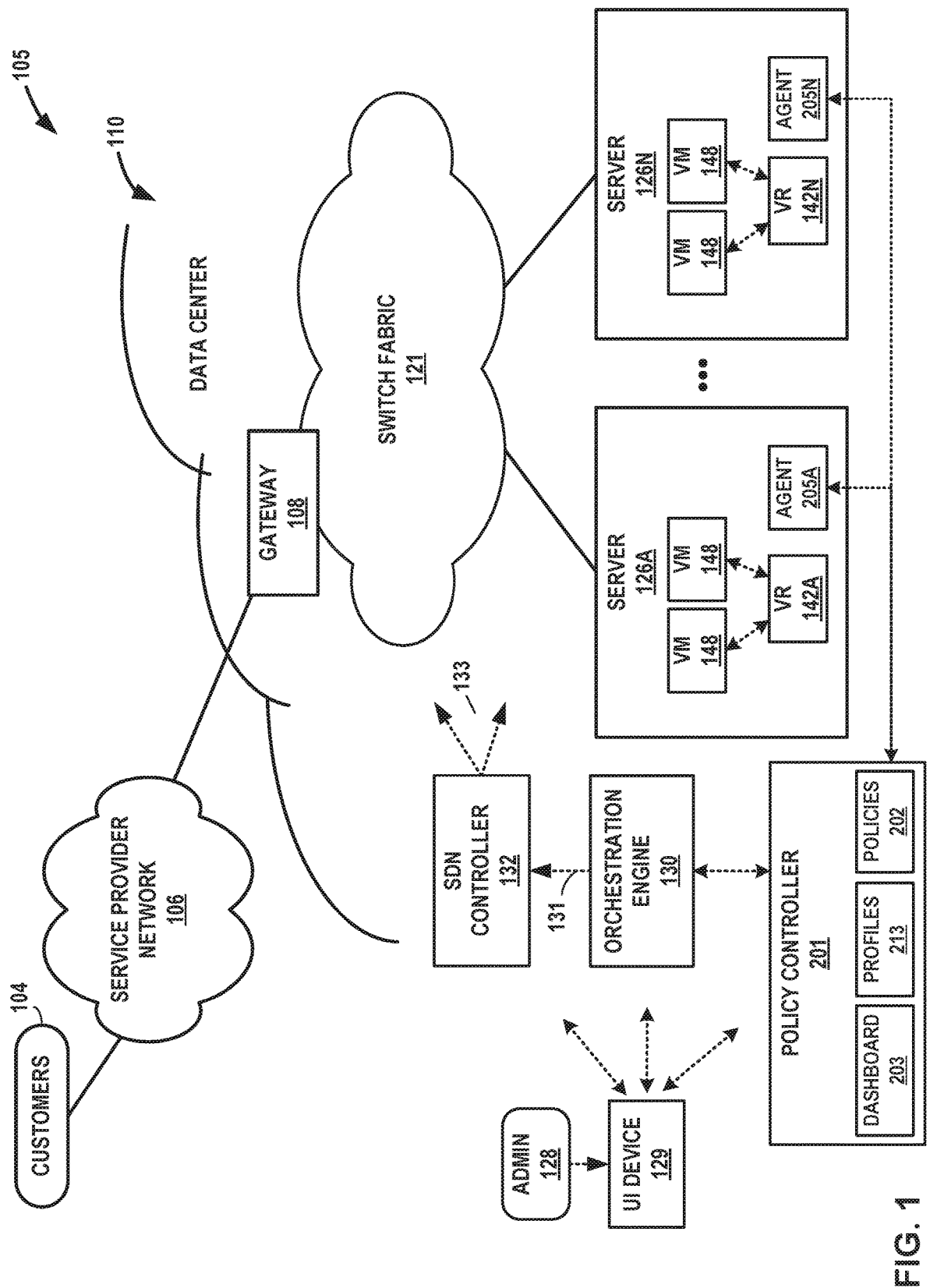
FIG. 1 is a conceptual diagram illustrating an example network that includes an example data center in which internal processor metrics relating to resources shared by multiple processes are monitored, in accordance with one or more aspects of the present disclosure.

FIG. 1 is a conceptual diagram illustrating an example network 105 that includes an example data center 110 in which performance and usage metrics for infrastructure elements for cloud-based computing environments are monitored, and optionally including internal processor metrics relating to resources shared by multiple processes, in accordance with one or more aspects of the present disclosure. FIG. 1 illustrates one example implementation of network 105 and data center 110 that hosts one or more cloud-based computing networks, computing domains or projects, generally referred to herein as cloud computing cluster. The cloud-based computing clusters and may be co-located in a common overall computing environment, such as a single data center, or distributed across environments, such as across different data centers. Cloud-based computing clusters may, for example, be different cloud environments, such as various combinations of OpenStack cloud environments, Kubernetes cloud environments or other computing clusters, domains, networks and the like. Other implementations of network 105 and data center 110 may be appropriate in other instances. Such implementations may include a subset of the components included in the example of FIG. 1 and/or may include additional components not shown in FIG. 1.

In the example of FIG. 1, data center 110 provides an operating environment for applications and services for customers 104 coupled to data center 110 by service provider network 106. Although functions and operations described in connection with network 105 of FIG. 1 may be illustrated as being distributed across multiple devices in FIG. 1, in other examples, the features and techniques attributed to one or more devices in FIG. 1 may be performed internally, by local components of one or more of such devices. Similarly, one or more of such devices may include certain components and perform various techniques that may otherwise be attributed in the description herein to one or more other devices. Further, certain operations, techniques, features, and/or functions may be described in connection with FIG. 1 or otherwise as performed by specific components, devices, and/or modules. In other examples, such operations, techniques, features, and/or functions may be performed by other components, devices, or modules. Accordingly, some operations, techniques, features, and/or functions attributed to one or more components, devices, or modules may be attributed to other components, devices, and/or modules, even if not specifically described herein in such a manner.

Data center 110 hosts infrastructure equipment, such as networking and storage systems, redundant power supplies, and environmental controls. Service provider network 106 may be coupled to one or more networks administered by other providers, and may thus form part of a large-scale public network infrastructure, e.g., the Internet.

In some examples, data center 110 may represent one of many geographically distributed network data centers. As illustrated in the example of FIG. 1, data center 110 is a facility that provides network services for customers 104. Customers 104 may be collective entities such as enterprises and governments or individuals. For example, a network data center may host web services for several enterprises and end users. Other exemplary services may include data storage, virtual private networks, traffic engineering, file service, data mining, scientific- or super-computing, and so on. In some examples, data center 110 is an individual network server, a network peer, or otherwise.

In the example of FIG. 1, data center 110 includes a set of storage systems and application servers, including server 126A through server 126N (collectively "servers 126") interconnected via high-speed switch fabric 121 provided by one or more tiers of physical network switches and routers. Servers 126 function as physical compute nodes of the data center. For example, each of servers 126 may provide an operating environment for execution of one or more customer-specific virtual machines 148 ("VMs" in FIG. 1) or other virtualized instances, such as containers. Each of servers 126 may be alternatively referred to as a host computing device or, more simply, as a host. A server 126 may execute one or more virtualized instances, such as virtual machines, containers, or other virtual execution environment for running one or more services, such as virtualized network functions (VNFs).

Switch fabric 121 may include top-of-rack (TOR) switches 123A-123N coupled to a distribution layer of chassis switches 122A-122N, and data center 110 may include one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Data center 10 includes servers 126A-126N interconnected via high-speed switch fabric 121 provided by one or more tiers of physical network switches and routers. Switch fabric 121 is provided by a set of interconnected top-of-rack (TOR) switches 122A-122N (collectively, "TOR switches 123") coupled to a distribution layer of chassis switches 122A-122N (collectively, "chassis switches 122"). Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

In this example, TOR switches 123 and chassis switches 122 provide servers 126 with redundant (multi-homed) connectivity to gateway 108 and service provider network 106. Chassis switches 122 aggregate traffic flows and provides high-speed connectivity between TOR switches 123. TOR switches 123 may be network devices that provide layer 2 (MAC) and/or layer 3 (e.g., IP) routing and/or switching functionality. TOR switches 123 and chassis switches 122 may each include one or more processors and a memory, and that are capable of executing one or more software processes. Chassis switches 122 are coupled to gateway 108, which performs layer 3 routing to route network traffic between data center 10 and customers 104 by service provider network 106.

Switch fabric 121 may perform layer 3 routing to route network traffic between data center 110 and customers 104 by service provider network 106. Gateway 108 acts to forward and receive packets between switch fabric 121 and service provider network 106. Data center 10 includes an overlay network that extends switch fabric 121 from physical switches 122, 123 to software or "virtual" switches. For example, virtual routers 142A-142N located in servers 126A-126N, respectively, may extend the switch fabric 121 by communicatively coupling with one or more of the physical switches located within the switch fabric 121. Virtual switches may dynamically create and manage one or more virtual networks usable for communication between application instances. In one example, virtual routers 142A-142N execute the virtual network as an overlay network, which provides the capability to decouple an application's virtual address from a physical address (e.g., IP address) of the one of servers 126A-126N on which the application is executing. Each virtual network may use its own addressing and security scheme and may be viewed as orthogonal from the physical network and its addressing scheme. Various techniques may be used to transport packets within and across virtual network(s) over the physical network.

Software-Defined Networking ("SDN") controller 132 provides a logically and in some cases physically centralized controller for facilitating operation of one or more virtual networks within data center 110 in accordance with one or more examples of this disclosure. The terms SDN controller and Virtual Network Controller ("VNC") may be used interchangeably throughout this disclosure. In some examples, SDN controller 132 operates in response to configuration input received from orchestration engine 130 via northbound API 131, which in turn operates in response to configuration input received from an administrator 128 operating user interface device 129. Additional information regarding SDN controller 132 operating in conjunction with other devices of data center 110 or other software-defined network is found in International Application Number PCT/US 2013/044378, filed Jun. 5, 2013, and entitled PHYSICAL PATH DETERMINATION FOR VIRTUAL NETWORK PACKET FLOWS, which is incorporated by reference as if fully set forth herein.

User interface device 129 may be implemented as any suitable computing system, such as a mobile or non-mobile computing device operated by a user and/or by administrator 128. User interface device 129 may, for example, represent a workstation, a laptop or notebook computer, a desktop computer, a tablet computer, or any other computing device that may be operated by a user and/or present a user interface in accordance with one or more aspects of the present disclosure.

In some examples, orchestration engine 130 manages functions of data center 110 such as compute, storage, networking, and application resources. For example, orchestration engine 130 may create a virtual network for a tenant within data center 110 or across data centers. Orchestration engine 130 may attach virtual machines (VMs) to a tenant's virtual network. Orchestration engine 130 may connect a tenant's virtual network to an external network, e.g. the Internet or a VPN. Orchestration engine 130 may implement a security policy across a group of VMs or to the boundary of a tenant's network. Orchestration engine 130 may deploy a network service (e.g. a load balancer) in a tenant's virtual network.

In some examples, SDN controller 132 manages the network and networking services such load balancing, security, and allocate resources from servers 126 to various applications via southbound API 133. That is, southbound API 133 represents a set of communication protocols utilized by SDN controller 132 to make the actual state of the network equal to the desired state as specified by orchestration engine 130. For example, SDN controller 132 implements high-level requests from orchestration engine 130 by configuring physical switches, e.g. TOR switches 123, chassis switches 122, and switch fabric 121; physical routers; physical service nodes such as firewalls and load balancers; and virtual services such as virtual firewalls in a VM. SDN controller 132 maintains routing, networking, and configuration information within a state database.

Typically, the traffic between any two network devices, such as between network devices (not shown) within switch fabric 121 or between servers 126 and customers 104 or between servers 126, for example, can traverse the physical network using many different paths. For example, there may be several different paths of equal cost between two network devices. In some cases, packets belonging to network traffic from one network device to the other may be distributed among the various possible paths using a routing strategy called multi-path routing at each network switch node. For example, the Internet Engineering Task Force (IETF) RFC 2992, "Analysis of an Equal-Cost Multi-Path Algorithm," describes a routing technique for routing packets along multiple paths of equal cost. The techniques of RFC 2992 analyze one particular multipath routing strategy involving the assignment of flows to bins by hashing packet header fields that sends all packets from a particular network flow over a single deterministic path.

For example, a "flow" can be defined by the five values used in a header of a packet, or "five-tuple," i.e., the protocol, Source IP address, Destination IP address, Source port, and Destination port that are used to route packets through the physical network. For example, the protocol specifies the communications protocol, such as TCP or UDP, and Source port and Destination port refer to source and destination ports of the connection. A set of one or more packet data units (PDUs) that match a particular flow entry represent a flow. Flows may be broadly classified using any parameter of a PDU, such as source and destination data link (e.g., MAC) and network (e.g., IP) addresses, a Virtual Local Area Network (VLAN) tag, transport layer information, a Multiprotocol Label Switching (MPLS) or Generalized MPLS (GMPLS) label, and an ingress port of a network device receiving the flow. For example, a flow may be all PDUs transmitted in a Transmission Control Protocol (TCP) connection, all PDUs sourced by a particular MAC address or IP address, all PDUs having the same VLAN tag, or all PDUs received at the same switch port.

Virtual routers 142 (virtual router 142A to virtual router 142N, collectively "virtual routers 142" in FIG. 1) execute multiple routing instances for corresponding virtual networks within data center 110 and routes the packets to appropriate virtual machines executing within the operating environment provided by servers 126. Each of servers 126 may include a virtual router. Packets received by virtual router 142A of server 126A, for instance, from the underlying physical network fabric may include an outer header to allow the physical network fabric to tunnel the payload or "inner packet" to a physical network address for a network interface of server 126A. The outer header may include not only the physical network address of the network interface of the server but also a virtual network identifier such as a VxLAN tag or Multiprotocol Label Switching (MPLS) label that identifies one of the virtual networks as well as the corresponding routing instance executed by the virtual router. An inner packet includes an inner header having a destination network address that conform to the virtual network addressing space for the virtual network identified by the virtual network identifier.

In some aspects, the virtual router buffers and aggregates multiple tunneled packets received from the underlying physical network fabric prior to delivery to the appropriate routing instance for the packets. That is, a virtual router executing on one of servers 126 may receive inbound tunnel packets of a packet flow from one or more TOR switches 123 within switch fabric 121 and, prior to routing the tunnel packets to a locally executing virtual machine, process the tunnel packets to construct a single, aggregate tunnel packet for forwarding to the virtual machine. That is, the virtual router may buffer multiple inbound tunnel packets and construct the single, tunnel packet in which the payloads of the multiple tunnel packets are combined into a single payload and the outer/overlay headers on the tunnel packets are removed and replaced with a single header virtual network identifier. In this way, the aggregate tunnel packet can be forwarded by the virtual router to the virtual machine as if a single inbound tunnel packet was received from the virtual network. Moreover, to perform the aggregation operation, the virtual router may leverage a kernel-based offload engine that seamlessly and automatically directs the aggregation of tunnel packets. Further example techniques by which the virtual routers forward traffic to the customer-specific virtual machines executing on servers 126 are described in U.S. patent application Ser. No. 14/228,844, entitled "PACKET SEGMENTATION OFFLOAD FOR VIRTUAL NETWORKS," incorporated herein by reference.

In some example implementations, virtual routers 142 executing on servers 126 steer received inbound tunnel packets among multiple processor cores to facilitate packet processing load balancing among the cores when processing the packets for routing to one or more virtual and/or physical machines. As one example, server 126A includes multiple network interface cards and multiple processor cores to execute virtual router 142A and steers received packets among multiple processor cores to facilitate packet processing load balancing among the cores. For instance, a particular network interface card of server 126A may be associated with a designated processor core to which the network interface card directs all received packets. The various processor cores, rather than processing each of the received packets, offloads flows to one or more other processor cores, in accordance with a hash function applied to at least one of the inner and outer packet headers, for processing to take advantage of available work cycles of the other processor cores.

In the example of FIG. 1, data center 110 further includes a policy controller 201 that provides monitoring, scheduling, and performance management for data center 110. Policy controller 201 interacts with monitoring agents 205 that are deployed within at least some of the respective physical servers 216 for monitoring resource usage of the physical compute nodes as well as any virtualized host, such as VM 148, executing on the physical host. In this way, monitoring agents 205 provide distributed mechanisms for collecting a wide variety of usage metrics as well as for local enforcement of policies installed by policy controller 201. In example implementations, monitoring agents 205 run on the lowest level "compute nodes" of the infrastructure of data center 110 that provide computational resources to execute application workload. A compute node may, for example, be a bare-metal host of server 126, a virtual machine 148, a container or the like.

In addition, each agent within one of servers 126A-126N may be communicatively coupled to other agents located in the same server or in a different server. The agents may be configured to issues a communication "ping," also referred to as a communicative probe or simply a probe, to one or more different agents. The communicative link between the agents is illustratively shown as line 206 in FIG. 1. The agent issuing the probe may direct the probe to another agent, for example an agent in a different server. The probe may be configured to be routed through the same devices within the switch fabric 121 that would be used for regular communications between the servers, for example the TOR switches 123 and chassis switches 122 of the switch fabric. The agent issuing the probe or probes may monitor and collect results related to responses, or lack thereof, received in reply to the issued probes. The collected results may then be forward to policy controller 201 for further processing, including for example for use in generating graphic user interfaces depicting various metrics and/or determined statuses related to the current state of communicative links that may exist between various agents within data center 110.

Policy controller 201 obtains the usage metrics and metrics related to communicative links between agents from monitoring agents 205 and constructs a dashboard 203 (e.g., a set of user interfaces) to provide visibility into operational performance and infrastructure resources of data center 110. Policy controller 201 may, for example, communicate dashboard 203 to UI device 129 for display to administrator 128. In addition, policy controller 201 may apply analytics and machine learning to the collected metrics to provide real-time and historic monitoring, performance visibility and dynamic optimization to improve orchestration, security, accounting and planning within data center 110.

As shown in the example of FIG. 1, Policy controller 201 may define and maintain a rule base as a set of policies 202. Policy controller 201 may administer control of each of servers 126 based on the set of policies 202 policy controller 201. Policies 202 may be created or derived in response to input by administrator 128 or in response to operations performed by policy controller 201. Policy controller 201 may, for example, observe operation of data center 110 over time and apply machine learning techniques to generate one or more policies 202. Policy controller 201 may periodically, occasionally, or continually refine policies 202 as further observations about data center 110 are made.

Policy controller 201 (e.g., an analytics engine within policy controller 201) may determine how policies are deployed, implemented, and/or triggered at one or more of servers 126. For instance, policy controller 201 may be configured to push one or more policies 202 to one or more of the policy agents 205 executing on servers 126. Policy controller 201 may receive information about internal processor metrics from one or more of policy agents 205, and determine if conditions of a rule for the one or more metrics are met. Policy controller 201 may analyze the internal processor metrics received from policy agents 205, and based on the analysis, instruct or cause one or more policy agents 205 to perform one or more actions to modify the operation of the server associated with a policy agent. For example, policy controller 201 may push one or more policies including configurations for protocols to be uses, intervals, metrics to be monitored for in conjunction with the agents issuing the communicative probes between agents. Information collected from the agents related to the issuance and monitoring of these communication probes may be used to generate a graphic user interface that visually depicts one or more status related to the metrics associated with and/or derived from the collected information. In another example, policy controller may be configured to gather information about the devices and arrangement of devices including in the switch fabric 121, and generate a set of user interfaces the visually depict these devices and the interconnections between these devices based on a set of predefined and/or user selectable rules.

In some examples, policy controller 201 may be configured to determine and/or identify elements in the form of the virtual machines, containers, services, and/or applications executing on each of servers 126. As used herein, a resource generally refers to a consumable component of the virtualization infrastructure, i.e., a component that is used by the infrastructure, such as CPUs, memory, disk, disk I/O, network I/O, virtual CPUs, and Contrail vrouters. A resource may have one or more characteristics each associated with a metric that is analyzed by the policy agent 205 (and/or policy controller 201) and optionally reported. Lists of example raw metrics for resources are described below with respect to FIG. 2.

In general, an infrastructure element, also referred to herein as an element, is a component of the infrastructure that includes or consumes consumable resources in order to operate. Example elements includes hosts, physical or virtual network devices, instances (e.g., virtual machines, containers, or other virtual operating environment instances), and services. In some cases, an entity may be a resource for another entity. Virtual network devices may include, e.g., virtual routers and switches, vRouters, vSwitches, Open Virtual Switches, and Virtual Tunnel Forwarders (VTFs). A metric is a value that measures the amount of a resource, for a characteristic of the resource, that is consumed by an element.

Policy controller 201 may also analyze internal processor metrics received from policy agents 205, and classify one or more virtual machines 148 based on the extent to which each virtual machine uses shared resources of servers 126 (e.g., classifications could be CPU-bound, cache-bound, memory-bound). Policy controller 201 may interact with orchestration engine 130 to cause orchestration engine 130 to adjust, based on the classifications of virtual machines 148 executing on servers 126, the deployment of one or more virtual machines 148 on servers 126.

Policy controller 201 may be further configured to report information about whether the conditions of a rule are met to a client interface associated with user interface device 129. Alternatively, or in addition, policy controller 201 may be further configured to report information about whether the conditions of a rule are met to one or more policy agents 205 and/or orchestration engine 130.

Policy controller 201 may be implemented as or within any suitable computing device, or across multiple computing devices. Policy controller 201, or components of policy controller 201, may be implemented as one or more modules of a computing device. In some examples, policy controller 201 may include a number of modules executing on a class of compute nodes (e.g., "infrastructure nodes") included within data center 110. Such nodes may be OpenStack infrastructure service nodes or Kubernetes master nodes, and/or may be implemented as virtual machines. In some examples, policy controller 201 may have network connectivity to some or all other compute nodes within data center 110, and may also have network connectivity to other infrastructure services that manage data center 110.

One or more policies 202 may include instructions to cause one or more policy agents 205 to monitor one or more metrics associated with servers 126. One or more policies 202 may include instructions to cause one or more policy agents 205 to analyze one or more metrics associated with servers 126 to determine whether the conditions of a rule are met. One or more policies 202 may alternatively, or in addition, include instructions to cause policy agents 205 to report one or more metrics to policy controller 201, including whether those metrics satisfy the conditions of a rule associated with one or more policies 202. The reported information may include raw data, summary data, and sampling data as specified or required by one or more policies 202.

Dashboard 203 may represent a collection of user interfaces presenting information about metrics, alarms, notifications, reports, connectivity and latency related to communicative connections between network devices, network topologies, and other information about data center 110. Dashboard 203 may include one or more user interfaces that are presented by user interface device 129. User interface device 129 may detect interactions with dashboard 203 as user input (e.g., from administrator 128). Dashboard 203 may, in response to user input, cause configurations to be made to aspects of data center 110 or projects executing on one or more virtual machines 148 of data center 110 relating to network resources, data transfer limitations or costs, storage limitations or costs, and/or accounting reports.

Dashboard 203 may include a graphical view that provides a quick, visual overview of resource utilization by instance using histograms. The bins of such histograms may represent the number of instances that used a given percentage of a resource, such CPU utilization. By presenting data using histograms, dashboard 203 presents information in a way that allows administrator 128, if dashboard 203 is presented at user interface device 129, to quickly identify patterns that indicate under-provisioned or over-provisioned instances. In some examples, dashboard 203 may highlight resource utilization by instances on a particular project or host, or total resource utilization across all hosts or projects, so that administrator 128 may understand the resource utilization in context of the entire infrastructure.

Dashboard 203 may include information relating to costs for use of compute, network, and/or storage resources, as well as costs incurred by a project. Dashboard 203 may also present information about the health and risk for one or more virtual machines 148 or other resources within data center 110. In some examples, "health" may correspond to an indicator that reflects a current state of one or more virtual machines 148. For example, an example virtual machine that exhibits a health problem may be currently operating outside of user-specified performance policy. "Risk" may correspond to an indicator that reflects a predicted future state of one or more virtual machines 148, such that an example virtual machine that exhibits a risk problem may be may be unhealthy in the future. Health and risk indicators may be determined based on monitored metrics and/or alarms corresponding to those metrics. For example, if policy agent 205 is not receiving heartbeats from a host, then policy agent 205 may characterize that host and all of its instances as unhealthy. Policy controller 201 may update dashboard 203 to reflect the health of the relevant hosts, and may indicate that reason for the unhealthy state is one or more "missed heartbeats.".

One or more policy agents 205 may execute on one or more of servers 126 to monitor some or all of the performance metrics associated with servers 126 and/or virtual machines 148 executing on servers 126. Policy agents 205 may analyze monitored information and/or metrics and generate operational information and/or intelligence associated with an operational state of servers 126 and/or one or more virtual machines 148 executing on such servers 126. Policy agents 205 may interact with a kernel operating one or more servers 126 to determine, extract, or receive internal processor metrics associated with use of shared resources by one or more processes and/or virtual machines 148 executing at servers 126. Policy agents 205 may perform monitoring and analysis locally at each of servers 126. In some examples, policy agents 205 may perform monitoring and/or analysis in a near and/or seemingly real-time manner.

In the example of FIG. 1, and in accordance with one or more aspects of the present disclosure, policy agents 205 may monitor servers 126. For example, policy agent 205A of server 126A may interact with components, modules, or other elements of server 126A and/or one or more virtual machines 148 executing on servers 126. Policy agent 205A may, as a result of such interactions, collect information about one or more metrics associated with servers 126 and/or virtual machines 148. Such metrics may be raw metrics, which may be based directly or read directly from servers 126, virtual machines 148, and/or other components of data center 110. In other examples, one or more of such metrics may be calculated metrics, which include those derived from raw metrics. In some examples, metrics may correspond to a percentage of total capacity relating to a particular resource, such as a percentage of CPU utilization, or CPU consumption, or Level 3 cache usage. However, metrics may correspond to other types of measures, such as how frequent one or more virtual machines 148 are reading and writing to memory.

Policy controller 201 may configure policy agents 205 to monitor for conditions that trigger an alarm. For example, policy controller 201 may detect input from user interface device 129 that policy controller 201 determines corresponds to user input. Policy controller 201 may further determine that the user input corresponds to information sufficient to configure a user-specified alarm that is based on values for one or more metrics. Policy controller 201 may process the input and generate one or more policies 202 that implements the alarm settings. In some examples, such policies 202 may be configured so that the alarm is triggered when values of one or more metrics collected by policy agents 205 at servers 126 exceed a certain threshold. Policy controller 201 may communicate information about the generated policies 202 to one or more policy agents 205 executing on servers 126. Policy agents 205 may monitor servers 126 for conditions on which the alarm is based, as specified by the policies 202 received from policy controller 201.

For instance, policy agent 205A may monitor one or more metrics at server 126A. Such metrics may involve server 126A, all virtual machines 148 executing on server 126A, and/or specific instances of virtual machines 148. Policy agent 205A may determine, based on the monitored metrics, that one or more values exceed a threshold set by or more policies 202 received from policy controller 201. For instance, policy agent 205A may determine whether CPU usage exceeds a threshold set by a policy (e.g., server 126A CPU usage >50%). In other examples policy agent 205A may evaluate whether one or more metrics is less than a threshold value (e.g., if server 126A available disk space <20%, then raise an alert), or is equal to a threshold value (e.g., if the number of instances of virtual machines 148 equals 20, then raise an alert). If policy agent 205A determines that the monitored metric triggers the threshold value, policy agent 205A may raise an alarm condition and communicate information about the alarm to policy controller 201. Policy controller 201 and/or policy agent 205A may act on the alarm, such as by generating a notification. Policy controller 201 may update dashboard 203 to include the notification. Policy controller 201 may cause updated dashboard 203 to be presented at user interface device 129, thereby notifying administrator 128 of the alarm condition.

In some examples, policy controller 201 may generate policies and establish alarm conditions without user input. For example, policy controller 201 may apply analytics and machine learning to metrics collected by policy agents 205. Policy controller 201 may analyze the metrics collected by policy agents 205 over various time periods. Policy controller 201 may determine, based on such analysis, information sufficient to configure an alarm for one or more metrics. Policy controller 201 may process the information and generate one or more policies 202 that implements the alarm settings. Policy controller 201 may communicate information about the policy to one or more policy agents 205 executing on servers 126. Each of policy agents 205 may thereafter monitor conditions and respond to conditions that trigger an alarm pursuant to the corresponding policies 202 generated without user input.

In accordance with techniques described herein, policy controller 201 generates profiles 213 for elements of data center 110. A profile is associated with an element or group of elements and is a collection of alarms to be evaluated against corresponding metrics for the alarms to determine whether the associated element or group of elements is "active" or "inactive."

For example, policy controller 201, in response to input received via UI device 129, may generate profiles 213 for respective hosts, instances (e.g., VMs 148), network devices, groups thereof, and resources thereof (e.g., CPU, memory, disk, network interface, etc.). Moreover, a user or administrator configures elements of data center 110 to be members of one or more groups of elements such that the elements and groups and have a "member-of" relationship. As examples, an OpenStack host (e.g., any of servers 126) can be a member of one or more "host aggregates" that are each groups of one or more hosts. A Kubernetes container can be a member of (1) a pod, (2) a replication controller, (3) a namespace, and (4) several different services. A virtual machine 148A can be configured as a member of one or more "instance aggregates" that are each groups of one or more instances. A network device can be configured as a member of one or more "network device aggregates" that are each groups of one or more network devices. In each of the above examples, a user or agent may define profiles 213 for each element and group of elements.

Figure 2:
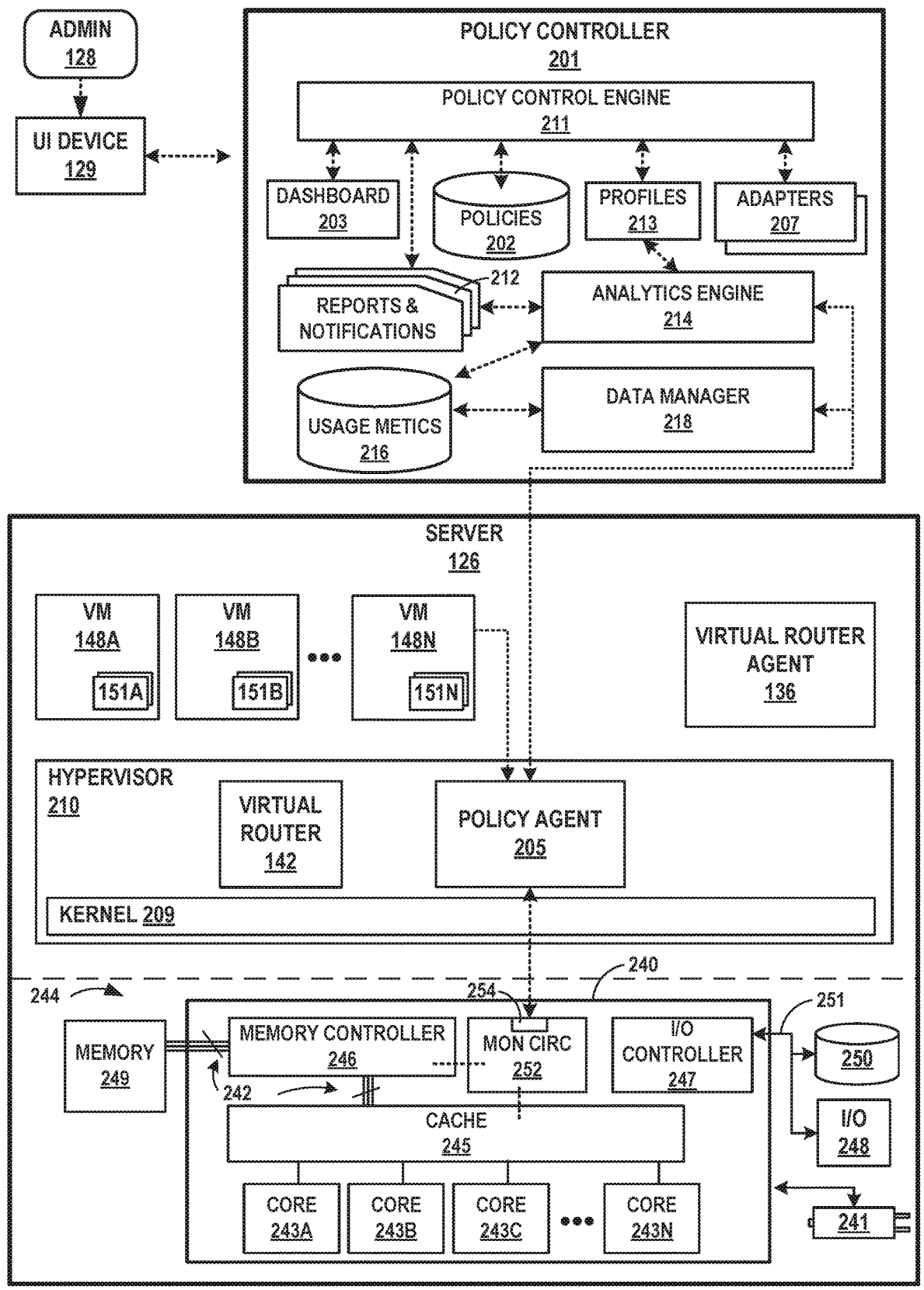
FIG. 2 is a block diagram illustrating a portion of the example data center of FIG. 1 in further detail, and in which internal processor metrics relating to resources shared by multiple processes executing on an example server are monitored, in accordance with one or more aspects of the present disclosure.

In general, and as further described herein in connection with FIG. 2, the techniques make use of certain internal processor metrics relating to resources that are shared inside of a physical processor, such as metrics relating to a an internal cache of the processor that is shared by software executing one or more cores within the processor or memory bus bandwidth that is consumed by the cores within the physical processor. Such metrics relating to resources shared inside a physical microprocessor may provide insights as to how virtual machines 148 (or processes within virtual machines 148) executing on each of servers 126 are contending for or otherwise using shared resources internal to the processors. Such information may be used to pinpoint bottlenecks, instances of resource contention, and performance issues that might not otherwise be apparent from other metrics, such as CPU utilization or CPU load metrics.

In some examples, the manner in which one or more virtual machines 148 operate and/or use such shared resources (such as a shared cache or memory bus) on a given server may adversely affect the operation of other virtual machines 148 on that same server. However, by monitoring only CPU usage, for example, it may be difficult to identify which particular virtual machine is causing performance problems for other virtual machines 148. Yet by monitoring metrics of resources internal to the processor of each of servers 126, it may be possible not only to identify which virtual machine may be causing performance problems for other virtual machines 148 on a given processor, but to also take steps to improve the policy control of all virtual machines 148 executing the processors of one or more servers 126. If appropriate policy control is applied across data center 110, it may be possible to improve the operation, efficiency, and consistent performance of data center 110 in the aggregate, and more effectively comply with service level agreements and performance guarantees.

By monitoring internal processor metrics to identify resources shared within the processor of a server as consumed by elements including software processes executing on hardware cores internal to the processor, policy controller 201 of data center 110 may identify virtual machines 148, containers, and/or processes that are consuming shared resources in manner that may adversely affect the performance of other virtual machines 148, containers, and/or processes executing on that server. By identifying processes that may be adversely affecting the operation of other processes, policy controller 201 of data center 110 may take steps to address how such processes operate or use shared resources, and as a result, improve the aggregate performance of virtual machines, containers, and/or processes executing on any given server, and/or improve the operation of all servers 126 collectively. Accordingly, as a result of identifying processes adversely affecting the operation of other processes and taking appropriate responsive actions, virtual machines 148 may perform computing operations on servers 126 more efficiently, and more efficiently use shared resources of servers 126. By performing computing operations more efficiently and more efficiently using shared resources of servers 126, data center 110 may perform computing tasks more quickly and with less latency. Therefore, aspects of this disclosure may improve the function of servers 126 and data center 110, because identifying and addressing any virtual machines 148 that are adversely affecting the operation of other virtual machines 148 may have the effect of enabling servers 126 and data center 110 to perform computing tasks more quickly and with less latency.

Further, assessment of metrics or conditions that may trigger an alarm may be implemented locally at each of servers 126 (e.g., by policy agents 205). By performing such assessments locally, performance metrics associated with the assessment can be accessed at a higher frequency, which can permit or otherwise facilitate performing the assessment faster. Implementing the assessment locally may, in some cases, avoid the transmission of information indicative of performance metrics associated with assessment to another computing device (e.g., policy controller 201) for analysis. As such, latency related to the transmission of such information can be mitigated or avoided entirely, which can result in substantial performance improvement in scenarios in which the number of performance metrics included in the assessment increases. In another example, the amount of information that is sent from the computing device can be significantly reduced when information indicative or otherwise representative of alarms and/or occurrence of an event is to be sent, as opposed to raw data obtained during the assessment of operational conditions. In yet another example, the time it takes to generate the alarm can be reduced in view of efficiency gains related to latency mitigation.

Various components, functional units, and/or modules illustrated in FIG. 1 (e.g., user interface device 129, orchestration engine 130, SDN controller 132, and policy controller 201, policy agent 205) and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform.

In other examples, functionality provided by a module could be implemented by a dedicated hardware device. Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated. Further, each module, data store, component, program, executable, data item, functional unit, or other item illustrated within a storage device may be implemented in various ways. For example, each module, data store, component, program, executable, data item, functional unit, or other item illustrated within a storage device may be implemented as part of an operating system executed on a computing device.

Alarms included in a profile 213, when triggered or 'active,' determine whether the profile 213 is active. In addition, alarms for groups of elements of which an element is a member may also determine whether the profile 213 for the element is active. Because an element may be a member of multiple groups that overlap at least with respect to the element, policy controller 201 that generates and in some cases distributes profiles 213 to policy agents 205 may allow users and administrators of virtualization infrastructure of data center 110 to express, with a profile 213, a combination of alarms to be applied to an element or group by configuring membership of the element or group in a another group, without having to manually configure an overall profile 213 for the element or the group. Further, the techniques may dynamically account for changes in a group membership by evaluating the profile 213 for the group using the new set of elements that are members of a group without having to reconfigure the profile 213 for the group.

Policy controller 201 may distribute profiles 213 to policy agents 205 executing on computing devices, e.g., server 126 or network devices of data center 110. A policy agent 205 evaluates each of the received profiles 213 based on the one or more alarms included therein and on metrics received by the policy agent 205 indicating a performance of the element and, at least in some cases where the element is a member of a group, one or more other elements that are also members of the group.

Further example techniques by of policy controller 201 are described in U.S. patent application Ser. No. 15/797,098, entitled "MICRO-LEVEL MONITORING, VISIBILITY AND CONTROL OF SHARED RESOURCES INTERNAL TO A PROCESSOR OF A HOST MACHINE FOR A VIRTUAL ENVIRONMENT," incorporated herein by reference.

FIG. 2 is a block diagram illustrating a portion of the example data center 110 of FIG. 1 in further detail, and in which internal processor metrics relating to resources shared by multiple processes executing on an example server 126 are monitored, in accordance with one or more aspects of the present disclosure. Illustrated in FIG. 2 are user interface device 129 (operated by administrator 128), policy controller 201, and server 126.

Policy controller 201 may represent a collection of tools, systems, devices, and modules that perform operations in accordance with one or more aspects of the present disclosure. Policy controller 201 may perform cloud service optimization services, which may include advanced monitoring, scheduling, and performance management for software-defined infrastructure, where containers and virtual machines (VMs) can have life cycles much shorter than in traditional development environments. Policy controller 201 may leverage big-data analytics and machine learning in a distributed architecture (e.g., data center 110). Policy controller 201 may provide near real-time and historic monitoring, performance visibility and dynamic optimization. Policy controller 201 of FIG. 2 may be implemented in a manner consistent with the description of policy controller 201 provided in connection with FIG. 1.

In FIG. 2, policy controller 201 includes policies 202 and dashboard 203, as illustrated in FIG. 1. Policies 202 and dashboard 203 may also be implemented in a manner consistent with the description of policies 202 and dashboard 203 provided in connection with FIG. 1. In some examples, as illustrated in FIG. 2, policies 202 may be implemented as a data store. In such an example, policies 202 may represent any suitable data structure or storage medium for storing policies 202 and/or information relating to policies 202. Policies 202 may be primarily maintained by policy control engine 211, and policies 202 may, in some examples, be implemented through a NoSQL database.

In this example, policy controller 201 of FIG. 2 further includes policy control engine 211, adapter 207, reports and notifications 212, analytics engine 214, usage metrics data store 216, and data manager 218.

Policy control engine 211 may be configured to control interaction between one or more components of policy controller 201, in accordance with one or more aspects of the present disclosure. For example, policy control engine 211 may create and/or update dashboard 203, administer policies 202, and control adapters 207. Policy control engine 211 may also cause analytics engine 214 to generate reports and notifications 212 based on data from usage metrics data store 216, and may deliver one or more reports and notifications 212 to user interface device 129 and/or other systems or components of data center 110.

In one example, policy control engine 211 invokes one or more adapters 207 to discover platform-specific resources and interact with platform-specific resources and/or other cloud computing platforms. For instance, one or more adapters 207 may include an OpenStack adapter configured to communicate with an OpenStack cloud operating system operating on servers 126. One or more adapters 207 may include a Kubernetes adapter configured to communicate with a Kubernetes platform on servers 126. Adapters 207 may further include an Amazon Web Services adapter, Microsoft Azure adapter, and/or a Google Compute Engine adapter. Such adapters may enable policy controller 201 to learn and map the infrastructure utilized by servers 126. Policy controller 201 may use multiple adapters 207 at the same time.

Reports and notifications 212 may be created, maintained, and/or updated via one or more components of policy controller 201. In some examples, reports and notifications 212 may include information presented within dashboard 203, and may include information illustrating how infrastructure resources are consumed by instances over time. Notifications may be based on alarms, as further described below, and notifications may be presented through dashboard 203 or through other means.

One or more reports may be generated for a specified time period, organized by different scopes: project, host or department. In some examples, such a report may show the resource utilization by each instance that is in a project or scheduled on a host. Dashboard 203 may include information presenting a report in both graphical or tabular formats. Dashboard 203 may further enable report data to be downloaded as an HTML-formatted report, a raw comma-separated value (CSV) file, or an JSON-formatted data for further analysis.

Reports and notifications 212 may include a variety of reports, including a project report, a host report, and/or a department report, each of which may be included within dashboard 203. A project report may be generated for a single project or for all projects (provided administrator 128 is authorized to access the project or all projects). A project report may show resource allocations, actual usage, and charges. Resource allocations may include static allocations of resources, such as vCPUs, floating IP addresses, and storage volumes. Actual resource usage may be displayed within dashboard 203 for each instance in the project, and as the aggregate sum of usage by all instances in the project. Resource usage may show the actual physical resources consumed by an instance, such as CPU usage percentage, memory usage percentage, network I/O, and disk I/O. The cost charged for resource usage may be shown for each instance in the project. In addition, a cost breakdown by flavor type, and by resource type (Compute, Network, Storage) may be shown for the project as a whole.

As one example, policy control engine 211 may direct analytics engine 214 to generate a host report for all hosts or the set of hosts in a host aggregate, such as a cloud computing environment. In some examples, only users with an administrator role may generate a host report. A host report may show the aggregate resource usage of a host, and a breakdown of resource usage by each instance scheduled on a host. A host report may also show the cost charged for each instance on a host, as well as the total cost and total cost per flavor type. This provides an indication of the revenue generated by a host.

As another example, a department report shows total cost charged to a department. In some examples, administrator 128 may divide project costs among multiple departments, and a project may host applications and services that are used by multiple Departments. In such an example, each department may be wholly or partially responsible for the costs associated with one or more projects. Dashboard 203 may provide support for dividing project costs among multiple departments through a department report presented in dashboard 203.

In some examples, policy controller 201 may configure an alarm, and may generate an alarm notification when a condition is met by one or more servers 126 and/or one or virtual machines 148 (or containers) executing on one or more servers 126. Policy agent 205 may monitor metrics at servers 126 and virtual machines 148, and analyze the raw data corresponding to the metrics for conditions of alarms that apply to those servers 126 and/or virtual machines 148, and/or instances running on each such servers 126 and/or servers 126. In some examples, alarms may apply to a specified "scope" that identifies the type of element to monitor for a condition. Such element may be a "host," "instance," or "service," for example. An alarm may apply to one or more of such element. For instance, an alarm may apply to all hosts within data center 110, or to all hosts within a specified host aggregate (i.e. clusters of servers 126 or virtual machines 148, groups or pools of hypervisor hosts).

Policy agent 205 may continuously collect measurements of metrics for a host, e.g., a particular VM 148 of server 126, and its instances. For a particular alarm, policy agent 205 may aggregate samples according to a user-specified function (average, standard deviation, min, max, sum) and produce a single measurement for each user-specified interval. Policy agent 205 may compare each same and/or measurement to a threshold. In some examples, a threshold evaluated by an alarm or a policy that includes conditions for an alarm may be either a static threshold or a dynamic threshold. For a static threshold, policy agent 205 may compare metrics or raw data corresponding to metrics to a fixed value. For instance, policy agent 205 may compare metrics to a fixed value using a user-specified comparison function (above, below, equal). For a dynamic threshold, policy agent 205 may compare metrics or raw data correspond to metrics to a historical trend value or historical baseline for a set of resources. For instance, policy agent 205 may compare metrics or other measurements with a value learned by policy agent 205 over time.

In some example implementations, policy controller 201 is configured to apply dynamic thresholds, which enable outlier detection in resource consumption based on historical trends. For example, resource consumption may vary significantly at various hours of the day and days of the week. This may make it difficult to set a static threshold for a metric. For example, 70% CPU usage may be considered normal for Monday mornings between 10:00 AM and 12:00 PM, but the same amount of CPU usage may be considered abnormally high for Saturday nights between 9:00 PM and 10:00 PM. With dynamic thresholds, policy agent 205 may learn trends in metrics across all resources in scope to which an alarm applies. For example, if an alarm is configured for a host aggregate, policy agent 205 may learn a baseline from metric values collected for hosts in that aggregate. Similarly, policy agent 205 may, for an alarm with a dynamic threshold configured for a project, learn a baseline from metric values collected for instances in that project. Then, policy agent 205 may generate an alarm when a measurement deviates from the baseline value learned for a particular time period. Alarms having a dynamic threshold may be configured by metric, period of time over which to establish a baseline, and sensitivity. Policy agent 205 may apply the sensitivity setting to measurements that deviate from a baseline, and may be configured as "high," "medium," or "low" sensitivity. An alarm configured with "high" sensitivity may result in policy agent 205 reporting to policy controller 201 smaller deviations from a baseline value than an alarm configured with "low" sensitivity.

In some example implementations, an alarm may be characterized by its mode, such as an "alert mode," or an "event mode." When an alarm is configured as an alert, policy agent 205 may send a notification to policy controller 201 or otherwise notify policy controller 201 and/or other components of data center 110 whenever the state of the alert changes. In some examples, such an alert may initially be in a "learning" state until policy agent 205 has collected enough data to evaluate the conditions of the alert. An alert may be "active" when conditions of the alarm are met, and "inactive" when the conditions are not met.

When an alarm is configured as an event, policy agent 205 may send a notification to policy controller 201 or otherwise notify policy controller 201 (and/or other components of data center 110) for each interval in which the conditions of the alarm are met. As an example, consider an alarm for average CPU usage above 90% over an interval of 60 seconds. If the alarm mode is 'alert', then policy agent 205 may send a notification to policy controller 201 when the alarm becomes 'active' at time T1. When the CPU drops below 90% at time T5, policy agent 205 may send a notification that the alert is 'inactive'. If the same alarm is configured in 'event' mode, then policy agent 205 may send a notification to policy controller 201 for each of the five intervals in which the CPU load exceeds 90%.

In some examples, each alarm may be included within policies 202 maintained by policy controller 201 and apply to certain resources within data center 110. An alarm may, in response to input from a user or in response to other settings, apply to a particular scope: "host," "instance," and "service." Further, for a particular scope type, an alarm may apply to a subset of the resources of that scope type. When the scope of an alarm is configured as "host," for example, an alarm may apply to all hosts or hosts that belong to a specified host aggregate. When the scope of an alarm is configured as "instance," the alarm may be configured for and apply to one or more specific projects. Policy controller 201 may automatically configure an alarm for any new resource that matches the scope. For example, policy controller 201 may configure an alarm with "instance" scope for a given project (e.g., performed by one or more virtual machines 148) in response to user input. Thereafter, when one or more servers 126 creates an instance in that project, policy controller 201 may configure the alarm for the new instance.

Accordingly, in some examples, basic configuration settings for an alarm may include a name that identifies the alarm, a scope (type of resource to which an alarm applies: "host" or "instance"), an aggregate (a set of resources to which the alarm applies), a mode ("alert" or "event"), a metric (e.g., the metric that will be monitored by policy agents 205), an aggregation function (e.g., how policy agents 205 may combine samples during each measurement interval—examples include average, maximum, minimum, sum, and standard deviation functions), a comparison function (e.g., how to compare a measurement to the threshold, such as whether a measurement is above, below, or equal to a threshold), a threshold (the value to which a metric measurement is compared), a unit type (determined by the metric type), and an interval (duration of the measurement interval in seconds or other unit of time).

An alarm may define a policy that applies to a set of elements that are monitored, such as virtual machines in a project. A notification is generated when the condition of an alarm is observed for a given element. A user may configure an alarm to post notifications to an external HTTP endpoint. Policy controller 201 and/or policy agent 205 may POST a JSON payload to the endpoint for each notification. The schema of the payload may be represented by the following, where "string" and 0 are generic placeholders to indicate type of value; string and number, respectively:

{
  "apiVersion": "v1",
  "kind": "Alarm",
  "spec": {
    "name": "string",
    "eventRuleId": "string",
    "severity": "string",
    "metricType": "string",
    "mode": "string",
    "module": "string",
    "aggregationFunction": "string",
    "comparisonFunction": "string",
    "threshold": 0,
    "intervalDuration": 0,
    "intervalCount": 0,
    "intervalsWithException": 0,
  }
  "status": {
    "timestamp": 0,
    "state": "string",
    "elementType": "string",
    "elementId": "string",
    "elementDetails": { }
  }
}

In some examples, the "spec" object describes the alarm configuration for which this notification is generated. In some examples, the "status" object describes the temporal event information for this particular notification, such as the time when the condition was observed and the element on which the condition was observed.

The schema represented above may have the following values for each field:
severity: "critical", "error", "warning", "information", "none"
metricType: refer to Metrics.
mode: "alert", "event"
module: the Analytics modules that generated the alarm. One of "alarms", "health/risk", "service_alarms".
state: state of the alarm. For "alert" mode alarms, valid values are "active", "inactive", "learning".
For "event" mode alarms, the state is always "triggered".
threshold: units of threshold correspond to metricType.
elementType: type of the entity. One of "instance", "host", "service".
elementId: UUID of the entity.
elementDetails: supplemental details about an entity. The contents of this object depend on the elementType. For a "host" or "service", the object is empty. For an "instance", the object will contain hostId and projectId.
{
  "elementDetails": {
    "hostId": "uuid",
    "projectId": "uuid"
  }
}

Analytics engine 214 may perform analysis, machine learning, and other functions on or relating to data stored within usage metrics data store 216. Analytics engine 214 may further generate reports, notifications, and alarms based on such information. For instance, analytics engine 214 may analyze information stored in usage metrics data store 216 and identify, based on information about internal processor metrics, one or more virtual machines 148 that are operating in a manner that may adversely affect the operation of other virtual machines 148 executing on server 126. Analytics engine 214 may, in response to identifying one or more virtual machines 148 operating in a manner that may adversely affect the operation of other virtual machines 148, generate one or more reports and notifications 212. Analytics engine 214 may alternatively, or in addition, raise an alarm and/or cause or instruct policy agent 205 to take actions to address the operation of the identified virtual machines 148. Analytics engine 214 may also analyze the metrics for one or more virtual machines 148, and based on this analysis, characterize one or more of virtual machines 148 in terms of the shared resources each of virtual machines 148 tends to consume. For instance, analytics engine 214 may characterize one or more virtual machines 148 as CPU bound, memory bound, or cache bound.

Usage metrics data store 216 may represent any suitable data structure or storage medium for storing information related to metrics collected by policy agents 205. For instance, usage metrics data store 216 may be implemented using a NoSQL database. The information stored in usage metrics data store 216 may be searchable and/or categorized such that analytics engine 214, data manager 218, or another component or module of policy controller 201 may provide an input requesting information from usage metrics data store 216, and in response to the input, receive information stored within usage metrics data store 216. Usage metrics data store 216 may be primarily maintained by data manager 218.

In some examples, a "metric" is a measured value for a resource in the infrastructure. Policy agent 205 may collect and calculate metrics for resources utilized by hosts and instances. Policy agent 205 may collect and calculate metrics related to communicative probes issued between various agents located within the servers of the data center. Metrics may be organized into hierarchical categories based on the type of metric. Some metrics are percentages of total capacity. In such cases, the category of the metric determines the total capacity by which the percentage is computed. For instance, host.cpu.usage indicates the percentage of CPU consumed relative to the total CPU available on a host. In contrast, instance.cpu.usage is the percentage of CPU consumed relative to the total CPU available to an instance. As an example, consider an instance that is using 50% of one core on a host with 20 cores. The instance's host.cpu.usage will be 2.5%. If the instance has been allocated 2 cores, then its instance.cpu.usage will be 25%.

An alarm may be configured for any metric. Many metrics may also be displayed in user interfaces within dashboard 203, in, for example, a chart-based form. When an alarm triggers for a metric, the alarm may be plotted on a chart at the time of the event. In this way, metrics that might not be plotted directly as a chart may still visually correlated in time with other metrics. In the following examples, a host may use one or more resources, e.g., CPU ("cpu") and network ("network"), that each have one or more associated metrics, e.g., memory bandwidth ("mem_bw") and usage ("usage"). Similarly, an instance may use one or more resources, e.g., virtual CPU ("cpu") and network ("network"), that each have one or more associated metrics, e.g., memory bandwidth ("mem_bw") and usage ("usage"). An instance may itself be a resource of a host or an instance aggregate, a host may itself be a resource of a host aggregate, and so forth.

In some examples, raw metrics available for hosts may include: host.cpu.io_wait, host.cpu.ipc, host.cpu.l3_cache.miss, host.cpu.l3_cache.usage, host.cpu.mem_bw.local, host.cpu.mem_bw.remote, host.cpu.mem_bw.total, host.cpu.usage, host.disk.io.read, host.disk.io.write, host.disk.response_time, host.disk.read_response_time, host.disk.write_response_time, host.disk.smart.hdd.command_timeout, host.disk.smart.hdd.current_pending_sector_count, host.disk.smart.hdd.offline_uncorrectable, host.disk.smart.hdd.reallocated_sector_count, host.disk.smart.hdd.reported_uncorrectable_errors, host.disk.smart.ssd.available_reserved_space, host.disk.smart.ssd.media_wearout_indicator, host.disk.smart.ssd.reallocated_sector_count, host.disk.smart.ssd.wear_leveling_count, host.disk.usage.bytes, host.disk.usage.percent, host.memory.usage, host.memory.swap.usage, host.memory.dirty.rate, host.memory.page_fault.rate, host.memory.page_in_out.rate, host.network.egress.bit_rate, host.network.egress.drops, host.network.egress.errors, host.network.egress.packet_rate, host.network.ingress.bit_rate, host.network.ingress.drops, host.network.ingress.errors, host.network.ingress.packet_rate, host.network.ipv4Tables.rule_count, host.network.ipv6Tables.rule_count, openstack.host.disk_allocated, openstack.host.memory_allocated, and openstack.host.vcpus_allocated.

In some examples, calculated metrics available for hosts include: host.cpu.normalized_load_1M, host.cpu.normalized_load_5M, host.cpu.normalized_load_15M, host.cpu.temperature, host.disk.smart.predict_failure, and host.heartbeat.

For example, host.cpu.normalized_load is a normalized load value that may be calculated as a ratio of the number of running and ready-to-run threads to the number of CPU cores. This family of metrics may indicate the level of demand for CPU. If the value exceeds 1, then more threads are ready to run than exists CPU cores to perform the execution. Normalized load may be a provided as an average over 1-minute, 5-minute, and 15-minute intervals.

The metric host.cpu.temperature is a CPU temperature value that may be derived from multiple temperature sensors in the processor(s) and chassis. This temperature provides a general indicator of temperature in degrees Celsius inside a physical host.

The metric host.disk.smart.predict_failure is a value that one or more policy agents 205 may calculate using multiple S.M.A.R.T. counters provided by disk hardware. Policy agent 205 may set predict_failure to true (value=1) when it determines from a combination of S.M.A.R.T. counters that a disk is likely to fail. An alarm triggered for this metric may contain the disk identifier in the metadata.

The metric host.heartbeat is a value that may indicate if policy agent 205 is functioning on a host. Policy controller 201 may periodically check the status of each host by making a status request to each of policy agents 205. The host.heartbeat metric is incremented for each successful response. Alarms may be configured to detect missed heartbeats over a given interval.

In some examples, the following raw metrics may be available for instances: instance.cpu.usage, instance.cpu.ipc, instance.cpu.l3_cache.miss, instance.cpu.l3_cache.usage, instance.cpu.mem_bw.local, instance.cpu.mem_bw.remote, instance.cpu.mem_bw.total, instance.disk.io.read, instance.disk.io.write, instance.disk.usage, instance.disk.usage.gb, instance.memory.usage, instance.network.egress.bit_rate, instance.network.egress.drops, instance.network.egress.errors, instance.network.egress.packet_rate, instance.network.egress.total_bytes, instance.network.egress.total_packets, instance.network.ingress.bit_rate, instance.network.ingress.drops, instance.network.ingress.errors, instance.network.ingress.packet_rate, and instance.network.ingress.total_bytes, and instance.network.ingress.total_packets.

In some examples, the following calculated metrics may be available for instances: instance.heartbeat.

In some examples, the following raw metrics may be available for virtual router 142: host.contrail.vrouter.aged_flows, host.contrail.vrouter.total_flows, host.contrail.vrouter.exception_packets, host.contrail.vrouter.drop_stats_flow_queue_limit_exceeded, host.contrail.vrouter.drop_stats_flow_table_full, host.contrail.vrouter.drop_stats_vlan_fwd_enq, host.contrail.vrouter.drop_stats_vlan_fwd_tx, host.contrail.vrouter.flow_export_drops, host.contrail.vrouter.flow_export_sampling_drops, host.contrail.vrouter.flow_rate_active_flows, host.contrail.vrouter.flow_rate_added_flows, and host.contrail.vrouter.flow_rate_deleted_flows.

In some examples, the following raw metrics may be available within in a OpenStack Project Chart View included within dashboard 203: openstack.project.active_instances, openstack.project.vcpus_allocated, openstack.project.volume_storage_allocated, openstack.project.memory_allocated, openstack.project.floating_ip_count, openstack.project.security_group_count, and openstack.project.volume_count.

In some examples, the following raw metrics may be available in a Kubernetes Pod Chart View included within dashboard 203: pod.memory_allocated, pod.vcpus_allocated.

Data manager 218 provides a messaging mechanism for communicating with policy agents 205 deployed in servers 126. Data manager 218 may, for example, issue messages to configured and program policy agent, and may manage metrics and other data received from policy agents 205, and store some or all of such data within usage metrics data store 216. Data manager 218 may receive, for example, raw metrics from one or more policy agents 205. Data manager 218 may, alternatively or in addition, receive results of analysis performed by policy agent 205 on raw metrics. Data manager 218 may, alternatively or in addition, receive information relating to patterns of usage of one or more input/output devices 248 that may be used to classify one or more input/output devices 248. Data manager 218 may store some or all of such information within usage metrics data store 216.

In the example of FIG. 2, server 126 represents a physical computing node that provides an execution environment for virtual hosts, such as VMs 148. That is, server 126 includes an underlying physical compute hardware 244 including one or more physical microprocessors 240, memory 249 such as DRAM, power source 241, one or more input/output devices 248, and one or more storage devices 250. As shown in FIG. 2, physical compute hardware 244 provides an environment of execution for hypervisor 210, which is a software and/or firmware layer that provides a light weight kernel 209 and operates to provide a virtualized operating environments for virtual machines 148, containers, and/or other types of virtual hosts. Server 126 may represent one of servers 126 (e.g., server 126A through server 126N) illustrated in FIG. 1

In the example shown, processor 240 is an integrated circuit having one or more internal processor cores 243 for executing instructions, one or more internal caches or cache devices 245, memory controller 246, and input/output controller 247. Although in the example of FIG. 2 server 126 is illustrated with only one processor 240, in other examples, server 126 may include multiple processors 240, each of which may include multiple processor cores.

One or more of the devices, modules, storage areas, or other components of server 126 may be interconnected to enable inter-component communications (physically, communicatively, and/or operatively). For instance, cores 243 may read and write data to/from memory 249 via memory controller 246, which provides a shared interface to memory bus 242. Input/output controller 247 may communicate with one or more input/output devices 248, and/or one or more storage devices 250 over input/output bus 251. In some examples, certain aspects of such connectivity may be provided through communication channels that include a system bus, a network connection, an inter-process communication data structure, or any other method for communicating data or control signals.

Within processor 240, each of processor cores 243A-243N (collectively "processor cores 243") provides an independent execution unit to perform instructions that conform to an instruction set architecture for the processor core. Server 126 may include any number of physical processors and any number of internal processor cores 243. Typically, each of processor cores 243 are combined as multi-core processors (or "many-core" processors) using a single IC (i.e., a chip multiprocessor).

In some instances, a physical address space for a computer-readable storage medium may be shared among one or more processor cores 243 (i.e., a shared memory). For example, processor cores 243 may be connected via memory bus 242 to one or more DRAM packages, modules, and/or chips (also not shown) that present a physical address space accessible by processor cores 243. While this physical address space may offer the lowest memory access time to processor cores 243 of any of portions of memory 249, at least some of the remaining portions of memory 249 may be directly accessible to processor cores 243.

Memory controller 246 may include hardware and/or firmware for enabling processor cores 243 to communicate with memory 249 over memory bus 242. In the example shown, memory controller 246 is an integrated memory controller, and may be physically implemented (e.g., as hardware) on processor 240. In other examples, however, memory controller 246 may be implemented separately or in a different manner, and might not be integrated into processor 240.

Input/output controller 247 may include hardware, software, and/or firmware for enabling processor cores 243 to communicate with and/or interact with one or more components connected to input/output bus 251. In the example shown, input/output controller 247 is an integrated input/output controller, and may be physically implemented (e.g., as hardware) on processor 240. In other examples, however, memory controller 246 may also be implemented separately and/or in a different manner, and might not be integrated into processor 240.

Cache 245 represents a memory resource internal to processor 240 that is shared among processor cores 243. In some examples, cache 245 may include a Level 1, Level 2, or Level 3 cache, or a combination thereof, and may offer the lowest-latency memory access of any of the storage media accessible by processor cores 243. In most examples described herein, however, cache 245 represents a Level 3 cache, which, unlike a Level 1 cache and/or Level 2 cache, is often shared among multiple processor cores in a modern multi-core processor chip. However, in accordance with one or more aspects of the present disclosure, at least some of the techniques described herein may, in some examples, apply to other shared resources, including other shared memory spaces beyond the Level 3 cache.

Power source 241 provides power to one or more components of server 126. Power source 241 typically receives power from the primary alternative current (AC) power supply in a data center, building, or other location. Power source 241 may be shared among numerous servers 126 and/or other network devices or infrastructure systems within data center 110. Power source 241 may have intelligent power management or consumption capabilities, and such features may be controlled, accessed, or adjusted by one or more modules of server 126 and/or by one or more processor cores 243 to intelligently consume, allocate, supply, or otherwise manage power.

One or more storage devices 250 may represent computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, flash memory, CD-ROM, digital versatile discs (DVD) or other optical storage, magnetic cassettes, magnetic tape, magnetic disk storage or other magnetic storage devices, or any other medium that can be used to store the desired information and that can be accessed by processor cores 243.

One or more input/output devices 248 may represent any input or output devices of server 126. In such examples, input/output devices 248 may generate, receive, and/or process input from any type of device capable of detecting input from a human or machine. For example, one or more input/output devices 248 may generate, receive, and/or process input in the form of physical, audio, image, and/or visual input (e.g., keyboard, microphone, camera). One or more input/output devices 248 may generate, present, and/or process output through any type of device capable of producing output. For example, one or more input/output devices 248 may generate, present, and/or process output in the form of tactile, audio, visual, and/or video output (e.g., haptic response, sound, flash of light, and/or images). Some devices may serve as input devices, some devices may serve as output devices, and some devices may serve as both input and output devices.

Memory 249 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Memory 249 provides a physical address space composed of addressable memory locations. Memory 249 may in some examples present a non-uniform memory access (NUMA) architecture to processor cores 243. That is, processor cores 243 might not have equal memory access time to the various storage media that constitute memory 249. Processor cores 243 may be configured in some instances to use the portions of memory 249 that offer the lower memory latency for the cores to reduce overall memory latency.

Kernel 209 may be an operating system kernel that executes in kernel space and may include, for example, a Linux, Berkeley Software Distribution (BSD), or another Unix-variant kernel, or a Windows server operating system kernel, available from Microsoft Corp. In general, processor cores 243, storage devices (e.g., cache 245, memory 249, and/or storage device 250), and kernel 209 may store instructions and/or data and may provide an operating environment for execution of such instructions and/or modules of server 126. Such modules may be implemented as software, but may in some examples include any combination of hardware, firmware, and software. The combination of processor cores 243, storage devices within server 126 (e.g., cache 245, memory 249, and/or storage device 250), and kernel 209 may retrieve, store, and/or execute the instructions and/or data of one or more applications, modules, or software. Processor cores 243 and/or such storage devices may also be operably coupled to one or more other software and/or hardware components, including, but not limited to, one or more of the components of server 126 and/or one or more devices or systems illustrated as being connected to server 126.

Hypervisor 210 is an operating system-level component that executes on hardware platform 244 to create and runs one or more virtual machines 148. In the example of FIG. 2, hypervisor 210 may incorporate the functionality of kernel 209 (e.g., a "type 1 hypervisor"). In other examples, hypervisor 210 may execute on kernel 209 (e.g., a "type 2 hypervisor"). In some situations, hypervisor 210 may be referred to as a virtual machine manager (VMM). Example hypervisors include Kernel-based Virtual Machine (KVM) for the Linux kernel, Xen, ESXi available from VMware, Windows Hyper-V available from Microsoft, and other open-source and proprietary hypervisors.

In this particular example, server 126 includes a virtual router 142 that executes within hypervisor 210, and may operate in a manner consistent with the description provided in connection with FIG. 1. In the example of FIG. 2, virtual router 142 may manage one or more virtual networks, each of which may provide a network environment for execution of virtual machines 148 on top of the virtualization platform provided by hypervisor 210. Each of the virtual machines 148 may be associated with one of the virtual networks.

Policy agent 205 may execute as part of hypervisor 210, or may execute within kernel space or as part of kernel 209. Policy agent 205 may monitor some or all of the performance metrics associated with server 126. According to the techniques described herein, among other metrics for server 126, policy agent 205 is configured to monitor metrics that relate to or describe usage of resources shared internal to processor 240 by each of processes 151 executing on processor cores 243 within multi-core processor 240 of server 126. In some examples, such internal processor metrics relate to usage of cache 245 (e.g., a L3 cache) or usage of bandwidth on memory bus 242. Policy agent 205 may also be capable of generating and maintaining a mapping that associates processor metrics for processes 151 to one or more virtual machines 148, such as by correlation with process identifiers (PIDs) or other information maintained by kernel 209. In other examples, policy agent 205 may be capable of assisting policy controller 201 in generating and maintaining such a mapping. Policy agent 205 may, at the direction of policy controller 201, enforce one or more policies 202 at server 126 responsive to usage metrics obtained for resources shared internal to a physical processor 240 and/or further based on other usage metrics for resources external to processor 240.

Virtual router agent 136 is included within server 126 in the example of FIG. 2. With reference to FIG. 1, virtual router agents 136 may be included within each of servers 126 (although not shown in FIG. 1). In the example of FIG. 2, virtual router agent 136 communicates with SDN controller 132 and, responsive thereto, directs virtual router 142 so as to control the overlay of virtual networks and coordinate the routing of data packets within server 126. In general, virtual router agent 136 communicates with SDN controller 132, which generates commands to control routing of packets through data center 110. Virtual router agent 136 may execute in user space and operate as a proxy for control plane messages between virtual machines 148 and SDN controller 132. For example, virtual machine 148A may request to send a message using its virtual address via virtual router agent 136, and virtual router agent 136A may in turn send the message and request that a response to the message be received for the virtual address of virtual machine 148A, which originated the first message. In some cases, virtual machine 148A may invoke a procedure or function call presented by an application programming interface of virtual router agent 136, and virtual router agent 136 handles encapsulation of the message as well, including addressing.

In some example implementations, server 126 may include an orchestration agent (not shown in FIG. 2) that communicates directly with orchestration engine 130. For example, responsive to instructions from orchestration engine 130, the orchestration agent communicates attributes of the particular virtual machines 148 executing on each of the respective servers 126, and may create or terminate individual virtual machines.

Virtual machine 148A, virtual machine 148B, through virtual machine 148N (collectively "virtual machines 148") may represent example instances of virtual machines 148. Server 126 may partition the virtual and/or physical address space provided by memory 249 and/or provided by storage device 250 into user space for running user processes. Server 126 may also partition virtual and/or physical address space provided by memory 249 and/or storage device 250 into kernel space, which is protected and may be inaccessible by user processes.

In general, each of virtual machines 148 may be any type of software application and each may be assigned a virtual address for use within a corresponding virtual network, where each of the virtual networks may be a different virtual subnet provided by virtual router 142. Each of virtual machines 148 may be assigned its own virtual layer three (L3) IP address, for example, for sending and receiving communications but is unaware of an IP address of the physical server on which the virtual machine is executing. In this way, a "virtual address" is an address for an application that differs from the logical address for the underlying, physical computer system, e.g., server 126A in the example of FIG. 1.

Each of virtual machines 148 may represent a tenant virtual machine running customer applications such as Web servers, database servers, enterprise applications, or hosting virtualized services used to create service chains. In some cases, any one or more of servers 126 (see FIG. 1) or another computing device hosts customer applications directly, i.e., not as virtual machines. Virtual machines as referenced herein (e.g., virtual machines 148), servers 126, or a separate computing device that hosts a customer application may be referred to alternatively as "hosts." Further, although one or more aspects of the present disclosure are described in terms of virtual machines or virtual hosts, techniques in accordance with one or more aspects of the present disclosure that are described herein with respect to such virtual machines or virtual hosts may also apply to containers, applications, processes, or other units of execution (virtualized or non-virtualized) executing on servers 126.

Processes 151A, processes 151B, through processes 151N (collectively "processes 151") may each execute within one or more virtual machines 148. For example, one or more processes 151A may correspond to virtual machine 148A, or may correspond to an application or a thread of an application executed within virtual machine 148A. Similarly, a different set of processes 151B may correspond to virtual machine 148B, or to an application or a thread of an application executed within virtual machine 148B. In some examples, each of processes 151 may be a thread of execution or other execution unit controlled and/or created by an application associated with one of virtual machines 148. Each of processes 151 may be associated with a process identifier that is used by processor cores 243 to identify each of processes 151 when reporting one or more metrics, such as internal processor metrics collected by policy agent 205.

In operation, hypervisor 210 of server 126 may create a number of processes that share resources of server 126. For example, hypervisor 210 may (e.g., at the direction of orchestration engine 130) instantiate or start one or more virtual machines 148 on server 126. Each of virtual machines 148 may execute one or more processes 151, and each of those software processes may execute on one or more processor cores 243 within hardware processor 240 of server 126. For instance, virtual machine 148A may execute processes 151A, virtual machine 148B may execute processes 151B, and virtual machines 148N may execute processes 151N. In the example of FIG. 2, processes 151A, processes 151B, and processes 151N (collectively "processes 151") all execute on the same physical host (e.g., server 126) and may share certain resources while executing on server 126. For instance, processes executing on processor cores 243 may share memory bus 242, memory 249, input/output devices 248, storage device 250, cache 245, memory controller 246, input/output controller 247, and/or other resources.

Kernel 209 (or a hypervisor 210 that implements kernel 209) may schedule processes to execute on processor cores 243. For example, kernel 209 may schedule, for execution on processor cores 243, processes 151 belonging to one or more virtual machines 148. One or more processes 151 may execute on one or more processor cores 243, and kernel 209 may periodically preempt one or more processes 151 to schedule another of the processes 151. Accordingly, kernel 209 may periodically perform a context switch to begin or resume execution of a different one of the processes 151. Kernel 209 may maintain a queue that it uses to identify the next process to schedule for execution, and kernel 209 may place the previous process back in the queue for later execution. In some examples, kernel 209 may schedule processes on a round-robin or other basis. When the next process in the queue begins executing, that next process has access to shared resources used by the previous processes, including, for example, cache 245, memory bus 242, and/or memory 249.

As described herein, the manner in which processes 151 within each of virtual machines 148 uses a resource shared internally within a given physical processor 240 is often difficult to detect and manage, and therefore, may cause performance issues for processes 151 within a different one of virtual machines 148 that is similarly executing within the same physical processor. For example, a first process (e.g., one of processes 151A within virtual machine 148A) executing on processor core 243A may perform a memory operation that results in data from memory 249 being loaded into cache 245. Kernel 209 may, after that data has been loaded into cache 245, perform a context switch so that a second process (e.g., one of processes 151B) begins executing on processor core 243A (or another of processor cores 243). That second process (one of processes 151B within virtual machine 148B) may perform memory access operations that also cause data to be loaded into shared cache 245. If the second process performs operations that occupy or consume a significant amount of cache space, the data stored in the cache by the first process may be overwritten. After the data stored in the cache by the first process is overwritten by the second process, kernel 209 may eventually perform a context switch to resume execution of the first process (i.e., from processes 151A). That first process may attempt to access the same data that would otherwise be quickly available from cache 245, but since that data was cleared from cache 245 as a result of operations performed by the second process (i.e., from processes 151B), the first process will experience a page fault and/or a cache miss. Processor 240 will then re-retrieve the data from memory 249, but accessing the data from memory 249 is likely to be significantly slower than accessing the data from cache 245.

Therefore, the performance of the first process may be adversely affected as a result of the cache-related operations performed by the second process. In other words, even when a given software application of a virtual machine is allocated an otherwise sufficient share of memory 249 and CPU time of processor 240 and/or a processor core 243 therein, utilization of cache 245 internal to processor 240 (and therefore not typically visible) by another software application can lead poor and unpredictable performance by both applications. As such, techniques are described herein by which policy agent is configured to interrogate processor 240 to obtain metrics for resources, such as cache 245, that are shared internal to the processor and, therefore, would otherwise not be visible external to the processor. Moreover, the techniques leverage the internal processor metrics within the performance monitoring and policy enforcement mechanism provided by policy controller 201, thereby providing improved fine-grain control over the computing environment.

As another example, the manner in which one or more processes 151 within one of virtual machines 148 use other shared resources internal to processor 240 may also cause performance issues for other processes. For example, a first process (e.g., one of processes 151A within virtual machine 148A) executing on processor cores 243 may periodically read to and write from memory 249. A second process (e.g., one of processes 151B within virtual machine 148B) that also executes on processor cores 243 may also read and write from memory 249. As such, the first and second processes each consume a portion of the bandwidth available by memory bus 242 internal to processor 240. However, the second process may be a highly memory-intensive process that performs many operations involving memory bus 242. By performing many operations involving memory bus 242, the second process may consume so much of the bandwidth of memory bus 242 that the ability of the first process to read to and write from memory 249 may be adversely affected. Accordingly, as a result of operations of the second process involving shared memory bus 242, the performance of the second process may be adversely affected.

In the examples just described, the processes may be executing in different virtual machines or on the same virtual machine. In any case, situations arise where, regardless of policies designed to allocate fair amounts of utilization of memory 249 and processor 240 and/or cores 243, utilization resources that are shared by the software processes internal the processor 240 may affect, in some way, the performance of virtual machine 148A, and correspondingly, computing resources consumed by virtual machine 148A may affect, in some way, the performance of virtual machine 148B. In that sense, virtual machine 148A and virtual machine 148B must coexist on the same server 126, and therefore, must coexist in what might be considered the same "neighborhood." And further, where one of the virtual machines 148 consumes a significant amount of shared resources, particularly where that consumption affects other virtual machines 148, that resource-consuming process might be considered to be disrupting the neighborhood, and as a result, labeled a "noisy" neighbor.

When performance issues arise for one of virtual machines 148 executing on server 126, such issues may be the result of a noisy neighbor (e.g., a resource-intensive different virtual machine) on server 126. Yet some typical or common usage and/or performance metrics, such as CPU utilization or CPU load associated with processor cores 243, might not pinpoint or otherwise identify which virtual machine can be implicated as the noisy neighbor. In other words, where one of virtual machines 148 is consuming resources shared internal to processor 240 and in a way that affects other virtual machines 148, that consumption might not be reflected in a metric such as CPU utilization or CPU load. Accordingly, other resource metrics might be needed in order to identify and act on any virtual machines 148, containers, and/or processes 151 that may be consuming shared resources in a manner that is—or will be—affecting the performance of other virtual machines 148, containers, and/or processes 151.

In the example of FIG. 2, and in accordance with one or more aspects of the present disclosure, policy agent 205 monitors the operation of server 126 to identify virtual machines 148 that use shared resource internal to processor 240 of server 126 in such a way that may affect operation of other virtual machines 148. For example, policy agent 205 may monitor internal processor metrics that relate to or describe usage of cache 245 by each of processes 151 executing on processor cores 243 within server 126. Policy agent 205 may alternatively, or in addition, monitor internal processor metrics that relate to or describe consumption of memory bandwidth for memory bus 242 by each of processes 151 executing on processor cores 243 within server 126. Policy agent 205 may alternatively, or in addition, monitor internal processor metrics that relate to or describe use and/or consumption of other shared resources by each of processes 151 executing on processor cores 243 within server 126.

To access and monitor the internal processor metrics, policy agent 205 may interrogate processor 240 through a specialized hardware interface 254 that is exposed by APIs of kernel 209. For example, policy agent 205 may access or manipulate one or more hardware registers of processor cores 243 to program monitoring circuit ("MON CIRC") 252 of processor 240 for internally monitoring shared resources and for reporting, via the interface, usage metrics for those resources. Policy agent 205 may access and manipulate the hardware interface of processor 240 by invoking kernel, operating system, and/or hypervisor calls. For example, the hardware interface of processor 240 may be memory mapped via kernel 209 such that the programmable registers of processor 240 for monitoring internal resources of the processor may be read and written by memory access instructions directed to particular memory addresses. In response to such direction by policy agent 205, monitoring circuitry 252 internal to processor 240 may monitor execution of processor cores 243, and communicate to policy agent 205 or otherwise make available to policy agent 205 information about internal processor metrics for each of the processes 151.

Policy agent 205 may maintain a mapping that associates processor metrics to each of processes 151 executing within virtual machines 148. For example, policy agent 205 may interrogate kernel 209 to identify process identifiers associated with each of the software processes executing on the virtual machines 148. Policy agent 205 may use the process identifiers for each of processes 151 associated with virtual machines 148 to correlate processor metrics reported by processor cores 243 for each of processes 151 with one of virtual machines 148. Policy agent 205 may use this information to extrapolate, from the processor metrics associated with each of processes 151, processor metrics associated with each of virtual machines 148. Policy agent 205 may use the extrapolated processor metrics associated with each of virtual machines 148 to identify how each of virtual machines 148 are using shared resources of servers 126. Policy agent 205 may evaluate the internal processor metrics and determine whether one or more virtual machines 148 are using shared resources in a manner that may adversely affect operation of other virtual machines 148.

Policy agent 205 may, in response to identifying one or more virtual machines 148 that are using shared resources in a manner that may adversely affect operation of other virtual machines 148, raise an alarm. For example, policy agent 205 may analyze internal processor metrics for virtual machine 148B, or one or more processes 151B executing within virtual machine 148B. Policy agent 205 may compare one or more metrics to an alarm threshold. The alarm threshold may be based on one or more policies 202 that policy agent 205 receives from policy controller 201 or that are otherwise expressed by policy controller 201 (or from one or more components of policy controller 201). Policy agent 205 may evaluate internal processor metrics for a number of intervals, and evaluate statistics for the processor metrics (e.g., average, maximum, standard deviation) in light of one or more policies 202. In some examples, policy agent 205 may evaluate internal processor metrics for virtual machine 148B over a period of time (e.g., five minutes) and/or over numerous intervals to determine a representative set of internal processor metrics for virtual machine 148B. Policy agent 205 may filter out any aberrations in the collected internal processor metrics that are not representative of the normal operation of virtual machine 148B and/or that are not likely to affect operation of virtual machines 148 that neighbor virtual machine 148B within server 126. Policy agent 205 may determine, based on such an evaluation, that the internal processor metrics for virtual machine 148B exceeds an alarm threshold expressed in one or more policies 202, or that the internal processor metrics associated with virtual machine 148B otherwise triggers an alarm.

Policy agent 205 may, in response to the alarm, take one or more actions to prevent detrimental effects on the performance of other virtual machines 148. For example, the alarm or the metrics on which the alarm is based may indicate that virtual machine 148B may be using cache 245 in such a way that may affect the performance of one or more other virtual machines 148. Policy agent 205 may act on such an alarm by restricting use of cache 245 by virtual machine 148B, by carving up cache 245 so that each of virtual machines 148 only has access to a portion of cache 245, by allocating a smaller portion to virtual machine 148B, by assigning overlapped or isolated cache lines to one or more virtual machines 148 or processes 151, or by otherwise restricting use of cache 245 by virtual machine 148B executing within virtual machine 148B. In another example, the alarm or the metrics on which the alarm is based may indicate that virtual machine 148B may be consuming memory bandwidth to such an extent that it is affecting the performance of other virtual machines 148 that seek to use memory bandwidth. Policy agent 205 may act on such an alarm by restricting use of memory bandwidth by virtual machine 148B.

In some examples, policy agent 205 may restrict use of shared resources by one or more virtual machines by restricting use of shared resources used by one or more processes executing within a particular virtual machine. For instance, the alarm or the metrics on which an alarm is based may indicate that a particular identified process within virtual machine 148B is using a shared resource in such a way that may affect not only the performance of one or more other virtual machines 148, but also one or more other processes 151 executing within that same virtual machine 148B. Policy agent 205 may act on such an alarm by restricting use of one or more shared resources by the identified process within virtual machine 148B. Policy agent 205 may apply the restriction to only the identified process within virtual machine 148B, rather than to all processes within virtual machine 148B. In some examples, virtual machine 148B may itself instantiate one or more virtual machines within virtual machine 148B. If this "second level" virtual machine itself becomes "noisy," policy agent 205 may apply the restrictions to only the noisy virtual machine within virtual machine 148, and avoid restricting other processes within virtual machine 148B where such restrictions might not be warranted or necessary.

In some examples, policy agent 205 may, alternatively or in addition, report to policy controller 201 information about the internal processor metrics. For example, policy agent 205 may collect processor metrics from processor cores 243. Policy agent 205 may identify the virtual machines 148 that are associated with some or all of the collected processor metrics. Policy agent 205 may communicate to data manager 218 information about the collected processor metrics. Data manager 218 may store some or all of the received information in usage metrics data store 216.

Policy controller 201 may act on the information received from policy agent 205 about internal processor metrics. For example, analytics engine 214 may analyze information stored in usage metrics data store 216 and identify, based on information about internal processor metrics, identify one or more virtual machines 148 that are operating in a manner that may adversely affect the operation of other virtual machines 148 executing on server 126. Analytics engine 214 may, in response to identifying one or more virtual machines 148, generate one or more reports and notifications 212. Analytics engine 214 may alternatively, or in addition, cause or instruct policy agent 205 to take actions to address the operation of the identified virtual machines 148.

In some examples, policy agent 205 may, alternatively or in addition, report to policy controller 201 information derived from internal processor metrics of processor cores 243. In other words, rather than simply reporting internal processor metrics to policy controller 201, policy agent 205 may perform some analysis on the collected metrics, and report the results of such analysis to policy controller 201. For example, policy agent 205 may collect processor metrics and identify one or more virtual machines 148 that are operating in a manner that may adversely affect the operation of other virtual machines 148 executing on server 126. Policy agent 205 may communicate to data manager 218 information about the results of its analysis, which may identify one or more virtual machines 148 and/or the shared resources that may be involved. Analytics engine 214 may, in response to such information, instruct policy agent 205 to take action to address the operation of the identified virtual machines 148. Accordingly, the processing and/or analysis of various metrics, including internal processor metrics from processor cores 243, may be performed by policy agent 205, by policy controller 201 (e.g., analytics engine 214), by a combination of policy agent 205 and policy controller 201, or by another module or component of server 126.

In some examples, policy agent 205 and/or policy controller 201 may monitor internal processor metrics associated with processor cores 243 using Intel's Resource Directory Technology (RDT) available in some Intel® Xeon® processors as one example of monitoring circuitry 252 of processor 240. Intel's RDT enables resource monitoring and control features designed to improve visibility into and control over how shared platform resources are used. For instance, by using RDT's Cache Monitoring Technology (CMT) of monitoring circuitry 252, policy agent 205 may determine last level cache utilization of individual threads that are executing on server 126. Policy agent 205 and/or policy controller 201 may use this information to derive usage of cache 245 by one or more virtual machines 148 (or processes 151). In one example, policy agent 205 may use RDT's Memory Bandwidth Monitoring (MBM) of monitoring circuitry 252 to identify local memory bandwidth usage for individual threads executing within virtual machines 148 on server 126. In RDT, MBM is an extension of CMT which provides monitoring per thread for its remote and local memory bandwidth usage. In another example, policy agent 205 may use RDT's Cache Allocation Technology (CAT) of monitoring circuitry 252 to prioritize different virtual machines 148 or processes executing on server 126. Hypervisor 210, policy controller 201 and/or policy agent 205 may use CAT to carve out cache 245 to different virtual machines 148 executing on server 126. In another example, policy agent 205 may also use RDT's Code and Data Prioritization (CDP) to allocate code and data segments in cache 245.

To access information made available through RDT, policy agent 205 may access CPU identifier information and information of monitoring circuitry 252 as exposed by kernel 209 to verify if processor cores 243 implements some or all of the RDT capabilities. Policy agent 205 may interact with the Intel processor and the kernel running on the Intel processor. For instance, if processor cores 243 implements RDT or a similar technology, policy agent 205 may, by invoking the appropriate kernel APIs or function calls, configure a model specific register (MSR) and program a specific item identifier that corresponds to the desired internal processor metrics associated with processor cores 243. In response, processor cores 243 may periodically publish or write the requested internal processor metrics to the specified MSR. Policy agent 205 may thereafter collect internal processor metrics by reading from the specified MSR. In some examples, such as when hypervisor 210 implements or is implemented on top of a Linux kernel, the Linux kernel memory maps the internal processor metrics, and controls how policy agent 205 or other processes read and write from the specified MSRs. Policy agent 205 may invoke the appropriate Linux calls to direct processor cores 243 to monitor specific metrics, and policy agent 205 may read the appropriate MSRs in order to extract the desired internal processor metrics.

Policy controller 201 may establish one or more policies 202 indicating that when orchestration engine 130 directs hypervisor 210 to spin up, instantiate, or otherwise start a new virtual machine, hypervisor 210 will specify how the new virtual machine may use one or more shared resources. For example, policy control engine 211 of policy controller 201 may establish one or more policies 202 indicating that new virtual machines 148 are given an equal share of cache 245. Or that high priority virtual machines 148, containers, or processes 151 are given a larger share of cache 245. Policy control engine 211 may cause policy controller 201 to communicate one or more policies 202 to orchestration engine 130 (or to hypervisor 210) so that when orchestration engine 130 directs hypervisor 210 to create a new virtual machine, the new virtual machine is created with an equal share of cache 245. In another example, policy controller 201 may establish one or more policies 202 indicating that new virtual machines 148 are given a specific percentage share of cache 245. In such an example, policy control engine 211 may cause policy controller 201 to communicate one or more corresponding policies 202 to orchestration engine 130 and/or to hypervisor 210 so that when orchestration engine 130 directs hypervisor 210 to create a new virtual machine, the new virtual machine is created with a specific percentage share of cache 245. Orchestration engine 130 may implement such policies by carving up cache 245 using RDT's CAT functionality or similar functionality made available by other processors.

In such examples, policy agent 205 and/or policy controller 201 may still respond to alerts by further restricting use of cache 245 or other shared resource, and/or generate one or more reports and notifications 212. A REST interface may be used to dynamically update the allocation of cache 245 associated with virtual machines 148 and/or processes 151. For example:

curl -i \
  -H 'Content-Type: application/json' \
  -X PUT \
  -d '{"InstanceCacheAllocationPercentage": 5}' \
http://<host-ip-address>:7000/appformix/v1.0/instance_definition/<instance-id>

In the example above, parameters that can be set for the instance_definition include InstanceCacheAllocationMB, InstanceCacheAllocationPercentage, and InstanceCacheAllocationEqualShare. Policy controller 201 and/or policy agent 205 may provide isolated cache lines to virtual machines 148, to instances of virtual machines 148, or to applications. Alternatively, or in addition, policy controller 201 and/or policy agent 205 may allocate shared portions of cache 245 based on a priority class of the instance, classification of the instance, or based on application workload. In some examples, the cache may be allocated on a per-CPU socket basis (e.g., per processor 240 basis). Policy agent 205 may perform allocations based on usage, current scheduling pattern of the set of processes, and CPU core pinning attributes of the instance, the virtual machine, or the application.

Policy agent 205 and/or policy controller 201 may classify one or more virtual machines 148 based on the manner in which each virtual machine consumes shared resources. For example, policy agent 205 may monitor metrics, including internal processor metrics for each of virtual machines 148 over a period of time. Policy agent 205 may, for each of virtual machines 148, determine patterns of usage of cache 245, memory bandwidth usage, instructions retired per second, and other metrics associated with the operation of each of virtual machines 148. Policy agent 205 may communicate information about the patterns of usage to data manager 218 of policy controller 201. Data manager 218 may store the information in usage metrics data store 216. Analytics engine 214 of policy controller 201 may analyze the metrics for each of virtual machines 148, such as by performing a linear regression across each of the monitored metrics. Analytics engine 214 may, based on this analysis, characterize one or more of virtual machines 148 in terms of the shared resources each of virtual machines 148 tends to consume. For instance, analytics engine 214 may characterize one or more virtual machines 148 as CPU bound, memory bound, or cache bound.

Policy controller 201 may establish one or more policies 202 to limit the number of virtual machines 148 having the same or similar classifications on server 126. For example, policy control engine 211 of policy controller 201 may establish one or more policies 202 that are based on the classifications of virtual machines 148 describe above. Such policies 202 may be designed to avoid having too many virtual machines 148 that are consuming shared resources of server 126 in similar ways. In one example, policy control engine 211 and/or analytics engine 214 may determine that if a given number of virtual machines 148 can be characterized as CPU bound, and orchestration engine 130 (or hypervisor 210) seeks to instantiate or start a new CPU bound virtual machine, one or more policies 202 may ensure that the new virtual machine is not instantiated or started on server 126, but rather, is instantiated or started on a different physical host within data center 110. Specifically, in such an example, policy control engine 211 may establish one or more policies 202 that limit the number of CPU bound virtual machines 148 to the number of cores associated with processor cores 243. If there are 16 cores within processor cores 243, policy control engine 211 may establish one or more policies 202 indicating that no more than 16 CPU bound virtual machines 148 should be executing on server 126. In a different example, if a given number of virtual machines 148 can be characterized as cache bound, and orchestration engine 130 seeks to instantiate or start a new cache bound virtual machine, one or more policies 202 may ensure that the new virtual machine is not instantiated or started on server 126, but rather, is instantiated or started on a different physical host within data center 110.

Policy controller 201 may cause orchestration engine 130 to choose or adjust, based on classifications of virtual machines 148, the physical host on which one or more virtual machines 148 are executing. For example, with reference to FIG. 1 and FIG. 2, policy control engine 211 of policy controller 201 may determine that 50 CPU bound virtual machines 148 and no memory bound virtual machines 148 are executing on server 126A. Policy control engine 211 may further determine that no CPU bound virtual machines 148 and 40 memory bound virtual machines 148 are executing on server 126B. Policy control engine 211 may determine that server 126A and server 126B may each perform better if some of the 50 CPU bound virtual machines 148 executing on server 126A were instead executing on server 126B, and some of the 40 memory bound virtual machines 148 executing on server 126B were instead executing on server 126A. Accordingly, policy control engine 211 may cause policy controller 201 to communicate with orchestration engine 130, instructing orchestration engine 130 to reallocate one or more virtual machines 148. For instance, policy controller 201 may instruct orchestration engine 130 to move some of the virtual machines 148 executing on server 126A to server 126B, and move some of the virtual machines 148 executing on server 126B to server 126A. Data center 110 may, as a result of allocating virtual machines 148 across servers 126 in this manner, exhibit improved performance.

Policy controller 201 may also establish policies to improve NUMA locality using memory bandwidth metrics (e.g., RDT's MBM metric). In such an example, policy agent 205 may collect from processor cores 243 metrics relating to unoptimized NUMA if remote memory bandwidth is greater than local memory bandwidth. Policy agent 205 may use such metrics to repurpose or reimplement one or more virtual machines 148 for NUMA locality. The latencies for accessing remote memory may be much higher than for local memory.

Analytics engine 214 evaluates alarms included in each of profiles 213 by comparing the alarm thresholds to usage metrics 216 for the corresponding resource using any of the aforementioned techniques for static or dynamic thresholding, immediate or historic usage data, for instance. Based on evaluating the multiple alarms within a profile 213 for an element by virtue of direct association with the element or indirect association with the element because the element is configured by policy control engine 211 as a member of a group associated with a profile that includes one or more alarms, analytics engine 214 sets the profile to active or inactive and may perform any of the aforementioned ameliorative, reporting, and or notification operations. In some examples, analytics engine 214 may distribute profiles 213 among policy agents 205 to evaluate alarms and profiles 213 in a distributed, local manner on servers 126.

Figure 3A:
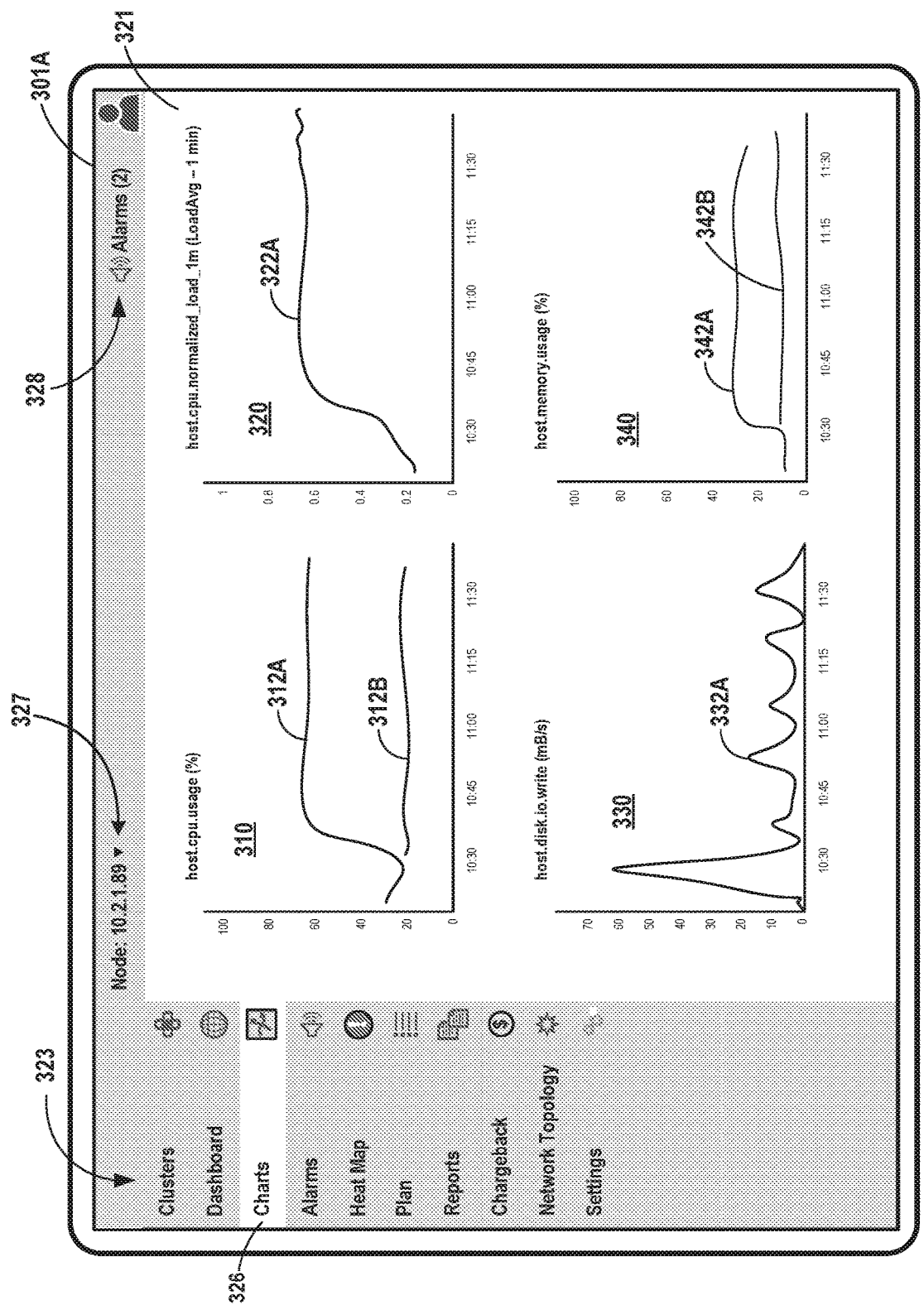
FIGS. 3A-3B are conceptual diagrams illustrating an example user interfaces presented by an example user interface device in accordance with one or more aspects of the present disclosure.
Figure 3B:
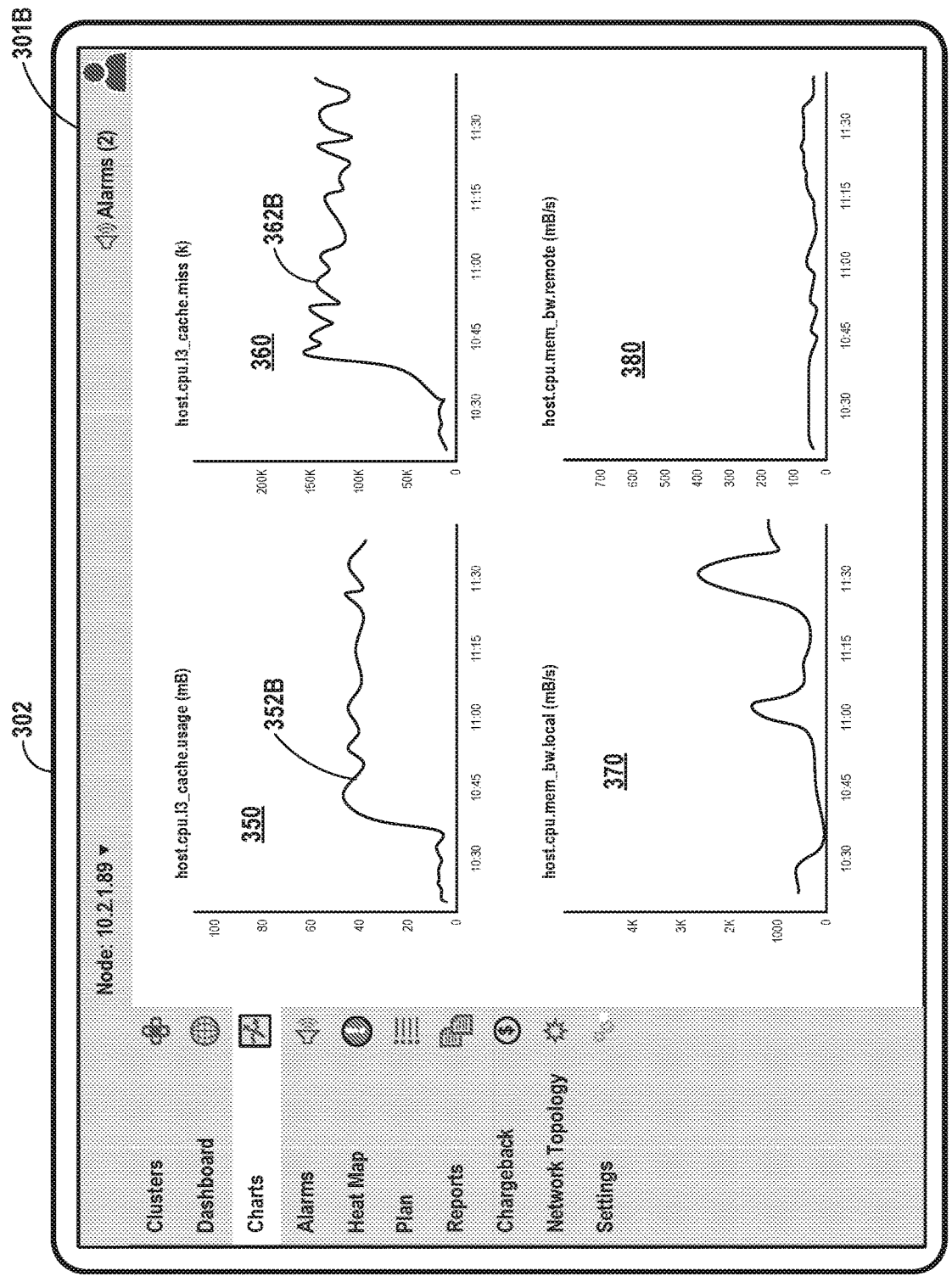

FIG. 3A and FIG. 3B are conceptual diagrams illustrating an example user interfaces presented by an example user interface device in accordance with one or more aspects of the present disclosure. User interface 301A illustrated in FIG. 3A and user interface 301B illustrated in FIG. 3B may each correspond to a user interface presented by user interface device 129, and may be example user interfaces corresponding to or included within dashboard 203 described in connection with FIG. 1 and FIG. 2. Although the user interfaces illustrated in FIG. 3A and FIG. 3B are shown as graphical user interfaces, other types of interfaces may be presented by user interface device 129, including a text-based user interface, a console or command-based user interface, a voice prompt user interface, or any other appropriate user interface. One or more aspects of user interface 301A and/or user interface 301B may be described herein within the context of data center 110 of FIG. 1 and FIG. 2.

With reference to FIG. 2, FIG. 3A, and FIG. 3B, and in accordance with one or more aspects of the present disclosure, user interface device 129 may present user interface 301A and user interface 301B. For example, user interface device 129 may detect input that it determines corresponds to a request, by a user, to present metrics associated with server 126 of FIG. 2. User interface device 129 may output to policy controller 201 an indication of input. Policy control engine 211 of policy controller 201 may detect input and determine that the input corresponds to a request for information about metrics associated with server 126. Policy control engine 211 may, in response to the input, generate dashboard 203, which may include information underlying user interface 301A and user interface 301B. Policy control engine 211 may cause policy controller 201 to send information to user interface device 129. User interface device 129 may receive the information, and determine that the information includes information sufficient to generate a user interface. User interface device 129 may, in response to the information received from policy controller 201, create user interface 301A and present the user interface at a display associated with user interface device 129 in the manner illustrated in FIG. 3A. Similarly, user interface device 129 may, also in response to the information received from policy controller 201, create user interface 301B and present it at the display associated with user interface device 129 in the manner illustrated in FIG. 3B.

In the example of FIG. 3A, user interface 301A includes CPU usage metrics graph 310, CPU load metrics graph 320, disk usage metrics graph 330, and memory usage metrics graph 340. Each graph in FIG. 3A may represent metrics values, over time (along the x-axis), associated with multiple virtual machines 148 executing on server 126, and as detected or determined by policy controller 201 and/or policy agent 205 of FIG. 2. In particular, in FIG. 3A, metrics associated with virtual machine 148A are shown as CPU usage 312A, CPU load 322A, disk usage 332A, and memory usage 342A. In addition, metrics for virtual machine 148B in FIG. 3A include CPU usage 312B and memory usage 342B.

In the example of FIG. 3B, user interface 301B includes cache usage graph 350, cache miss frequency graph 360, local memory bandwidth graph 370, and remote memory bandwidth graph 380. Again, each graph in FIG. 3B may represent time series metrics values, associated with multiple virtual machines 148 executing on server 126, and as detected or determined by policy controller 201 and/or policy agent 205 of FIG. 2. In FIG. 3B, metrics associated with virtual machine include cache usage 352B and cache miss frequency 362B.

The information illustrated in FIG. 3A suggests that virtual machine 148A experienced a significant increase in CPU usage (see CPU usage 312A on CPU usage metrics graph 310) and CPU load (see CPU load 322A on CPU load metrics graph 320) starting at approximately 10:35. Further, virtual machine 148A experienced a significant increase in memory usage at about the same time (see memory usage 342A on memory usage metrics graph 340). The cause of those changes in performance metrics for virtual machine 148A might not be apparent from the graphs presented in user interface 301A of FIG. 3A. In particular, note that the metrics for virtual machine 148B in FIG. 3A (e.g., CPU usage 312B) remain relatively constant after 10:35, and do not suggest that virtual machine 148B is operating in a manner that is degrading the performance of virtual machine 148A.

User interface 301B of FIG. 3B presents information and graphs derived from internal processor metrics. Unlike FIG. 3A, FIG. 3B provides information that may be helpful in identifying which of virtual machines 148 is affecting the performance of virtual machine 148A. For instance, although virtual machine 148B has relatively constant 20% CPU utilization after 10:35 (as illustrated by CPU usage 312B in FIG. 3A), it is apparent from cache usage graph 350 (specifically, cache usage 352B) in FIG. 3B that virtual machine 148B has increased its cache usage to approximately 40 MB at approximately 10:35. Further, virtual machine 148B starts generating a significant number of cache misses at 10:35 (see cache miss frequency 362B of cache miss frequency graph 360). Based on this information, policy agent 205, policy controller 201, and/or an administrator operating user interface device 129 may determine that the cause of the change in performance metrics for virtual machine 148A is virtual machine 148B, which may be using cache 245 in a manner that affects the performance of virtual machine 148A.

Accordingly, and as illustrated by FIG. 3A and FIG. 3B, by monitoring internal processor metrics to identify shared resources consumed by virtual machine 148B within the processor, it may be possible to identify one or more virtual machines that are consuming shared resources within the processor of server 126 in a manner that may adversely affect the performance of other virtual machines that contend for those same resources within the processor. Without monitoring such internal processor metrics, debugging or otherwise identifying the cause of the change in performance metrics for virtual machines 148 may be difficult or impossible.

Figure 4:
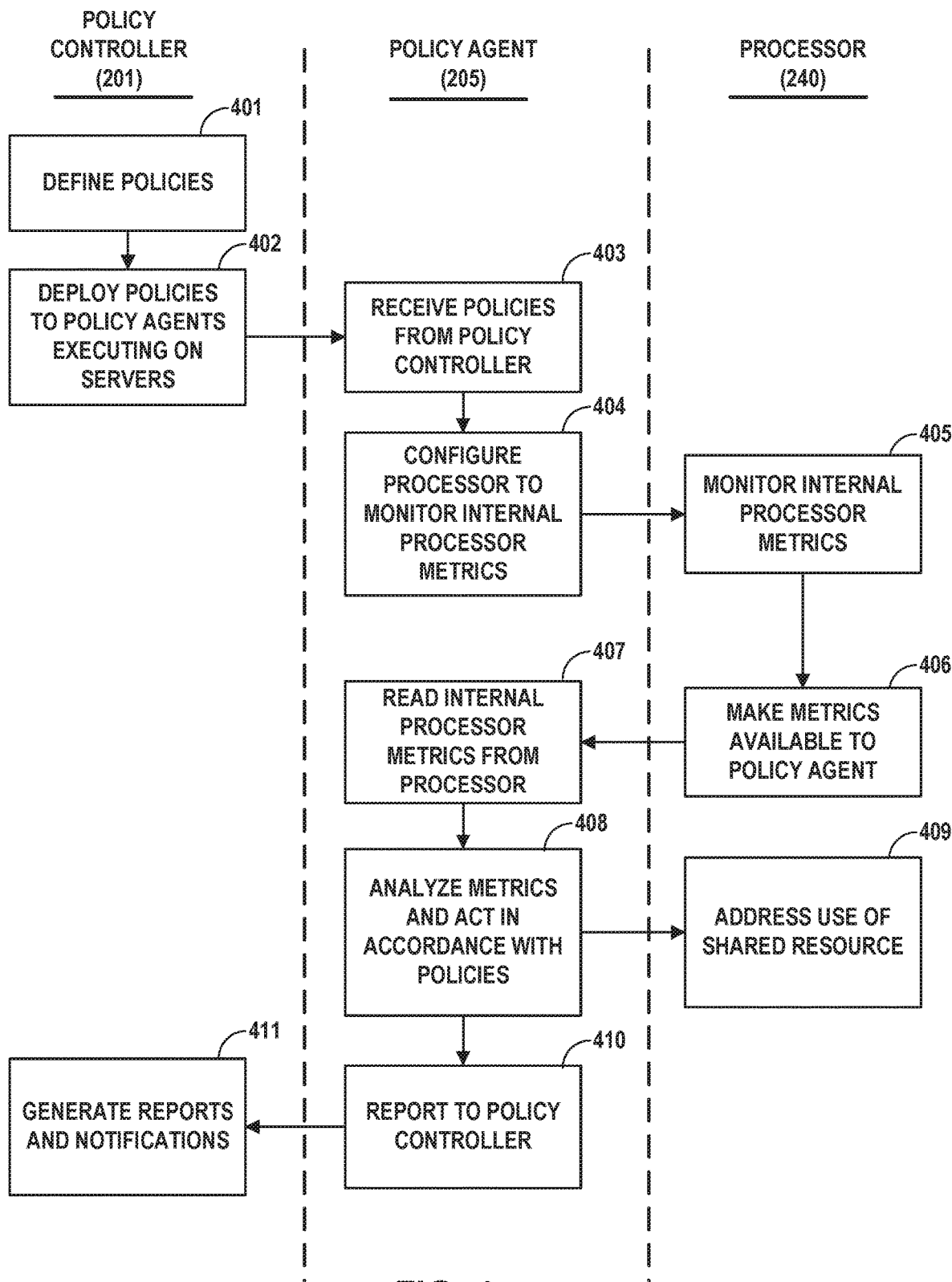
FIG. 4 is a flow diagram illustrating operations performed by an example server in accordance with one or more aspects of the present disclosure.

FIG. 4 is a flow diagram illustrating operations performed by an example server in accordance with one or more aspects of the present disclosure. FIG. 4 is described below within the context of server 126 of FIG. 2. In other examples, operations described in FIG. 4 may be performed by one or more other components, modules, systems, or devices. Further, in other examples, operations described in connection with FIG. 4 may be merged, performed in a difference sequence, or omitted.

In the example of FIG. 4, and in accordance with one or more aspects of the present disclosure, policy controller 201 may define one or more policies (401). For example, user interface device 129 may detect input, and output to policy controller 201 an indication of input. Policy control engine 211 of policy controller 201 may determine that the input corresponds to information sufficient to define one or more policies. Policy control engine 211 may define and store one or more policies in policies data store 202.

Policy controller 201 may deploy one or more policies to one or more policy agents 205 executing on one or more servers 126 (402). For example, policy control engine 211 may cause data manager 218 of policy controller 201 to output information to policy agent 205. Policy agent 205 may receive the information from policy controller 201 and determine that the information corresponds to one or more policies to be deployed at policy agent 205 (403).

Policy agent 205 may configure processor 240 to monitor internal processor metrics (404). For example, policy agent 205 may interact with and/or configure monitoring circuit 252 to enable monitoring of processor metrics. In some examples, policy agent may configure monitoring circuit 252 to collect metrics pursuant to Resource Directory Technology.

Processor 240 may, in response to interactions and/or configurations by policy agent 205, monitor internal processor metrics relating to resources shared within the processor 240 of server 126 (405). Processor 240 may make such metrics available to other devices or processes, such as policy agent 205 (406). In some examples, processor 240 makes such metrics available by publishing such metrics in a designated area of memory or within a register of processor 240.

Policy agent 205 may read internal processor metrics from processor 240 (407). For example, policy agent 205 may read from a register (e.g., a model specific register) to access information about internal processor metrics relating to processor 240.

Policy agent 205 may analyze the metrics and act in accordance with policies in place for server 126 (408). For example, policy agent 205 may determine, based on the internal processor metrics, that one or more virtual machines deployed on server 126 is using a cache shared internal to processor 240 in a manner that may adversely affect the performance of other virtual machines 148 executing on server 126. In some examples, policy agent 205 may determine that one or more virtual machines deployed on server 126 is using memory bandwidth in a manner that may adversely affect the performance of other virtual machines 148. Policy agent 205 may, in response to such a determination, instruct processor 240 to restrict the offending virtual machine's use of the shared cache, such as by allocating a smaller portion of the cache to that virtual machine. Processor 240 may receive such instructions and restrict the offending virtual machine's use of the shared cache in accordance with instructions received from policy agent 205 (409).

In some examples, policy agent 205 may report information to policy controller 201 (410). For example, policy agent 205 may report internal processor metrics to data manager 218 of policy controller 201. Alternatively, or in addition, policy agent 205 may report to data manager 218 results of analysis performed by policy agent 205 based on internal processor metrics.

In response to receiving information reported by policy agent 205, policy controller 201 may generate one or more reports and/or notifications (411). For example, analytics engine 214 of policy controller 201 may generate one or more reports and cause user interface device 129 to present such reports as a user interface. Alternatively, or in addition, analytics engine 214 may generate one or more alerts that may be included or reported in dashboard 203 presented by policy controller 201 via user interface device 129.

Figure 5A:
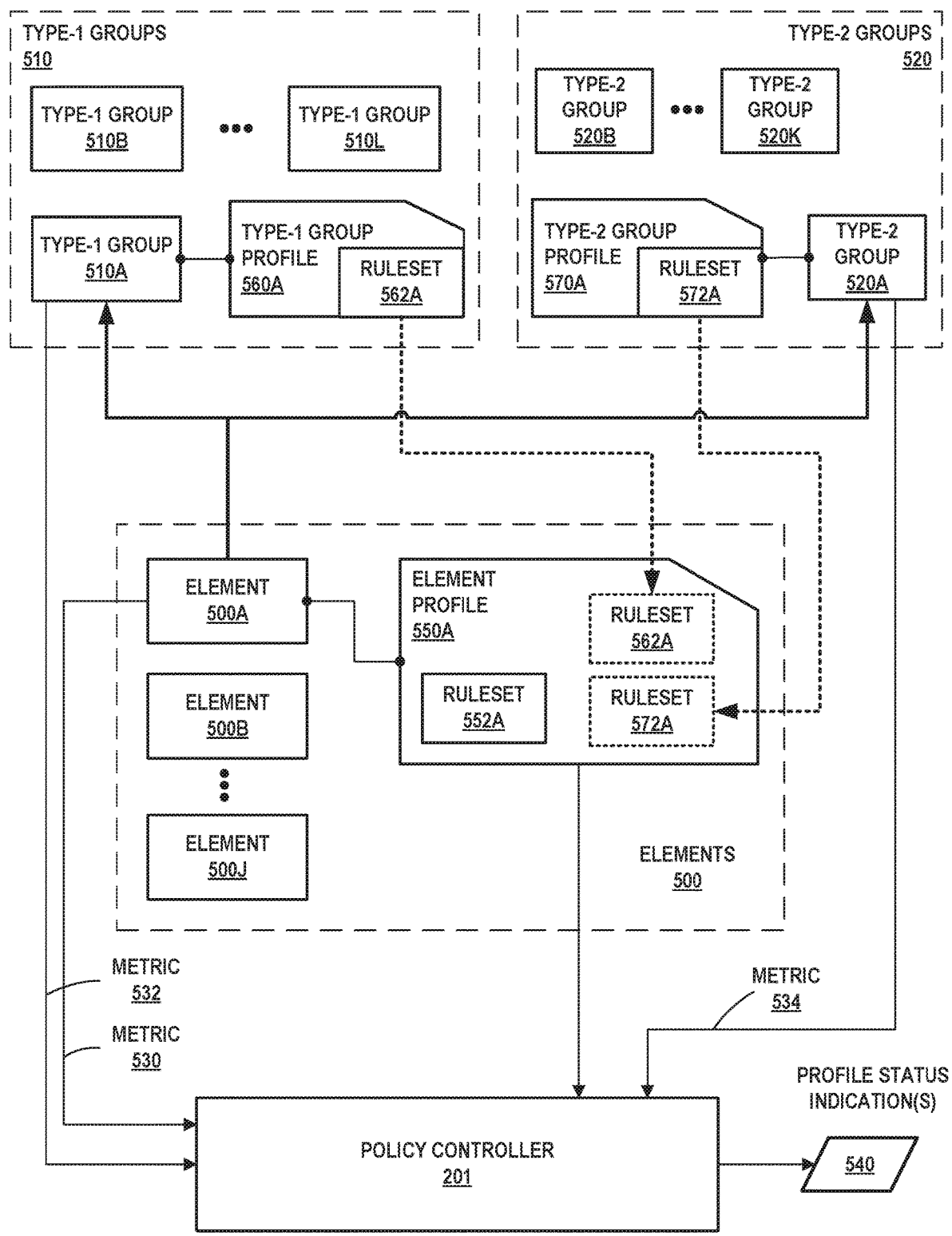
FIGS. 5A-5B are block diagrams illustrating an example profile hierarchy for multiple element and group profiles for multiple types of groups, according to techniques of this disclosure.
Figure 5B:
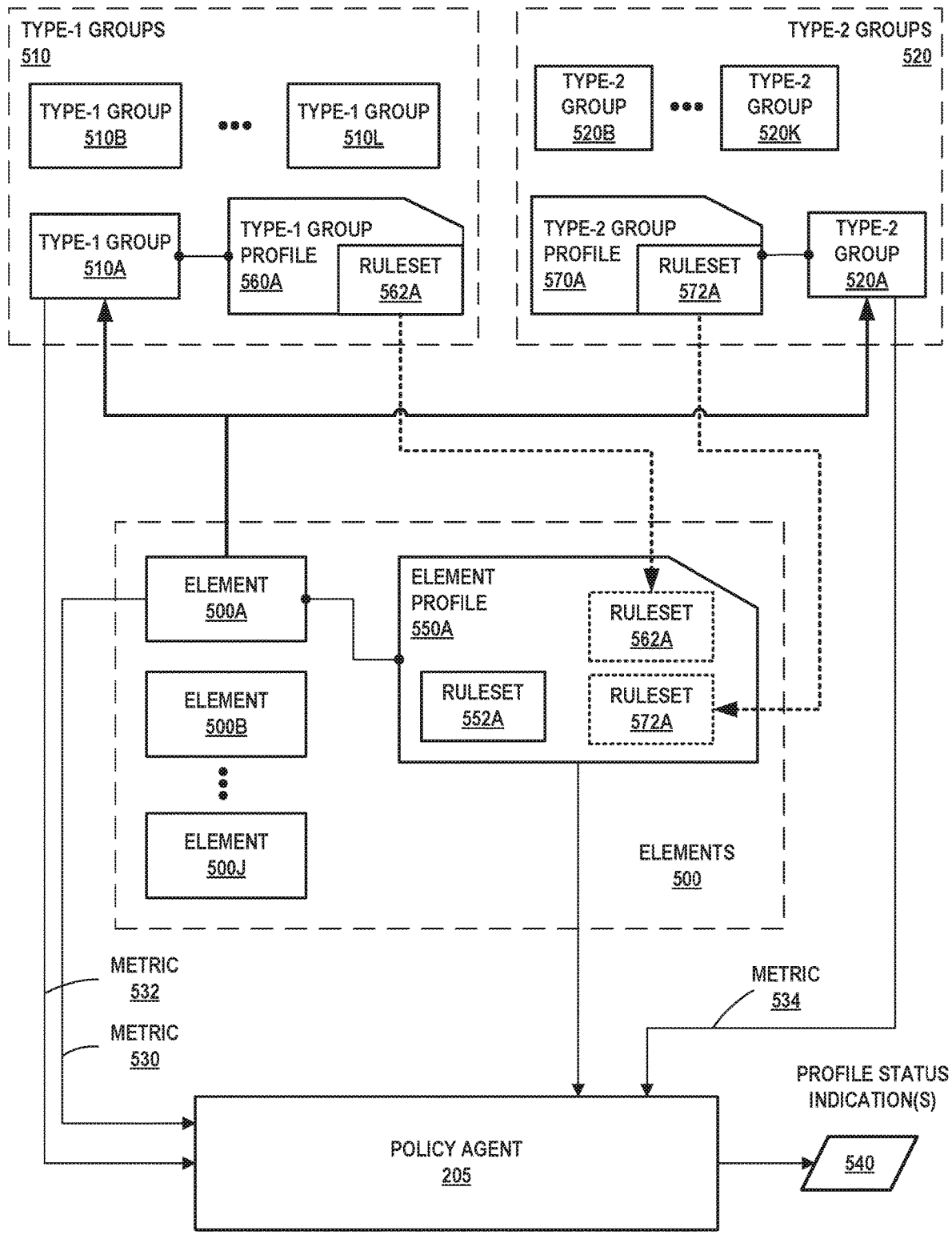

FIGS. 5A-5B are block diagrams illustrating an example profile hierarchy for multiple element and group profiles for multiple types of groups, according to techniques of this disclosure. Elements 500A-500J ("elements 500") consumes resources that are sources for alarm data. Example elements may include hosts, network devices, instances, and services. Each of elements 500 is associated with an element profile configured by a user or administrator for the element. The illustrated example depicts an element profile 550A for element 500A. An element profile 550 may represent an example instance of any of profiles 213 and is a collection of monitoring alarms that are evaluated to determine whether the performance of the corresponding element 500 meets criteria defined for the alarms.

Type-1 Groups 510A-510L ("Type-1 Groups 510") are each a data structure that associates one or more elements 500. Type-2 Groups 520A-520L ("Type-2 Groups 520") are each a data structure that associates one or more elements 500. A single element 500 may be a member of one or more Type-1 Groups 510 and one or more Type-2 Groups 520. Type-1 and Type-2 denote different types of groups that elements may be members of. Types of groups may include aggregates (e.g., host aggregate, instance aggregate, network device aggregate, network device interface aggregates), a virtual network, a virtualized network function (VNF) or collections of VNFs, a network service chain. Other type of groups may include an OpenStack or other project that is assigned a collection of instances, a Kubernetes Pod, a Kubernetes namespace, a Kubernetes replication controller, a Kubernetes service. Other types of groups may include a group of one or more services executing by an OpenStack instance, such services including for example RabbitMq, MySQL, Nova, and Neutron services. Type-1 and Type-2 may be any different, combination selected from the above examples, or other examples not specifically mentioned herein.

Examples of OpenStack style systems projects may include:

1. A specific application example Database Project assigned 10 virtual machines, with some users having access to the project. Eight of the virtual machines may have one functionality, e.g., maintain the data read/writes for the Database Project and two of the virtual machine may have another functionality, e.g., metadata or backup related tasks.

2. A VNF Pool to provide a virtualized networking service such as a Virtual Firewall service.

3. A combination of applications, e.g., a Database may be assigned 10 virtual machines, a MessageBus may be assigned 10 virtual machines owned by a team.

4. A hybrid model of instance use case in which a single virtual machine can be used by different applications, such as a collocated tier of ten virtual machines which have both the Database and MessageBus application running.

Different entities may configure the different Type-1 Groups 510 and Type-2 Groups 520. For example, a data center 110 administrator may configure Type-1 Groups 510 and a user(s) may configure Type-2 Groups 520.

One or more Type-1 Groups 510 may have corresponding Type-1 Group profiles 560. Type-1 Group profile 560A is a profile for Type-1 Group 510A. One or more Type-2 Groups 520 may have corresponding Type-2 Group profiles 570. Type-2 Group profile 570A is a profile for Type-2 Group 520A. Only one Type-1 Group profile 560 and one Type-2 Group 570 is illustrated for clarity.

Each profile 550, 560, 570 is a collection of alarms that are evaluated to determine whether the corresponding element or group meets user-defined criteria for the resource metrics monitored by the alarms. Alarms of a profile may be organized into groups called rulesets. A profile may have one or more rulesets. A ruleset contains a set of one or more alarms and respective assigned weights for the alarms. The ruleset also includes a threshold value. To determine if a ruleset of a profile is active, policy controller 201 or policy agent 205 computes a weighted sum over all of the active alarms in the ruleset. If the weighted sum is greater than or equal to the threshold, the ruleset is active. A profile is considered active if any of its constituent rulesets is active. FIG. 5A depicts an example in which the policy controller 201 evaluates profiles, while FIG. 5B depicts an example in one or more policy agents 205 evaluate profiles. In some cases, both policy controller 201 and policy agents 205 may evaluate profiles are different levels of the profile hierarchy.

In some examples, a profile is a data structure (such as a bag, set, or table) that has a scope, type, unique profile identifier, and or more rulesets. An example schema for a profile is as follows:

Profile:
    Scope: <string>
    Type: <string>
    UniqueId: <uuid>
    Rulesets: <list of ruleset objects>

Scope is defined above and denotes the type of element or group to which the profile applies, e.g., a host, host aggregate, or instance. Type denotes the purpose of the profile, such as for defining and monitoring the health of the corresponding element or group. UniqueId is a unique identifier for looking up and distinguishing profiles. Rulesets and a list of ruleset objects, which are described below.

As noted above, a ruleset contains a set of one or more alarms and respective assigned weights for the alarms. The ruleset also includes a threshold value. An example schema for a ruleset object is as follows:

Ruleset:
    RuleList: <list of alarms>
    WeightList: <list of weights>
    Threshold: <value between 0 and 1>
    RulesetId: <uuid>

RuleList is a list of alarms for the ruleset. WeightList is list of weights that corresponds to the list of alarms in a 1:1 relationship. Threshold is the threshold value used to determine whether the Ruleset is active, which in this example is between 0 and 1 inclusive, but in other examples may be any value. RulesetId is a unique identifier for looking up and distinguishing rulesets.

Policy controller 201 or policy agent 205 may evaluate a ruleset by determining whether each alarm in the ruleset RuleList is active. If an alarm is active, its corresponding weight is added to a sum of the weights for the active alarms in the RuleList. In other words, the weighted sum is a sum of all weights corresponding to active alarms in the RuleList. If the weighted sum is greater than or equal to the threshold, then the Ruleset is active. A profile is active if any of the rulesets of the profile is active.

For example, a Ruleset R1 may be defined as:

Ruleset R1:
    RuleList: [A1, A2, A3, A4]
    WeightList: [0.1, 0.3, 0.4, 0.2]
    Threshold: 0.3
    RulesetObjectId: host1

The RuleList includes 4 alarms—A1, A2, A3 and A4 that are each defined on the element 'host1', as indicated by the RulesetObjectId. Each alarm is assigned a weight as defined in WeightList. The Ruleset has a Threshold of 0.3.

Case 1: At time t1, alarms A1 and A3 are active on element 'host1'. To determine whether ruleset R1 is active, policy controller 201 or policy agent 205 determines:
R1_score=sum(weight of A1, weight of A3)=sum(0.1, 0.4)=0.5
R1_active=(R1_score>=threshold)=(0.5>=0.3)=True Thus ruleset R1 is considered active at time t1. All profiles containing ruleset R1 are also considered active at time t1.

Case 2: At time t2, alarm A4 is the only active alarm on element 'host1'. To determine whether ruleset R1 is active, policy controller 201 or policy agent 205 determines:
R1_score=sum(weight of A4)=0.2
R1_active=(R1_score>=threshold)=(0.2>=0.3)=False Thus ruleset R1 is considered inactive at time t2. All profiles containing ruleset R1 may or may not be active at time t2, depending on the status of other rulesets of the profiles.

In a typical cloud environment, an element has 'member-of' relationships with one or more groups of elements (alternatively referred to as 'parent' elements). For example, an OpenStack host can be a member of several host aggregates. A Kubernetes container can be a member of a pod, a replication controller, a namespace, and several different services. An element that is a member of multiple groups has a profile that is a combination of the profiles of all groups in which it is a member, which policy controller 201 achieves using rulesets.

In response to a user configuring an element as a new member of a group, the policy controller 201 modifies the profile for the element to add all rulesets that are included in the profile for the group. The RulesetId fields in the added Rulesets contains unique identifiers for the group and maintain a distinction between the different rulesets in the element's profile. Thus, in response to a user configuring an element to no longer be a member of the group, policy controller 201 is able to identify the rulesets of the group from the element's profile and removes the identified rulesets.

In the illustrated example, for instance, element 500A may represent a virtual machine "V1" having an element profile 550A that includes ruleset 552A:
Profile_V1:
　Scope: instance
　Type: health
　ObjectId: V1
　Rulesets:
　{/*552A*/
　　RuleList: [VA1, VA2, VA3]
　　WeightList: [0.3, 0.3, 0.4]
　　Threshold: 0.3
　　RulesetObjectId: V1
　}

A user may cause user device UI device 129 to output configuration data to policy controller 201 to add virtual machine V1 as a member to a project "P1" and an aggregate "A1". Project P1 may be a group of Type-I and Type-I Group 510A may represent project P1. Aggregate A1 may be a group of Type-2 and Type-2 Group 520A may represent aggregate A1.

Project P1 as Type-1 Group 510A has the following Type-1 Group profile 560A, including ruleset 562A:
Profile_P1:
　Scope: project
　Type: health
　ObjectId: P1
　Rulesets:
　{/*562A*/
　　RuleList: [PA1, PA2]
　　WeightList: [0.5, 0.5]
　　Threshold: 1.0
　　RulesetObjectId: P1
　}

Aggregate A1 as Type-2 Group 520A has the following Type-2 Group profile 570A, including ruleset 572A:
Profile_A1:
　Scope: aggregate
　Type: health
　ObjectId: A1
　Rulesets:
　{/*572A*/
　　RuleList: [AA1]
　　WeightList: [1.0]
　　Threshold: 1.0
　　RulesetObjectId: A1
　}

Policy controller 201, in response to element 500A being added as a member of both Type-1 Group 510A and Type-2 Group 520A, modifies the element profile 550A to additionally include the rulesets 562A and 572A from profiles 560A and 570A, respectively. The modified profile 550A is, accordingly:
Profile_V1:
　Scope: instance
　Type: health
　ObjectId: V1
　Rulesets:
　{/*552A*/
　　RuleList: [VA1, VA2, VA3]
　　WeightList: [0.3, 0.3, 0.4]
　　Threshold: 0.3
　　RulesetObjectId: V1
　}
　{/*562A*/
　　RuleList: [PA1, PA2],
　　WeightList: [0.5, 0.5]
　　Threshold: 1.0
　　RulesetObjectId: P1
　}
　{/*572A*/
　　RuleList: [AA1]
　　WeightList: [1.0]
　　Threshold: 1.0
　　RulesetObjectId: A1
　}

Policy controller 201 may distribute profile 550A to policy agents 205. Policy controller 201 or policy agent 205 evaluates the alarms of the rulesets 552A. 562A, and 572A, and determine profile 550A to be active if any one of the rulesets 552A. 562A, and 572A is active. Additionally, policy controller 201 or policy agent 205 evaluates the alarms of the rulesets of Type-1 Group profile 560A and Type-2 Group profile 570A to determine whether profiles 560A, 570A are also active. For example, if ruleset 562A is active, then both profiles 550A and 560A are active. More specifically, if alarms PA1 and PA2 of ruleset 562A are active, Type-1 Group profile 560A is active as well as profile 550A for element 500A. The Type-2 Group profile 570A is not active at least due to ruleset 562A, for ruleset 562A is not included in Type-2 Group profile 570A.

Rulesets 562A, 572A added to an element profile may include alarms to be applied to usage metrics of one or more resources consumed by the element. For example, ruleset 562A may include alarms having conditions based on cpu.usage and memory.usage for an instance. In evaluating ruleset 562A for element 500A that is an instance of a virtual machine, policy controller 201 or policy agent 205 evaluates the alarms based on the cpu.usage and memory.usage for the virtual machine represented by element 500A. This applies to all elements that are members of Type-1 Group profile 560A.

Policy controller 201 may evaluate alarms of the rulesets 552A, 562A, 572A using usage metrics for the corresponding element or group. For example, alarms of element 500A may be configured for evaluation based on usage metrics 530, alarms of Type-1 Group 510A may be configured for evaluation based on usage metrics 532, and alarms of Type-2 Group 520A may be configured for evaluation based on usage metrics 534. Usage metrics 532 may include metrics for resources consumed by elements that are members of Type-1 Group 510A, and metrics 534 may include metrics for resources consumed by elements that are members of Type-2 Group 520A. In some cases, a group may have a single element 500.

The user may subsequently cause user device UI device 129 to output configuration data to policy controller 201 to remove virtual machine V1 as element 500A from aggregate A1 as Type-2 Group 520A. In response to the removal of element 500A from Type-2 Group 520A, policy controller 201 modifies element profile 550A to remove ruleset 572A of Type-2 Group profile 570A for Type-2 Group 520A. The modified element profile 550A is:

Profile_V1:
  Scope: instance
  Type: health
  ObjectId: V1
  Rulesets:
  {/*552A*/
    RuleList: [VA1, VA2, VA3]
    WeightList: [0.3, 0.3, 0.4]
    Threshold: 0.3
    RulesetObjectId: V1
  }
  {/*562A*/
    RuleList: [PA1, PA2],
    WeightList: [0.5, 0.5]
    Threshold: 1.0
    RulesetObjectId: P1
  }

Policy controller 201 outputs profile status indications 540 to UI device 129, which may display the profile status indications 540 to a user. Policy controller 201 may output profile status indications 540 over a network using a protocol. The profile status indication may indicate the active ruleset(s) and the one or more active alarms that caused the profile to become active.

As described above, the source of the metric collection and the source and alarming for any given rule of the ruleset may be distributed and may not affect the evaluation of the state of a ruleset. The thresholds and values on the metrics can be alarmed based on static or dynamically learnt global thresholds. Thus, user is provided with the flexibility to express various combinations of useful disaggregated rules that can make up the profile for an element or group. For instance, a VNF Pool made up of an instance aggregate or project can set rules based on separate elements to affect its service level. For example, policy controller 201 may receive notification that a profile has been activated and deploy new instances and apply the profile to the new instances. As a result, the profile becomes deactivated because of the additional elements providing additional resources for the alarms.

A profile for an instance aggregate may specify that if a specified percentage of instances in the instance aggregate are unhealthy then an action must be taken based on contextual state transition. Pruning on false alarms or correlations can be made by developing custom services on top of the rulesets providing transition information at the leaves of the profile structure. For example, a user may determine that a profile is activating based on a first ruleset of the profile. However, this first ruleset may be a poor correlation to performance. A policy conditioned on the profile being active may therefore be set to take action only if the profile status indication indicates the profile is active because a second ruleset of the profile is active.

A user may define plugins to policy agent 205 to provide custom metrics for host services that support a VNF Pool; hosts where instances physically run can provide additional information about the state and functionality of a VNF Pool. As a result, custom services may take fine-grained actions based on contextual alarms from the ruleset meant for custom aggregates such that global actions can be applied.

Figure 6:
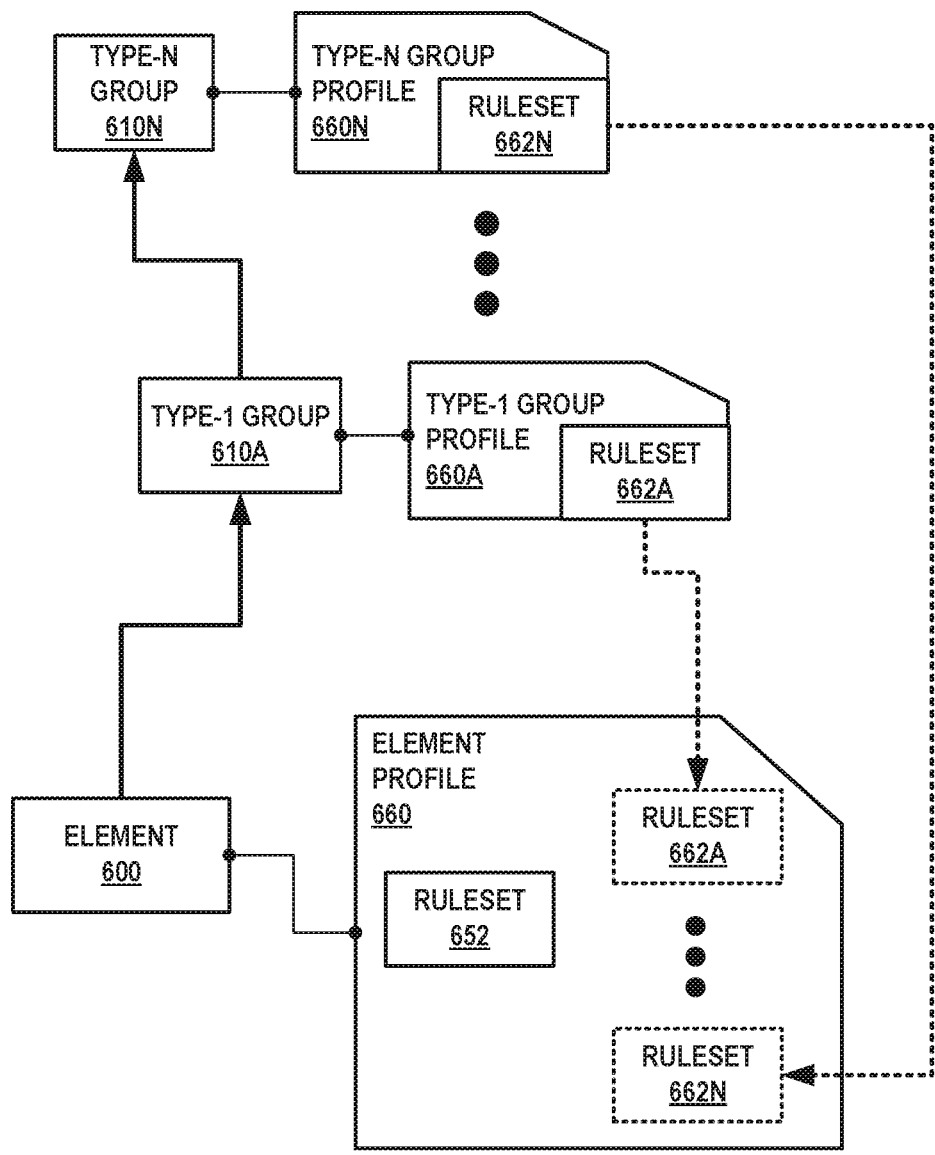
FIG. 6 is a block diagram illustrating an example profile hierarchy for multiple element and group profiles for multiple types of groups, according to techniques of this disclosure.

FIG. 6 is a block diagram illustrating an example profile hierarchy for multiple element and group profiles for multiple types of groups, according to techniques of this disclosure. Element 600 has element profile 660 that includes ruleset 652. Element 600 is a member of Type-1 Group 610A having Type-1 Group profile 660A that includes ruleset 662A. Type-1 Group 610A is a member of Type-N Group 610N having Type-N Group profile 660N that includes 662N. Although only 2 levels of a group hierarchy are illustrated, example hierarchies may include additional levels.

Because Type-1 Group 610A is a member of Type-N Group 610N, either directly or transitively by membership in another group that is a member of Type-N Group 610N, policy controller 201 modifies Type-1 Group profile 660A to include ruleset 662N. Because element 600 is a member of Type-1 Group 610A, policy controller 201 modifies element profile 660 to include the rulesets of Type-1 Group profile 660A, which include rulesets 662A and 662N. Element profile 660 consequently includes rulesets 652, 662A and 662N. In some cases, policy controller 201 may modify "intermediate" profiles to include rulesets from higher-level groups. In the illustrated example, in such cases, policy controller 201 modifies Type-1 Group profile 660A to include ruleset 662N and any other intermediate rulesets from profiles for higher-level groups.

Policy controller 201 or policy agent 205 evaluates whether profile 660 is active based on alarms included in rulesets 652, 662A, and 662N. For example, any of the rulesets may be determined to be active based on usage metrics for element 600 or any other elements that are members of Type-1 Group 610A and Type-N Group 610N.

Policy controller 201 may offer Application Programming Interfaces (APIs) by which a device may access profiles to create, read, update, or delete the profiles. The APIs may be HTTP endpoints accessible at specified URIs to which a user may POST, GET, PATCH, or DELETE HTTP payloads in the form of JSON or XML objects, for instance.

As one example, a user may locally create element profile 660 and store the profile to a device, then POST the created element profile 660 to an HTTP endpoint served by policy controller 201 to remotely create the element profile 660. The following commands perform these operations to create an element profile 660 with multiple rulesets and store the element profile to policy controller 201:

```
$ cat create_profile.json
{
    "AnalyticsScope": "project",
    "AnalyticsType": "health",
    "ObjectId": "eeaalbef3e09494e81a5883b908e8d05",
    "Rulesets": [
    {
        "RuleList":        ["c1be0d70-1bad-11e7-ba0c-
           0242ac120006",
        "abeee74e-1bad-11e7-8a67-0242ac120006" ],
        "WeightList": [0.5, 0.5],
        "Threshold": 1.0,
        "RulesetObjectId":
            "eeaalbef3e09494e81a5883b908e8d05"
    },
    {
        "RuleList":        ["35dfd4a4-1bae-11e7-8a67-
           0242ac120006" ],
        "WeightList": [1.0],
        "Threshold": 1.0,
        "RulesetObjectId":
            "eeaalbef3e09494e81a5883b908e8d05"
    }
    ]
}
$ curl -X POST -H "X-Auth-Token: <token>"-H "Content-
type: application/json"
-d @create_profile.json
http://localhost:9000/appformix/v1.0/analytics_profile
```

The following command performs an operation to obtain an existing profile having multiple rulesets from different parents:

```
$ curl -X GET -H "X-Auth-Token: <token>"
http://localhost:9000/appformix/v1.0/analytics_profile/
d0149212-1bae-11e7-86b4-0242ac120006
    "AnalyticsProfile": {
    "AnalyticsScope": "instance",
    "AnalyticsId":          "d0149212-1bae-11e7-86b4-
0242ac120006",
    "AnalyticsType": "health",
    "ObjectId": "308f0251-f912-456b-b514-e067fc708e23",
    "Rulesets": [
    {
      "Threshold": 1,
      "WeightList": [1],
      "RuleList": ["EI_Heartbeat_Health" ],
      "RulesetObjectId":       "308f0251-f912-456b-b514-
         e067fc708e23"
    },
    {
      "Threshold": 1,
      "WeightList": [0.5, 0.5],
      "RuleList": [
         "c1be0d70-1bad-11e7-ba0c-0242ac120006",
         "abeee74e-1bad-11e7-8a67-0242ac120006"
      ],
      "RulesetObjectId":
         "eeaalbef3e09494e81a5883b908e8d05"
    },
    {
      "Threshold": 1,
      "WeightList": [1],
      "RuleList":        ["35dfd4a4-1bae-11e7-8a67-
         0242ac120006" ],
      "RulesetObjectId":
         "eeaalbef3e09494e81a5883b908e8d05"
    }
    ]
}
```

In general, APIs for profiles are able to accept a profile definition once. However, as users modify membership of the corresponding elements or groups in other groups, policy controller 201 dynamically modifies the profiles. For instance, a user may delete two instances and add four new instances to an aggregate or project. The profile, more specifically rulesets, for the aggregate or project are applied to the profiles for the 4 new instance and evaluated.

The source of the metric generation, the alarming condition identification, the capability to dynamically learn the baseline are taken care of prior to evaluating the ruleset and rulelist for profiles. This may provide an advantage over other systems that centrally aggregate metrics and process policy and membership using a central data store, which may require allocating a large amount of resources to get the required signals needed for generating the same service level signals needed for health and risk that are provided using the monitoring alarm and profile techniques described herein.

Figure 7A:
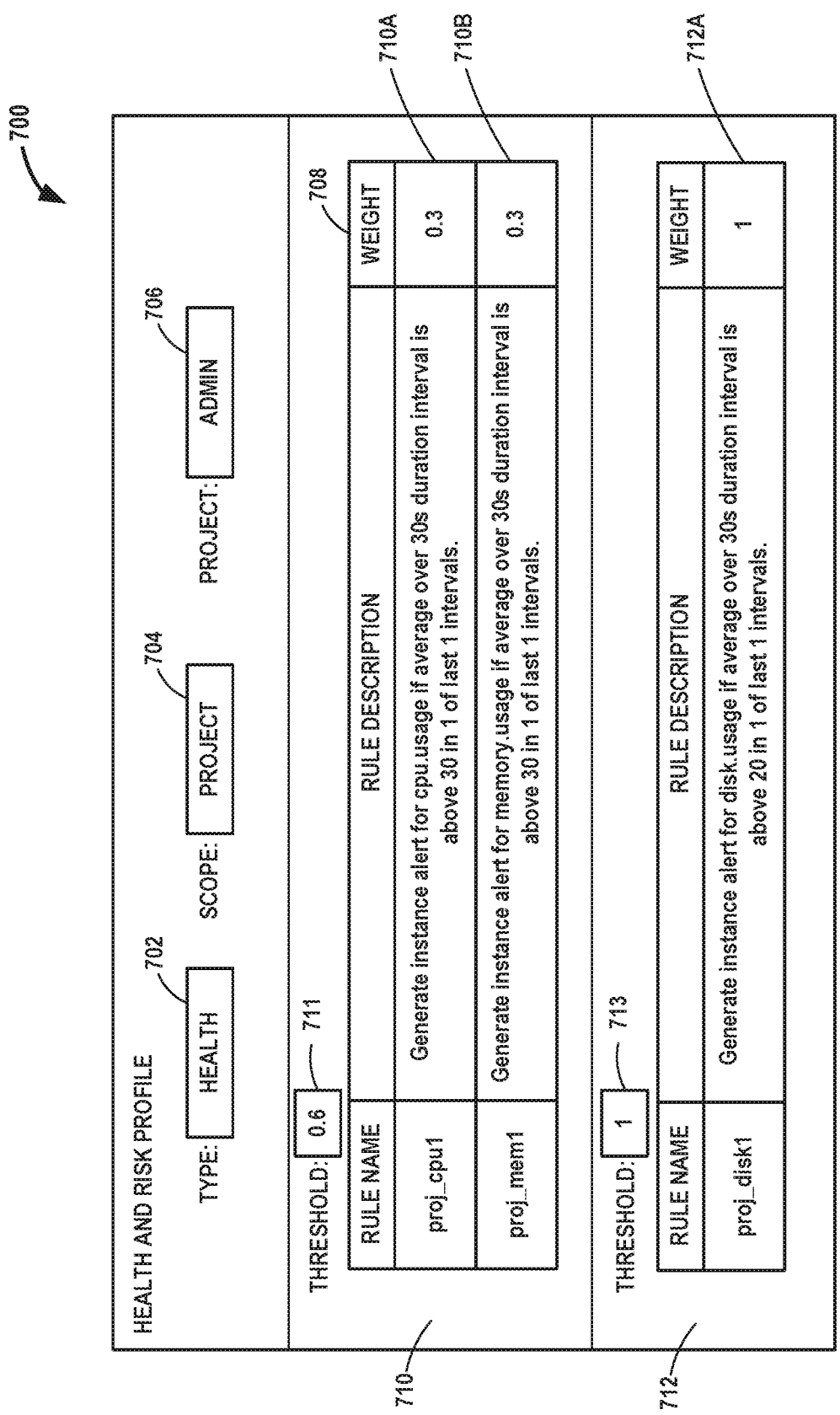
FIGS. 7A-7B depict example user interfaces output for display by a user interface device, according to techniques of this disclosure.

FIG. 7A is an example user interface output by a user interface device, for receiving and displaying a profile, according to techniques described in this disclosure. A user interface device 129 may output, to a display device, user interface 700 for display to a user. User interface 700 in this example displays a profile for a group having a project type. User interface elements 702, 704, and 706 indicate that profile is for monitoring a health of the project, has a project level scope, and is named "ADMIN", respectively.

The displayed profile has two rulesets 710 and 712 indicated in respective user interface areas of the user interface 700. Ruleset 710 has two rules 710A-710B each having a corresponding weight 708. Ruleset 710 has a threshold indicated by user interface element 711. Ruleset 712 has one rule 712A having a corresponding weight 708. Ruleset 712 has a threshold indicated by user interface element 713.

A user of user interface device 129 interacts with user interface 700 to modify the profile to add, remove, or modify rulesets of the profile.

Figure 7B:
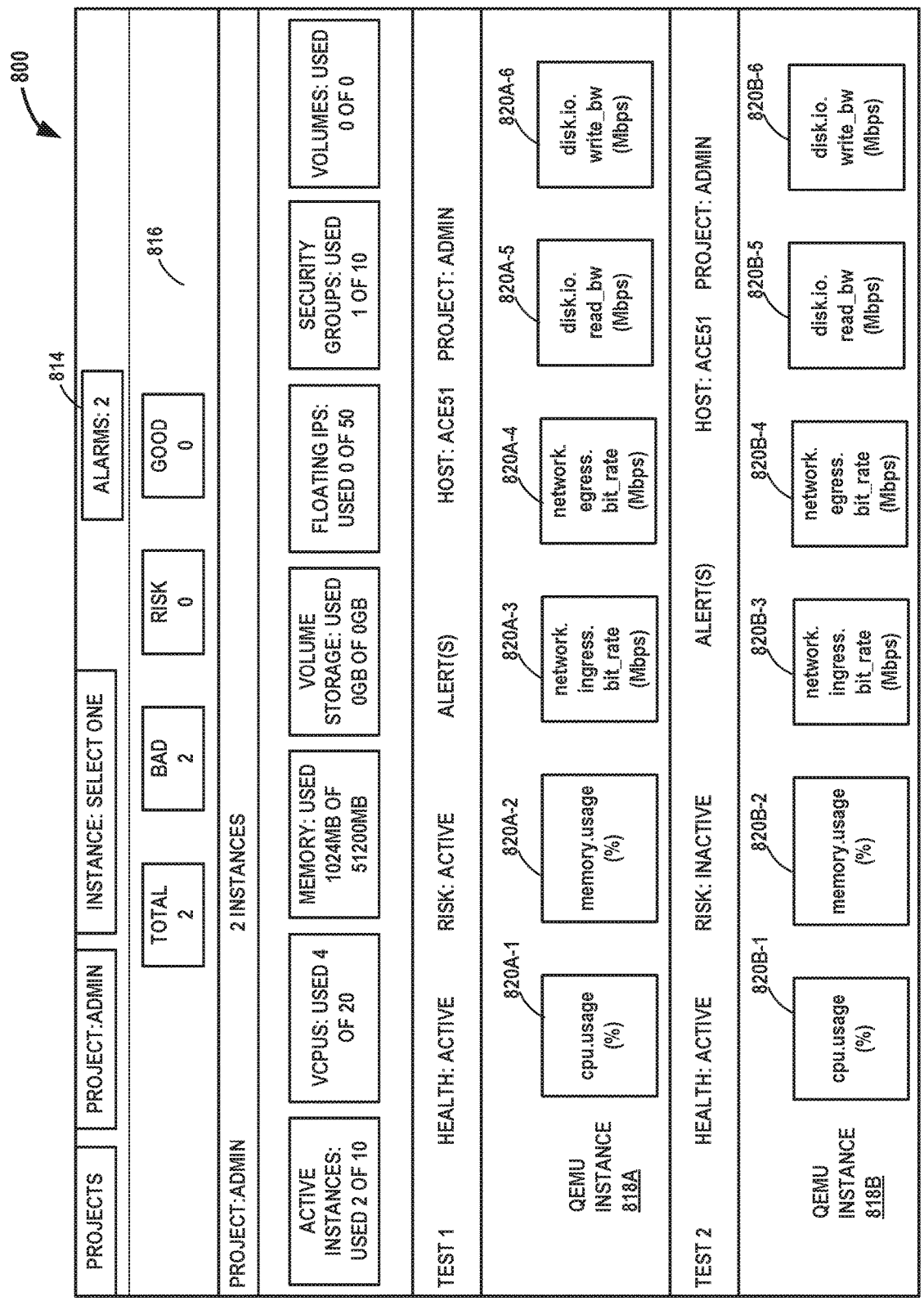

FIG. 7B is an example user interface output by a user interface device to display profile status indications, according to techniques of this disclosure. A user interface device 129 may output, to a display device, user interface 800 for display to a user. User interface 800 displays usage metrics for two instances 818A-818B. User interface elements 820A-1-820A-6 display usage metrics for instance 818A and user interface elements 820B-1-820B-6 display usage metrics for instance 818B.

User interface 800 indicates an overall health of project "ADMIN" and the health of the project's members, instances 818A-818B. Instances 818 may be considered elements and added by a user to a group for the project. The project has an associated profile that includes a ruleset with alarms for each of the resource metrics cpu.usage, memory.usage, network.ingress.bit_rate, disk.io.read_bw, and disk.io.write_bw. Because instances 818 are members of the project, the respective profiles "Test1" and "Test2" for instances 818A-818B each includes the ruleset of the project and displays the metrics via user interface elements 820, at least in some cases in real time. In addition, user interface 800 displays an indication of whether the profiles are active or inactive. In this example, a health profile and risk profile for "Test1" are indicated as active. A health profile for "Test2" is indicated as active and a risk profile for "Test2" in indicated as inactive. User elements 816 display a number of members (herein, instances) of the project that exist ("total"), are active ("bad"), are at risk ("risk"), and are inactive ("good"). Here, both instances 818 are active and thus there are 2 "bad" or unhealthy instances.

Figure 8:
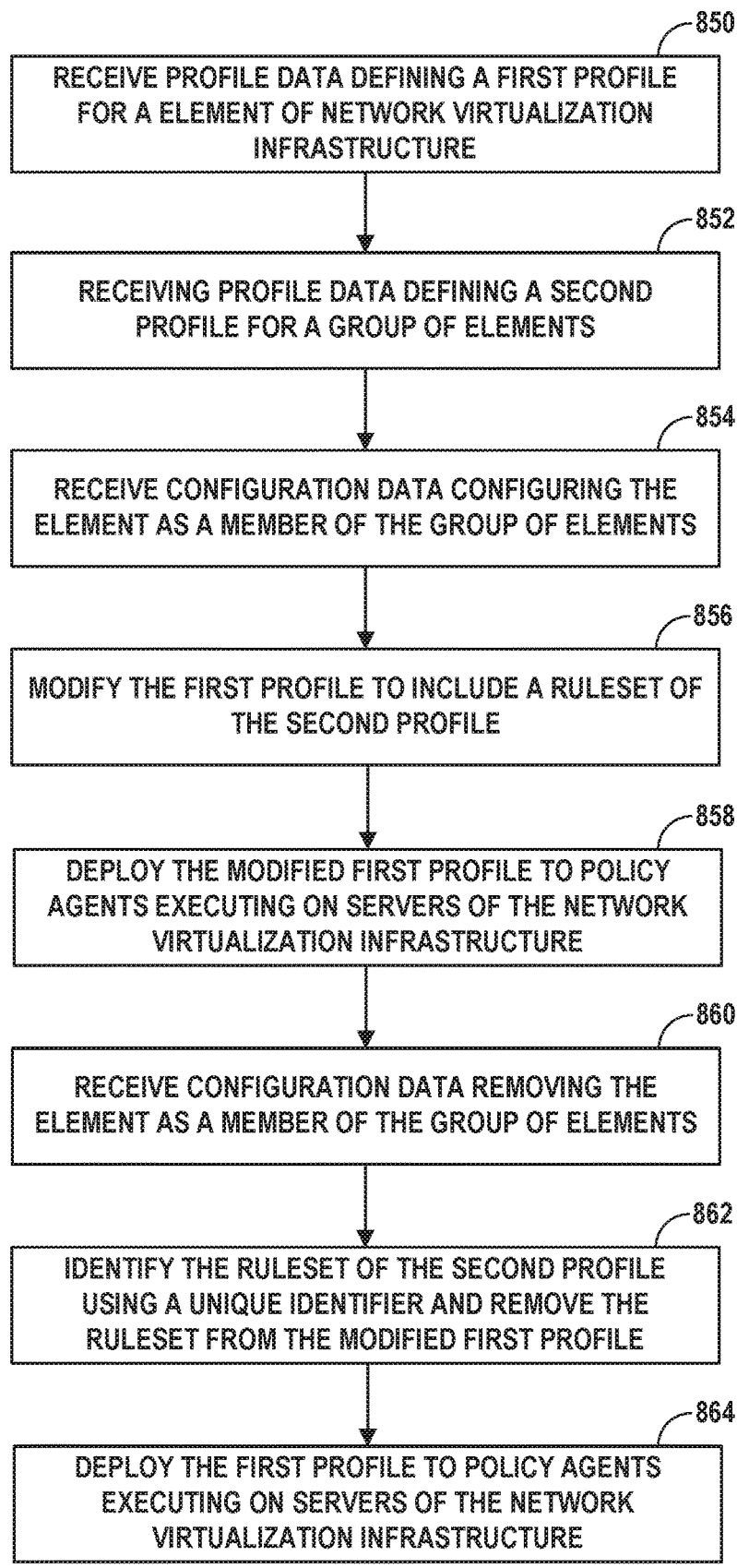
FIG. 8 is a flowchart illustrating an example mode of operation for a computing system, according to techniques of this disclosure.

FIG. 8 is a flowchart illustrating an example mode of operation for a computing system, according to techniques of this disclosure. Policy controller 201 receives or otherwise obtains profile data from a user interface device 129, the profile data defining a first profile for an element of virtualization infrastructure (850). The first profile includes a ruleset having one or more alarms. Policy controller 201 further receives or otherwise obtains profile data from a user interface device 129, the profile data defining a second profile for a group of elements (854). In response to receiving configuration data, from a user interface device 129, configuring the element as a member of the group (854), the policy controller 201 modifies the first profile to include the ruleset from the second profile and thereby generates a modified first profile (856). Policy controller 201 deploys the modified first profile to policy agents 205 of servers 126, which apply the modified first profile (856) to usage metrics associated with resources consumed by the element (858).

Policy controller 201 subsequently receives, from a user interface device 129, configuration data removing the element as a member of the group (860). The ruleset from the second profile includes a unique identifier among rulesets of profiles 213. The unique identifier is included in the ruleset added to the first profile in step 856. Using the unique identifier from the ruleset from the second profile and in response to the configuration data removing the element as a member of the group, policy controller 201 identifies the ruleset in the modified first profile and removes the ruleset to revert to the first profile (862). Policy controller 201 deploys the modified first profile to policy agents 205 of servers 126, which apply the first profile to usage metrics associated with resources consumed by the element (864).

Figure 9A:
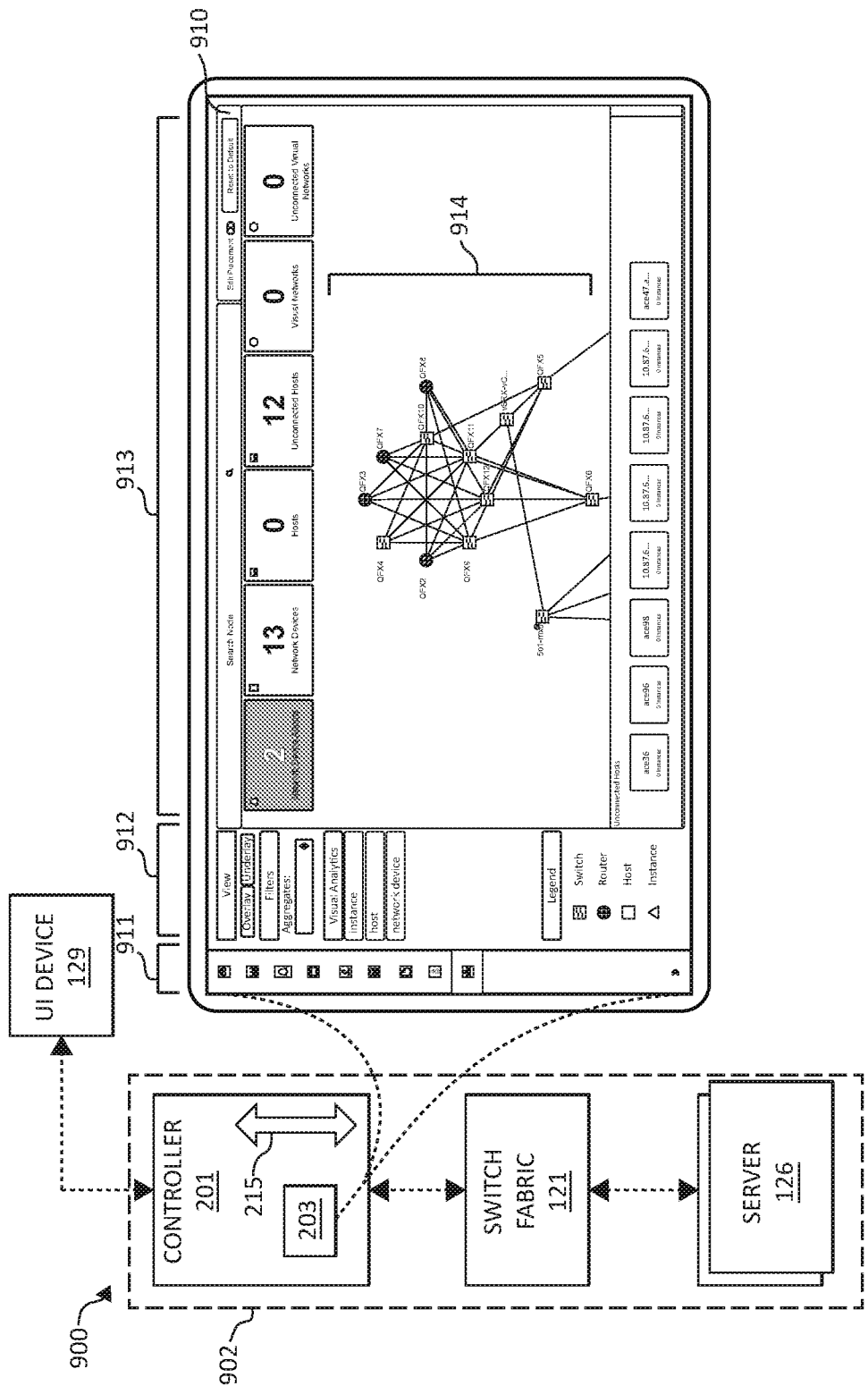
FIG. 9A is a block diagram of an example network in which a controller manages servers or compute nodes and provides a visualization of a computer network topology through a dashboard in accordance with one or more aspects of the present disclosure.

FIG. 9A is a block diagram of an example network 900 in which a controller 201 manages servers or compute nodes and provides a visualization of a computer network topology through a dashboard 203 in accordance with one or more aspects of the present disclosure. In the example illustrated in FIG. 9A, controller 201 is shown as part of cluster 902. In other examples, however, controller 201 is not part of cluster 902, and in such an example, "cluster 902" refers to the nodes but not the controller. Cluster 902 of FIG. 9A may represent a cloud-based computing network and/or a computing domain or project, or other types of computing clusters. Where cluster 902 of FIG. 9A represents a cloud environment, such a cloud environment may be an OpenStack cloud environment or a Kubernetes cloud environment. Cluster 902 may be distributed across multiple environments, such as different data centers.

Controller 201 may operate in the manner described and illustrated in connection with FIG. 1 and/or FIG. 2. For instance, in some examples controller 201 may interact with monitoring agents (not shown in FIG. 9A) that are deployed within one or more of servers 126 (i.e., hosts or compute nodes) for monitoring resource usage of the servers or physical compute nodes as well as any virtualized host or instance, such as VMs or containers, implemented on one or more compute nodes. As described herein, the monitoring agents within cluster 902 may gather and publish information on message bus 215 about a computer network topology, which may include physical devices included in switch fabric 121 and additional virtual devices that couple servers 126. The monitoring agents may provide distributed mechanisms for collecting a wide variety of information related to the computer network topology coupling servers 126, and provide the information to controller 201. Information related to the computer network topology may also be provided via user inputs to the controller 201, for example user provided information related to devices added to or removed from switch fabric 121.

Dashboard 203 may be implemented in the manner described and illustrated in connection with FIG. 1, FIG. 2, and/or FIGS. 3A-3B. As described in connection with FIG. 1, dashboard 203 may be created, updated, and/or maintained primarily by controller 201 and/or by a dashboard module executing on policy controller 201. As illustrated in FIG. 9A, controller 201 may generate dashboard 203, which may represent a collection of user interfaces (e.g., including user interface 910) that provide information about topology, structure, hierarchy, utilization, and/or metrics associated with infrastructure elements. Dashboard 203 constructs and outputs a user interface screen, e.g., user interface 910 for display by UI device 129. In the example of FIG. 9A, user interface 910 includes a set of application icons arranged in an application selection area 911, a view control area 912, and a main display area 913. A graphic representation of a computer network displayed within the main display area 913 and generally indicated by bracket 914 corresponds to infrastructure elements (e.g., routers, switches, hosts, instances, projects, virtual or physical network devices) within network 900, and may be arranged within user interface 910 to illustrate network topology, hierarchy, parent/child relationships, or other relationships or configurations. In addition, one or more of infrastructure element representations provided in main display area 913 may include an indicator (e.g., a color or other visual indicator) that provides information about utilization, metrics, health, condition, and/or other status information relating to infrastructure of network 900. For instance, in some examples an indicator that is red might represent a high utilization, an indicator that is green might represent a low utilization, and an indicator that falls into neither category might be represented in another way or with a different color (e.g., yellow, orange, a shade of grey, or no color).

In some examples, controller 201 may, in response to input from a user (e.g., interactions with view control area 912 within user interface 910), generate or update user interfaces within dashboard 203 so that infrastructure elements are filtered by devices type, interconnections, health, risk, aggregate, project, network (virtual or physical), type, and/or in other ways. In such examples, a filter may cause some infrastructure elements to be hidden within dashboard 203 or a user interface of dashboard 203, while presenting other infrastructure elements within dashboard 203. Filters may be applied using functional paradigms. For example, each filter may correspond to a function, so that for a given set of "x" resources, elements, or other items to be filtered, and filter functions "f" and "g," application of the filter may compute f(g(x)). Where filters follow functional paradigms, applying filters in a different order (e.g., g(f(x))) will have the same result. In some examples, some or all of filter functions are pure, so that no state information outside of the function's context is changed. Every time a filter value (or other user interface component) is changed, controller 201 may apply an appropriate filter to all the resources in a resource hash table, and then reassign the resource array to the resultant array. Filters may be applied and/or reapplied when an interaction with user interface 910 is detected, when one or more infrastructure element representations within main display area 913 are selected or changed, when metric data is received by controller 201, and/or in other situations.

In some examples, as part of generating user interface 910 controller 201 applies one or more algorithms to a list of devices, for example a list of physical devices included in switch fabric 121, to arrange graphic symbols representative of the physical devices into a particular placement relative to one another for display. The display of the arrangement of the physical devices as provided within the main display area 913 includes a graphic representation, e.g., a set of graphic lines, illustrative of the interconnections between some or all of the devices as a visual representation of the computer network topology.

Historically, a graphical depiction of the devices included within a particular computer network may be illustrated in a hierarchical manner comprising a plurality of rows of symbols representing the devices of the computer network. Each row comprises a set of graphic symbols representative of a set of same-type devices, the graphic symbols arranged adjacent to one another in the row and extending in a horizontal direction (e.g., in a left to right orientation) across the graphical depiction. One or more additional rows including additional devices within each of the additional rows and representing different types of devices relative to the types of devices included in any of the other row may be arranged to extend across the graphic depiction in a same horizontal direction. These individual rows may be further arranged so that the individual rows are stacked vertically one above the other in a hierarchical manner. The physical devices themselves may be graphically illustrated using symbols representative of the type of device being depicted by the graphic symbol, with the interconnections between the devices often being graphically represented by individual lines extending between the graphic symbols representing the interconnections between these devices.

Some problems with this above-described format for graphic representations of computer network topologies include that as the number of devices of a same-type in a given computer network becomes large, the length of the row or rows including these same-type devices may extend beyond the width of a single screen of a display device being used to display the computer network topology. This results in the need to scroll the display back and forth in order to display the symbols depicting one or more devices of the computer network that may not be currently displayed on the screen. In addition, the graphical depictions of the interconnects between graphic symbols representing the physical devices in some instances may extend off the display because the device interconnect is coupled to, at least at one end of the interconnect, a graphic symbol that is not currently being displayed on the screen. Further, this format for a graphic display of a computer network topology based on rows makes adding new devices, and thus the need to insert a new graphic symbol into the graphic depiction, a difficult process as the placement of the graphic symbol within a row of same-type devices can create issues with the routing of the additional interconnects from the added symbol representing the new device while trying to maintain a compact and easy to understand and visualize set of interconnects within the graphic depiction.

The techniques for generating and displaying a graphic user interface for a computer network topology as described in this disclosure may overcome these and other problems in a variety of ways. For example, the techniques further described in this disclosure include radial arrangements of the graphic symbols representing the physical devices and/or virtual devices of a computer network. The radial arrangements of the graphic symbols of the devices includes having the graphic symbols arranged in one or more circular arrangements, the number of circular arrangements in some examples depending on a variety of factors including the total number of devices that are to be depicted by the graphic user interface and a total number of positions available for each circular arrangement. In some examples, a plurality of circular arrangements, each circular arrangement having a predetermined number of positions for locating graphic symbols representing physical and/or virtual devices, may be arranged in the form of concentric circles including an innermost circular arrangement surrounded by one or more additional circular arrangements. The determination as to which devices are to be positioned around the innermost circular arrangement may be made based on placing the graphic symbols representing the devices having the largest number of interconnects to other devices at the positions provided around the innermost circular arrangement. Once the available positions around the innermost circular arrangement are filled, graphic symbols for any remaining devices having a smaller number of interconnects with other devices may be placed around positions located on the additional circular arrangements that surround the innermost circular arrangement.

By placing the graphic symbols in these circular arrangements, the graphic lines representing the interconnects between these devices may be arranged to extend through the interior area or areas formed by the circular arrangement(s), thus providing a more compact and easy to visualize depiction of the interconnects between the devices. In addition, by placing the graphic symbols for the devices having the largest number of interconnects at the positions provided by the innermost circular arrangement, the number of instances where a graphic line representing an interconnection between devices potentially "collides" with a third graphic symbol representing a devices not included in the interconnection, and thus requiring repositioning of the graphic symbols for the interconnected devices, may be minimized.

In addition, graphic symbols for devices having at least one connection to a host of the computer network being modeled may be arranged to occupy positions of the outermost circular arrangement, and may be placed at positions along a predefined portion of the outermost circular arrangement. For example, graphic symbols representing devices having a direct interconnection with at least one host of the computer network may be positioned at a lower portion of the outermost circular arrangement (e.g., positions including or between the 5 and 7 o'clock positions of the outermost circular arrangement if the circular arrangement(s) included in the graphic user interface is/are considered as having positions defined by the numbering associated with an analog clock face). Placement of the graphic symbols representing devices directly coupled to at least one host at particular positions of an outmost circular arrangement allows the graphic symbols for the corresponding host or hosts to be place in proximity to these graphic symbols outside the area of the outermost circular arrangement. The placement of the graphic symbols for the host(s) in conjunction with the placement of the devices directly coupled to these host(s) further simplifies and reduces the visual complexity of the graphic depictions, such as the graphic lines, added to the user interface to represent these interconnections between the host or hosts and other devices included in the computer network being modeled.

The systems, devices and methods as described in this disclosure allow the generation of these graphic user interfaces using one or more algorithms to perform processes to sort and arrange a list of devices included in a computer network to be modeled. For example, after accessing a list of devices (physical devices and/or virtual devices) included in a particular computer network, the physical devices may be sorted into a first group that includes devices that are directly connected to at least one host, and a second group of devices that are not directly connected to any host (although they may be connected to a host through one or more other devices). The devices in the second group (devices not directly coupled to at least one host) may be further sorted into a ranked listing based on the number of connections between each device in the second group and all other devices within the second group.

Using the ranked listing, the devices of the second group are bucketed into one or more bins. The number of devices allocated per bin may correspond to the total number of predefined positions for a radial arrangement associated with each bin, respectively. For example, the number of devices allocated to a first bin may correspond to the number of positions provided by a first and innermost radial arrangement provided by the graphic user interface being configured to render a visual display of the computer network topology. If additional devices still remain after allocating one device from the second group of devices to each of the available positions of the first radial arrangement, the process continues by allocating devices to a second bin. The number of devices allocated to the second bin may be defined by the number of available positions provided by a second radial arrangement formed in an arrangement surrounding the first radial arrangement and that may be positioned to be concentric to the first radial arrangement. The process of allocating devices to additional bins based on the number of positions available for each of the corresponding additional radial arrangements continues until each of the physical devices in the second group have been assigned to a bin.

Once all devices form the second group have been bucketed into a bin and are placed at one of the positions provided by the radial arrangements associated with the bin the device has been bucketed into, the routing of a set of interconnects between the physical devices may be added, for example by generating graphic lines extending across the interior areas surrounded by the radial arrangement(s) and to the graphic symbols representing the respective interconnected devices. In addition, any of the graphic symbols representing a device having at least one connection to a host may be positioned for example at the lower side positions of the outmost radial arrangement included in the graphic user interface. Additional graphic lines may be generated that extend between these devices and the host or hosts these devices are directly interconnected with, the graphic lines routed within the graphic user interface to illustrate these additional interconnections.

Examples of the graphic user interfaces described in this disclosure may include additional information, such as text boxes including various statistics associated with the computer network, such as total number of network (physical) devices, a total number of hosts (connected and/or unconnected) to the computer network, and total number of virtual networks (connected and/or uncommented) to the computer network that is being depicted by the graphic user interface. Additional information, such as a legend illustrating the types of devices and the corresponding graphic symbols being illustrated by the graphic user interface at any given time may also be provided as part of the information being displayed as part of a graphic user interface.

Although the graphic symbols as described throughout this disclosure may relate to physical devices comprising the computer network being modeled by the graphic user interface, the representations included in the examples of graphic user interfaces are not limited to only physical devices. Graphic symbols as described in this disclosure may also include graphic symbols representing virtual entities, such as virtual servers, virtual router, and/or virtual instance of other computer/software entities that may have connections to one or more physical devices and/or to other virtual entities that may be graphically rendered and visually represented in a graphic user interface according to any of the examples described in this disclosure.

The graphic user interfaces described in this disclosure, and any equivalents thereof that may be generated and displayed using the systems, devices and methods described herein, provide a visual tool that may allow a user, such as an information technology (IT) professional or a technician to quickly and efficiently model, visualize, and update the topology associated with an existing computer network, or for performing these same or similar functions for a proposed computer network.

Figure 9B:
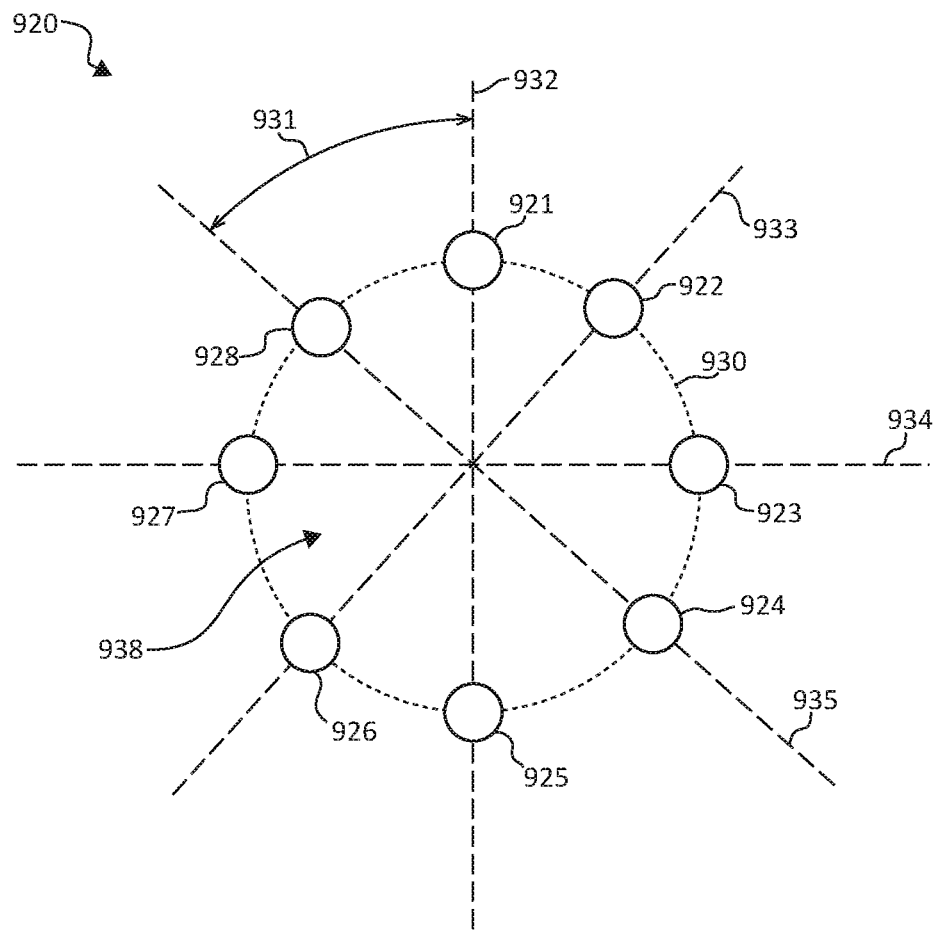
FIG. 9B is a conceptual diagram of a radial arrangement that may be utilized to determine the placement of graphic symbols generated by a dashboard as a graphic user interface in accordance with one or more aspects of the present disclosure.

FIG. 9B is a conceptual diagram of a radial arrangement 920 that may be utilized to determine the placement of graphic symbols generated by a dashboard 203 as a graphic user interface in accordance with one or more aspects of the present disclosure. In this example of FIG. 9B, radial arrangement 920 include a plurality of predefined positions 921-928 arranged around a perimeter of circle 930, wherein circle 930 has a center at origin 936. Each of the plurality of positions 921-928 is represented by a shape in the form of a small circle. The small circles representing one of the predefined positions 921-928 in radial arrangement 920 are spaced apart from one another and positioned around the perimeter of circle 930 by a predefined angular value. The predefined angular value is illustratively represented by angle 931 extending between axis 932 that intersects circle 930 at position 921 and axis 935 that intersects circle 930 at position 928.

Each of the plurality of positions 921-928 may be separated from the immediately adjacent positions on both sides of a given position by the same angular value represented by angle 931. Further, each of the plurality of positions 921-928 may lie on an axis, such as one of axes 932, 933, 934, or 935, that intersects circle 930 and passes through the origin 936. As shown in FIG. 9B, each of axes 932, 933, 934, and 935 intersects circle 930 in two places along the perimeter of circle 930, each point of intersection corresponding to one of the plurality of positions 921-928. In addition, a radius 937 extending between origin 936 and any point along the perimeter of circle 930 may have a dimensional value determined by one or more of the algorithms used to determine the placement of the positions associated with positions 921-928.

Using radial arrangement 920 as an illustrative example, circle 930 is predefined to include eight total positions. The angular value for angle 931 may be determined by dividing the three-hundred sixty degrees of circle 930 by the total number of available positions, e.g., in this example eight positions. The resulting value of forty degrees (360 degrees/8=40) is then applied by the algorithm(s) as the value for the angular separation used to space each of positions 921-928 relative to one another around the perimeter of circle 930. However, the angular spacing provided between any two of positions 921-928 may be further adjusted, for example automatically adjusted by the algorithm(s), to allow for other graphic symbols, such as lines showing interconnections between the positions or between the positions and other devices rendered in a user interface, in order to avoid "colliding" with or otherwise intersections with graphic symbols not directly or otherwise coupled together.

Each of positions 921-928 may be assigned to a particular graphic symbol (not shown in FIG. 9B) that represents a type of device, such as a physical device (e.g., a router, a switch) or a virtual device included in the computer network being modeled using the radial arrangement 920. Again by way of an illustrative example, a list of devices to be displayed using the radial arrangement 920 may include no more than eight network devices, three of which are directly interconnected to one or more hosts. An algorithm used to assign the devices to the available positions 921-928 may first filter the devices into a first group comprising any of the devices that are directly coupled to at least one host, and a second group comprising any of the devices that are not directly coupled to at least one host. In this illustrative example, the three devices that are directly coupled to at least one host are assigned to positions along the lower portion of circle 930. The positions in some examples would be positions 924, 925, and 926 in radial arrangement 920. By placing the devices that have direct connections to at least one host in these lower positions, the algorithm can include graphic symbols for the host or hosts (not shown in FIG. 9B) in an arrangement below radial arrangement 920, and thus minimize the number of potential interferences and reduce the visual complexity of the graphic depictions of the interconnections extending between the devices located at positions 924, 925, and 926 and the graphic symbols for the host or hosts coupled to these devices.

Continuing with the illustrative example, the algorithm may then determine which of the remaining positions are to be assigned to each of the remaining five devices that are not directly coupled to at least one host. In some examples, devices that have the largest number of connections to another device are located next to each other in adjacent positions relative to the remaining positions 921-923 and 927-928 within radial arrangement 920. Based on the assignment made by the algorithm for these remaining devices, each position 921-928 is "filled" with a graphic symbol that represents the type of deceive being placed at that position of the radial arrangement 920. Once all of the graphic symbols for the eight devices have been assigned to a position, respectively, of positions 921-928, a set of graphic lines (not shown in FIG. 9B) may be routed between the positions. The set of graphic lines visually represent the respective interconnections between the devices as they exist in the computer network. In the example shown in FIG. 9B, any of these graphic lines interconnecting the graphic symbols placed at positions 921-928 would extend across the interior space 938 of circle 930, so that each graphic line couples one of the graphic symbols to one other graphic symbol positioned around circle 930.

Additional graphic lines (not shown in FIG. 9B) may be rendered into the user interface utilizing radial arrangement 920 to depict interconnects between the devices positioned at each of positions 924, 925, and 926 and the at least one host these devices are also coupled to. As described above, these additional graphic lines extend away from positions 924, 925, and 926 to graphic symbols representing the host or hosts that are positioned outside the interior area 938 of circle 930. As such, these additional graphic lines are configured so that they do not cross over or extend into interior area 938, and thus do not cross over or intersect with the interconnection lines extending across interior area 938 showing interconnections between devices which are located on the perimeter of circle 930. These arrangements of the additional graphic lines representing connections between devices represented by graphic symbols placed on the perimeter of circle 930 and graphic symbols representing host(s) further eliminates the total number of intersections and crossover points for the interconnection graphic lines, and thus may provide a visual representation of the computer network topology that is less complicated and more visually understandable.

The dimensional value for radius 937 is not limited to any particular value, and may change for example based on the addition of more devices to the user interface utilizing radial arrangement 920 and thus requiring an adjustment to the scale used to display the radial arrangement, and/or for example based on user inputs the zoom in (e.g., enlarge) and zoom out (e.g., make smaller) the overall size of the radial arrangement 920 being displayed as part of a user interface screen. Examples of the radial arrangement shown in FIG. 9B are not limited to a particular number of positions being available around the perimeter of circle 930. Other numbers of positions, less than or greater than the eight positions illustrated in FIG. 9B, may be provided as part of the radial arrangement for locating graphic symbols of interconnected devices within a user interface representing a graphic depiction of a computer network topology. In addition, the arrangement of positions 921-928 is not restricted to being only provided along a perimeter of a perfect circle, and in some examples one or more of the positions 921-928 may be moved off the perimeter so that a shape having an outer boundary that connects all of the positions 921-928 is not limited to a circle only, and for example my approximate an oval, an ellipse, or some other multiple-sided closed polygonal shape.

In some example, the number of devices to be placed in radial arrangement 920 is less than the total number of available positions 921-928. In such examples, one or more of positions 921-928 may be left unassigned to a device, and no graphic symbol is assigned to the space, in which case a blank space may be depicted in the user interface in the area of the unfilled position. In some examples, the list of devices to be placed and arranged within the user interface exceeds the number of positions available using a single radial arrangement such as radial arrangement 920. In such examples, the algorithm generating the user interface may allocate radial arrangement 920 as the "innermost" arrangement, and add additional radial arrangements outside circle 930, which may include addition radial arrangements as further illustrated and described below with respect to FIG. 9C.

Figure 9C:
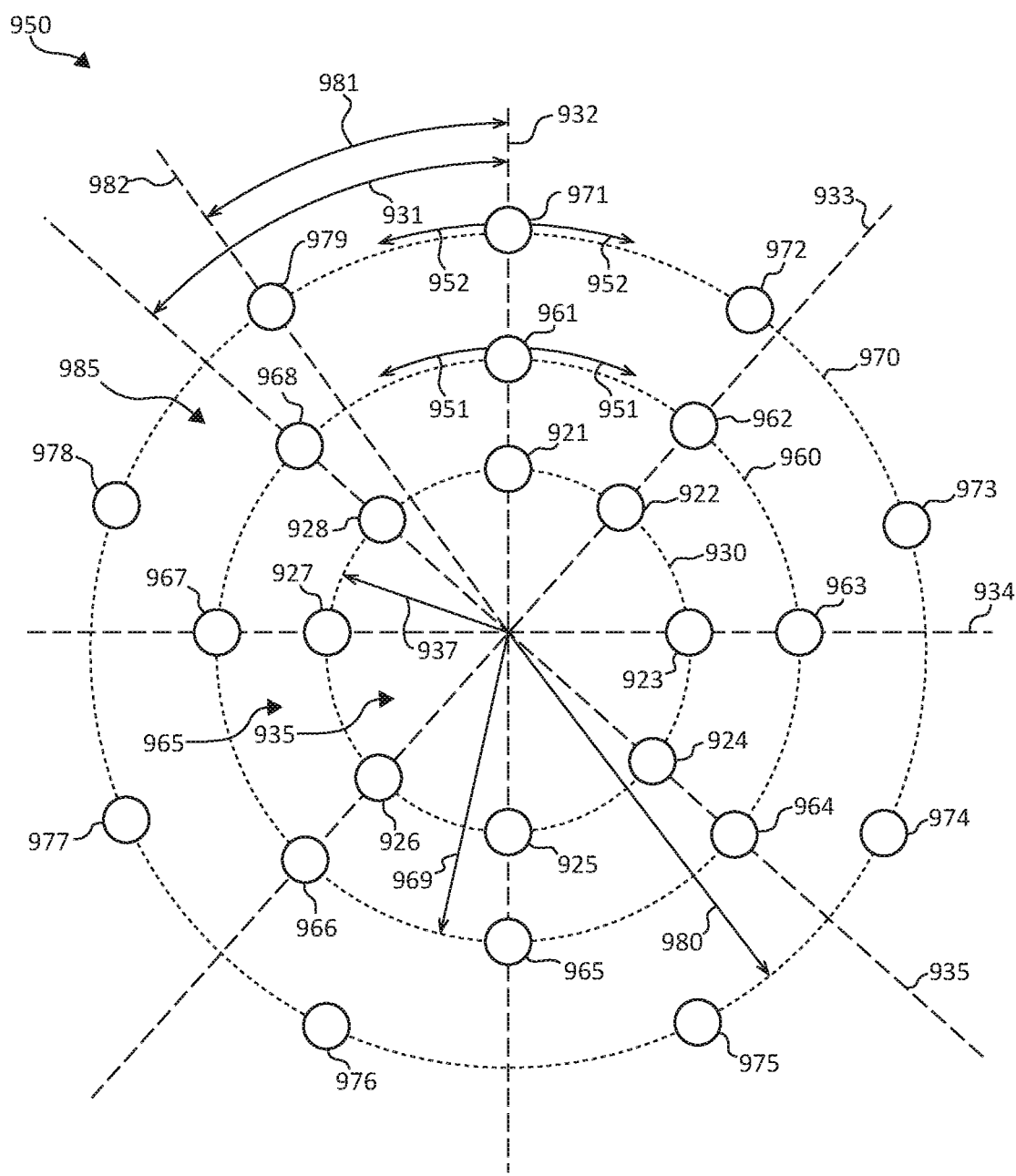
FIG. 9C is a conceptual diagram of a radial arrangements that may be utilized to determine the placement of graphical symbols generated by a dashboard as a graphic user interface in accordance with one or more aspects of the present disclosure.

FIG. 9C is a conceptual diagram of a radial arrangement 950 that may be utilized to determine the placement of graphical symbols generated by a dashboard 203 as a graphic user interface in accordance with one or more aspects of the present disclosure. As shown in FIG. 9C, radial arrangement 950 includes a first plurality of positions 921-928 arranged around the perimeter of a innermost circle 930 in a same or similar manner as described above with respect to radial arrangement 920 and FIG. 9B. As further illustrated in FIG. 9C, radial arrangement 950 also includes a second set of positions 961-968 arranged around the perimeter of a second circle 960, and a third set of positions 971-979 arranged around the perimeter of a third circle 970. The perimeter of innermost circle 930 has a radius 937, and is centered around origin 936. Second circle 960 has a radius 969 having a dimensional value that is larger than the dimensional value for radius 937 of the innermost circle 930. Second circle 960 is also centered around origin 936. As such, the perimeter of second circle 960 surrounds the perimeter of innermost circle 930. Third circle 970 has a radius 980 having a dimensional value that is larger than both dimensional values for radius 937 and radius 969, and is centered around origin 936. As such, the perimeter of third circle 970 surrounds the perimeters of both innermost circle 930 and second circle 960.

In the example of radial arrangement 950 as illustrated in FIG. 9C, circles 930, 960, and 970 are arranged as concentric circles. However, example arrangements of multiple radial arrangements utilized for displaying a graphic depiction of the user interfaces as described herein are not limited to being configured using concentric circular arrangements. Other shapes for the arrangements of the positions provided along a perimeters of these radial arrangements may include other shapes, such as ovals, ellipses, squares, rectangles, triangles, and/or another multi-sided closed polygonal shapes, and which may or may not have a common point for the center(s) of the areas enclosed by these shapes, all of which are contemplated for use in configuring arrangements according to the techniques described in this disclosure.

As shown in FIG. 9C, each of circles 930, 960, and 970 includes a plurality of positions arranged around the perimeters, respectively, of each circle. The innermost circle 930 includes a total of eight positions 921-928, illustrated as small circles arranged around the perimeter of circle 930 and equally spaced from one another by an angular value illustratively represented by angle 931. Second circle 960 also includes a total of eight positions 961-968, illustrated as small circles arranged around the perimeter of circle 960 and equally spaced apart from one another by an angular value illustratively represented by angle 931. As illustrated in FIG. 9C, the innermost circle 930 and second circle 960 include a same number of positions available on each circle e.g., a total of eight positions. However, examples of radial arrangement 950 are not limited to having a same number of available positions on the innermost circle 930 and a second circle 960 surrounding the innermost circle 930, and in alternative examples the second circle 960 may have more or less positions compared to the number of positions provided around the perimeter on the innermost circle 930.

Third circle 970 may also be referred to as the outermost circle in the example illustrated in FIG. 9C, and includes a total of nine positions 971-979, illustrated as small circles arranged around the perimeter of circle 970 and equally spaced apart from one another by an angular value illustratively represented by angle 981. As illustrated in FIG. 9C, third circle 970 includes a larger total number of positions, e.g., a total of nine positions, compared to the number of positions (e.g., eight positions) provided by either of innermost circle 930 or second circle 960. However, examples of radial arrangement 950 are not limited to having an outermost circle of the radial arrangement configured to have a larger number of available positions compared to circles that may be surrounded or partially encircled by the outermost circle. In alternative examples, third circle 970 may have more or less positions compared to the number of positions provide around the perimeters on the circle(s) forming radial arrangement(s) that are surrounded or at least partially encircled by the outermost circle.

In various examples, the number of positions provided by any given circle of a plurality of radial arrangements such as radial arrangement 950 may be determined by an algorithm, and may be based on one or more predefined values and/or predefined rules. In some examples, the number of positions available around the perimeter of an innermost circle may be a predefined number. As illustrated with respect to radial arrangement 950, that predefined number is defined as eight total positions. If the total number of devices to be represented by graphic symbols located using radial arrangement 950 that are not directly coupled to at least one host ("non-host device(s)") is less than or equal to the predefined number of positions available around the perimeter of the innermost circle, only an innermost circle such as circle 930 may be required to provide locations for graphic symbols representing all the devices, and no additional circles may be rendered as part of radial arrangement 950.

In examples where the total number of devices to be modeled exceeds the number of available positions provided by the innermost circle 930, one or more additional circles, such as second circle 960 and third circle 970, may be added by the algorithm to accommodate the additional graphic symbols required to model the computer network topology. In some examples, only one additional circle, such as second circle 960, is required to provide the added number of positions required to accommodate all the devices to be modeled by the algorithm. In some examples, the one additional circle may have the same number of positions as was configured to be provided by the innermost circle. If the total number of positions provided by the combination of both the innermost circle and the one additional circle are still not adequate to accommodate the total number of devices required to be modeled as the computer network topology, a second additional circle, such as third circle 970, may be added to the radial arrangement 950. In some examples, the number of positions provided by the addition of a second additional circle is larger than the number of positions provided by either one of the innermost circle and the one additional circle individually.

The above described process of adding additional circles to radial arrangement 950 to accommodate the total number of graphic symbols required to model the devices included in a computer network topology is not limited to a total of three circle, or to any particular number of circles. Additional circles may be added to radial arrangement 950 in a manner similar to that described above with respect to the second circle 960 and third circle 970 until the total number of positions provided by the combination of all the circles at least exceeds the total number of devices that the algorithm is modeling as part of a computer network topology. In general, the number of positions that may be located around the perimeter of a given circle may increase as the dimensional value for the radius of the additional circles increases, and in some examples is determined by the angular value used to space the positions around the perimeter of the circle, and may be based on a formula or a rule.

For example, for the innermost circle of a radial arrangement, a separation angle of forty-five degrees between positions may be predefined. A value of forty-five degrees is illustratively represented by angle 931 in FIG. 9C, and is used as the spacing between the positions provided by innermost circle 930. In some examples, second circle 960 is configured to utilize this same angle of separation. The total number of positions thus available on these first two radial circles may then be calculated by taking the three-hundred sixty degrees of the circles, respectively, and dividing by the angular value of forty-five degrees defined for these two radial arrangements. The resulting value (360/45=8) is eight total positions arranged around the perimeters, respectively, for each of innermost circle 930 and second circle 960.

For every two additional circles required, the value for the angular separation between the positions may be decreased by some predefined angular value. For example, when calculating the number of positions to be provide for a second additional circle (such as third circle 970), the number of positions may be determined by first determining the new angular value to be used to separate the positions from one another around the perimeters of the third circle. In this example, that value may be obtained by subtracting five degrees from the angular value used to calculate the separation from the adjacent and smaller circles 930, 960. In this example, a value of forty-five degrees was used for angular separation of the positions on the two previously configured radial arrangements associated with first circle 930 and second circle 960. Subtracting five degrees from the previously used angular value, (e.g., 45−5 degrees=40 degrees) results in a value of forty degrees for the angular separation that may be used to separate the positions arranged around the perimeter of the third circle. The total number of available positions for the third circle may then be calculated by taking the three-hundred sixty degrees around the third circle and dividing by the angular value of forty degrees calculated for the third circle (e.g., 360/40 degrees=9), resulting in this example of a total of nine positions.

As shown in FIG. 9C, third circle 970 of radial arrangement 950 includes nine total positions 971-979, each position separated along the perimeter of circle 970 by forty degrees as illustratively represented by angle 981. If a fourth circle (not shown in FIG. 9C) is required, the fourth circle may also be configured to have nine total positions, a number of positions equal to the number of positions provided by third circle 970. In other examples, a different number that is larger or smaller than the number of positions calculated for third circle 970 may be calculated for a forth circle if needed using a different value for the angular separation of the positions to be provided around the perimeter for the fourth circle.

In examples where additional radial arrangements may be required beyond a fourth circle, each additional radial arrangement, or each next pair of additional radial arrangements, may be configured to have a total number of positions calculated by again reducing the value used for the angular separation between the next outermost or the next pair of outermost circles to be added by some predetermined amount for the angular value, such as five degrees, and dividing the available three-hundred sixty degrees by the calculated value for the angular separation applicable to each of these additional circles. The reduction in the value of the angular separation used between the positions on any given circle of a radial arrangement may be limited to some minimum angular value, for example a value of no less than twenty degrees, in order to prevent clutter and/or overcrowding of the graphic symbols being displayed as part of a user interface providing a display of a computer network topology according to the techniques described in this disclosure.

In additional to the total number of positions that may be configured for a given radial arrangement of a configuration including a plurality of radial arrangements (such a radial arrangement 950), a relative orientation of the positions provided by adjacent circles may also be configured by the algorithm to determine the arrangements of the graphic symbols and the interconnections used to depict the computer network topology in a user interface. For example, as shown in FIG. 9C each of the positions 921-928 of innermost circle 930 aligned with a corresponding one of the positions 961-968 of second circle 960. More specifically, position 961 of second circle 960 aligns along axis 932 with position 921 of innermost circle 930, position 962 of second circle 960 aligns along axis 933 with position 922 of innermost circle 930, position 963 of second circle 960 aligns along axis 934 with position 923 of innermost circle 930, and position 964 of second circle 960 aligns along axis 935 with position 924 of innermost circle 930. A similar paring of positions located on second circle 960 and innermost circle 930 exists along the axes 932, 933, 934, and 935 on the extensions of these axes, respectively, opposite origin 936 relative to the above described parings.

In some examples, the algorithm configuring the locations of positions 921-928 relative to the rotational orientations of positions 961-968 may arrange these pairing to correspond to a same set of axes 932-935 as illustrated in FIG. 9C. In alternative examples, the algorithm may determine that a non-alignment of the relative rotational orientations between the positions in adjacent circles is beneficial, and for example may rotate, as illustratively represented by arrow 951, the arrangement of the positions associated with one circle, for example second circle 960, relative to the rotational orientation of the positions on an adjacent circle such as innermost circle 930. These adjustments of the relative rotational orientations made in adjacent circle may be useful when determining the routings, and thus the placements for the graphic lines used to shown the interconnections between devices in order to avoid "collusions" between the graphic lines and other graphic symbols that are not coupled the interconnect being routed between graphic symbols.

As illustrated in FIG. 9C, having an additional outer circle such as third circle 970 configured to have a different angular value (e.g., angle 981) for spacing of the positions around the perimeter of the circle relative to the angular value used for the adjacent circle (e.g., second circle 960) may result in having only some, or in some examples none of the positions in the outer circle align along a common axis with any to the positions provided in adjacent circle. By way of illustration, positions 971 of third circle 970 aligns with position 961 of second circle 960, and also with position 921 of innermost circle 930, along axis 932. However, because of the use of a different value for the angular spacing for positions located around the perimeter of third circle 970 compared to the value of the angular separations used for spacing the positions around the perimeter of the second circle 960, none of the other positions 972-979 located around the perimeter of third circle 970 align along a common axis with any of the other positions of second circle 960 or of innermost circle 930.

In some examples, the algorithms used to configure the positions along the perimeters of the circles may alter the relative rotational orientations between third circle 970 and an adjacent circle such as second circle 960, as illustratively indicated by arrows 952, so that one, some, or none of the positions located around the perimeter of third circle 970 align with positions located around the perimeter of the second circle 960 along a common axis. If additional outermost circle(s), such as a fourth circle (not shown in FIG. 9C) surrounding third circle 970 is/are included in radial arrangement 950, the relative rotational orientation of the positions located on the third and fourth circles, and any additional circles, may align with a common set of axes in a similar manner as shown for innermost circle 930 and second circle 960. In the alternative, the number of positions on a fourth circle and/or the relative rotational orientation of the positions provided on the perimeter on any such fourth or additional circles may or may not provide an alignment between any of the positions provided around the perimeter in third circle 970. It would thus be understood that each of the circles provided in a radial arrangement such as radial arrangement 950 may be rotationally oriented relative to one or more adjacent circles so that all, some, or none of the positions provided around the perimeter of a given circle align along a common axis or along a set of axes with the positions provided around the perimeter(s) of the adjacent circle(s).

The algorithms used to determine the locations and arrangement of the positions being provided on the circles included in a radial arrangement may automatically determine the relative rotational orientation between positions provided around the perimeters of the circles as part of the overall configuration for a radial arrangement being used to model a computer network topology. In some examples, user inputs may be allowed to manually manipulate the relative rotational orientations provided between adjacent circles of a radial arrangement. For example, user inputs may be received by policy controller 201 providing the dashboard that generates a user interface utilizing a radial arrangement such as radial arrangement 950. The user inputs may be configured to allow manual rotation of one or more the circles providing positions in the radial arrangement in order to re-orient the relative angles for the positions provide by the circles relative to one or more adjacent circles in a manner similar to that described above when automatically performed by the algorithm.

In various examples, radial arrangement 950, which may include more or less circles and more or less positions than those illustrated in FIG. 9C, and may be configured as part of a model used to generate and display a visual representation of a user interface modeling a computer network topology. Further, having exceeded the total number of positions provided by a given number of circles is not necessarily a criteria for adding an additional circle to a particular radial arrangement including one or more circles. For example, as shown in FIG. 9C innermost circle 930 including eight positions, and second circle 960 includes eight additional positions for a total of sixteen positions. It is not necessarily a requirement that the total number of devices to be modeled using a radial arrangement exceeds sixteen devices before third circle 970 may be added to the configuration. The addition of third circle 970 may be based on other criteria besides the fact that the total number of devices to be modeled exceeds the number of positions available within the existing innermost circle 930 and second circle 960. Additional factor may be used by an algorithm in determining whether to add third circle 970, and for example the decision may be based on the total number of devices coupled to at least one host in the computer network being modeled, and/or a total number of connections between non-host devices and the host device(s) in the computer network being modeled.

For example, a number of devices to be modeled using radial arrangement 950 may include a total of fifteen devices, which is less than the number of positions available when utilizing the positions provide by innermost circle 930 and second circle 960. However, if a threshold number of the fifteen devices, for example three or more of the fifteen devices, are also directly coupled to at least one host, the algorithm configured to arrange radial arrangement 950 may add the additional circle 970 to the configuration in order to utilize the lower positions of the added circle, such as positions 974, 975, 976 and 977 of third circle 970, to locate the graphic symbols for the non-host devices that are directly coupled to at least one host. The threshold number of devices coupled to at least one host that triggers in addition of an additional circle as described above is not limited to two devices, and may be any integer number of devices, such as two, three, four, or more devices.

In addition, a similar analysis for determining when to add an additional circle when the total number of devices to be located in a radial arrangement does not exceed the number of positions available in the existing circles may be based on a total number of connections between non-host devices and hosts included in the computer network being modeled equaling or exceeding a threshold value. For example, if threshold number of interconnections, such as four interconnections, exist between any number of the non-host devices and any number of hosts, the algorithm generating the configuration of graphic symbols and interconnects may add an additional circle, e.g., third circle 970, or another (additional) outermost circle and position the non-host devices having the connection(s) to at least one host in the lower or bottom positions (e.g., positions 974-977 of third circle 970), of the outermost circle in order to provide a clean and visually easy to understand arrangement for the graphic representation of the interconnections between the host and non-host devices. Examples may also include use of both a threshold number of non-host device(s) that are coupled to at least one host in combination with a threshold total number of connections between non-host device(s) and host(s) in the decision to add an additional circle to a model when the total number of devices could be accommodated by the number of available positions provided by the existing circles without the use of the additional circle.

Examples of user interfaces that may utilize the examples of the radial arrangements and the techniques for generating these radial arrangements as described above with respect to FIGS. 9A-9C are further illustrated and described below with respect to FIGS. 10-23.

Figure 10:
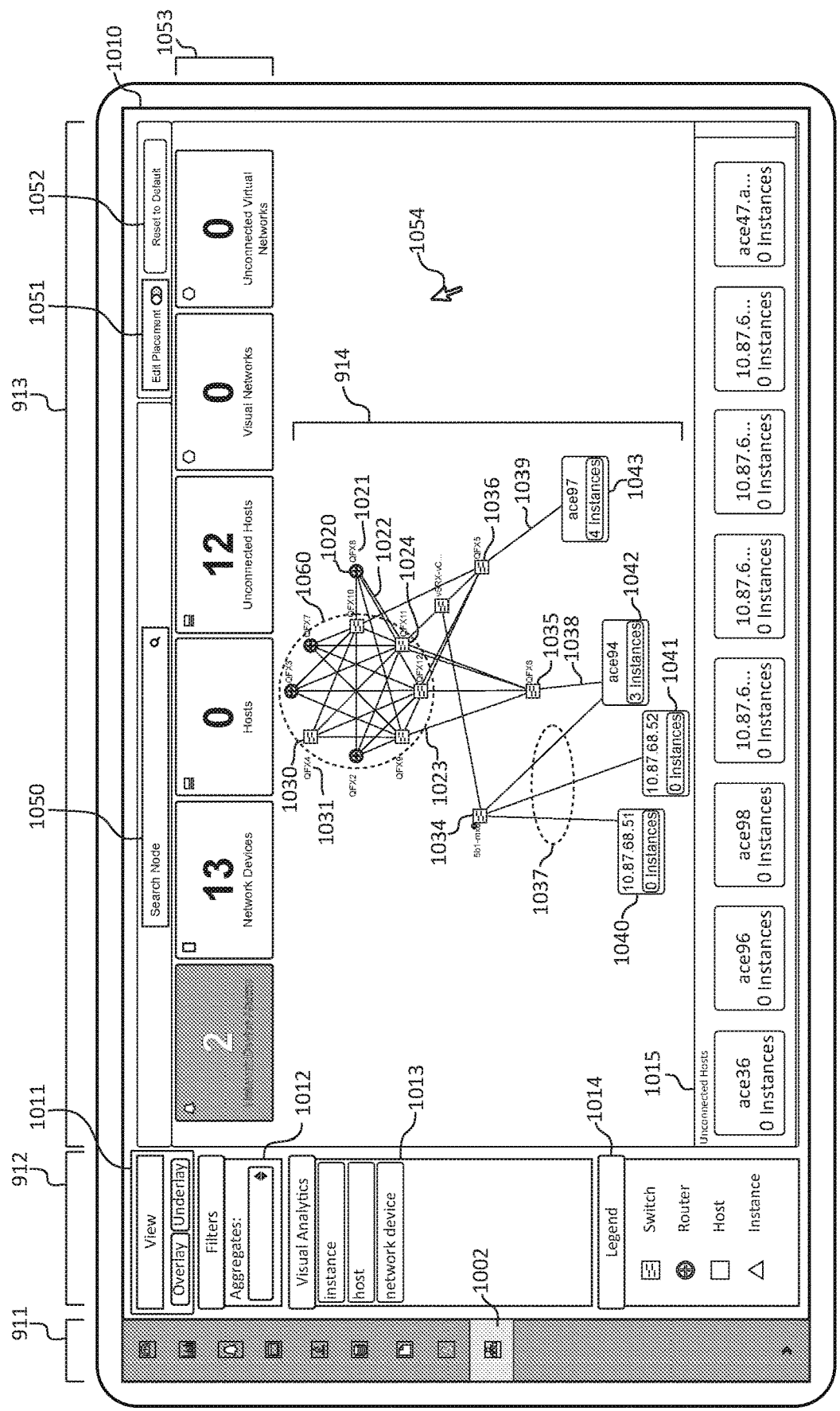
FIG. 10 illustrates an example user interface output by a computing device for a dashboard of network in accordance with one or more aspects of the present disclosure.

FIG. 10 illustrates an example user interface 1010 output by a computing device for dashboard 203 of network 900 in accordance with one or more aspects of the present disclosure. In the example shown in FIG. 10, user interface 1010 includes application selection area 911, view control area 912, and main display area 913. Application selection area 911 includes a set of selectable icons that may be selected based on user inputs received by dashboard 203 and used to launch applications associated with the icons. In the example of user interface 1010, the "network" icon 1002 is highlighted, indicating that a user input used to select the computer network topology modeling application has been received, and the computer network topology application has been launched in response. The view control area 912 and the main display area 913 may be generated and displayed as part of a user interface provided by the computer network topology application.

The view control area 912 includes several user selectable boxes and buttons that allow for user inputs to be received by dashboard 203 and utilized to control the display of the information provided in main display area 913 of the user interface 1010. User inputs may be made via cursor 1054 and/or by through other input devices, such entries using a keyboard (not shown in FIG. 10). For example, when the "Underlay" button provided within the "View" box 1011 of view control area 912 is selected, the computer network topology rendered and displayed by user interface 1010 within main display area 913 may include only a depiction of actual physical devices and hosts of a computer network as the displayed computer network topology. If the "Overlay" button provided within the "View" box 1011 of view control area 912 is selected, the computer network topology rendered and displayed by the user interface 1010 within main display area 913 may include not only the hosts and physical devices of the computer network being modeled, but also various types of virtual devices that may be coupled to the computer network as part of the displayed computer network topology.

User selections made through menus provided in the "Filters" box 1012 may allow filtering of the computer network topology being displayed in main display area 913 based on device aggregate groupings. A listing of type of devices and other entities being displayed in main display area 913 may appear in the "Visual Analytics" box 1013. User inputs may be used to reconfigure the list of devices and/or entities being listed in the "Visual Analytics" box 1013 and/or within main display area 913. A "Legend" box 1014 may be used to display a key showing an example of each of the types of graphic symbols displayed (or that may be displayed) in main display area 913. The "Legend" box may be keyed to a set of text descriptors that are indicative of what entity or type of device is being represented, respectively, by each of the graphic symbols displayed or that may be displayed in main display area 913.

Within main display area 913, user interface 1010 includes a graphic depiction of a computer network topology, generally indicated by bracket 914, that includes graphic symbols representing computer network devices, the graphic symbols arranged and interconnected according to the techniques described in this disclosure. For example, in user interface 1010 a first set of graphic symbols are arranged in a radial arrangement 1060, wherein the graphic symbols representing network devices are arranged in a first radial arrangement similar to the radial arrangement 920 illustrated in FIG. 9B. Radial arrangement 1060 as shown in FIG. 10 includes graphic symbols, such as symbol 1030 representative of a switch and symbol 1020 representative of a router, that are included in the computer network being modeled by user interface 1010. One or more graphic lines, such as graphic line 1022, represent the interconnections between the devices represented by the graphic symbols that the respective graphic lines extend between. Additional graphic symbols 1034, 1035, and 1036 represent devices that are directly connected to at least one host of the computer network being modeled, wherein the hosts are represented by graphic symbols 1040, 1041, 1042 and 1043 in user interface 1010.

The additional graphic symbols 1034, 1035, and 1036 that represent devices in the computer network that are directly coupled to at least one host may also represent a number of devices that exceeds the total number graphic symbols used to represent devices and that could be place into one of the available positions within the radial arrangement 1060. As such, graphic symbols 1034, 1035, and 1036 are positioned in one or more additional radial arrangements that place these graphic symbols in locations outside the radial arrangement 1060, and along the lower portion of the additional radial arrangement(s) to facilitate ease in routing interconnection lines between graphic symbols 1034, 1035, and 1036 and the graphic symbols 1040-1043 of the hosts. Additional graphic lines are included in main display area 913 that extend between graphic symbols 1034, 1035, and 1036 to represent the interconnections between these devices and the hosts, such as the graphic lines partially encircled by dashed line 1037, and also between these graphic symbols 1034, 1035, 1036 and other graphic symbols included in the positions provided for example within radial arrangement 1060.

In some examples, the algorithm used to place the graphic symbols within the main display area 913 is configured to first sort devices, such as devices represented by graphic symbols 1034, 1035, and 1036 that have at least one direct connection to a host (represented by graphic symbols 1040-1043), from a second group of the devices that are not coupled directly to at least one of the hosts. The second group of devices may then be bucketed into bins based on the number of interconnects each given device has to other devices in the second group. For example, an innermost circle of the radial arrangement 1060 may be configured to include a pre-defined total of eight positions. The list of devices from the second group may be ranked in order from the device(s) having the most number of interconnections with other devices in the second group to the devices that have the least number of interconnections with other devices in the second group. The available positions from the innermost circle forming radial arrangement 1060 may then be filled with the graphic symbols representing the devices from the ranked list of the second group having the highest number of interconnections with other devices in the second group until all of these available positions are filled. Additional graphic symbols that can not be placed within radial arrangement 1060 may be placed at positions provided by one or more additional radial arrangements outside the innermost circle of radial arrangement 1060.

In addition, the algorithm may also arrange the graphic symbols for devices that have been placed at positions within radial arrangement 1060 and having direct connections to each another into positions next to each other around radial arrangement 1060 to the extent possible. By placing the graphic symbols of devices having connections with each other in adjacent positions around the radial arrangement 1060, the length and the number of crossovers that may occur between the graphic lines representing the interconnections between these devices may be reduced and/or minimized. Further, by placing the graphic symbols representing the devices that have the largest number of interconnections at the positions available within the innermost circle of the radial arrangement 1060, many of the graphic lines representing the interconnections between these devices can extend across the interior area surrounded by radial arrangement 1060, thus minimizing the clutter the potential interferences and "collisions" with other graphic symbols that are not connected to a given graphic line representing a routed interconnection between devices.

Graphic symbols for devices that are not located on the innermost circle of radial arrangement 1060, such as graphic symbol 1023, may need to be provided with graphic lines that extend across a portion of the display of the computer network topology. However, because these devices in most case represent the devices of the second group having the lower or lowest number of interconnections with other devices, the routing of these lower quantities of interconnections to other graphic symbols further reduces the clutter and the possibility of having "collisions" with other graphic symbols that are not coupled to that particular interconnection.

Once the algorithm has placed a graphic symbol representing a device from the second group of devices at each one of the available positions of the innermost circle of radial arrangement 1060, the remaining devices may be located at any of the available positions provided by a second or an additional radial arrangement that at least partially encircles the innermost circle of radial arrangement 1060. These graphic symbols representing devices may also be placed at the lower or bottom portion of these additional radial arrangement(s) based on any interconnection these graphic symbols may have to other graphic symbols, including graphic symbols representing devices that are directly coupled to at least one host represented by graphic symbols 1040-1043. For example, graphic symbol 1024 representing a switch of the computer network being modeled is not directly coupled to a host, but is coupled to the device represented by graphic symbol 1036, which is directly coupled to the host represented by graphic symbol 1036. As such, the algorithm generating user interface 1010 may position graphic symbol 1024 in a radial arrangement the partially surrounds radial arrangement 1060, and in a position toward the lower or bottom area outside radial arrangement 1060.

In examples were the number of graphic symbols representing devices including the devices coupled to at least one host can be arranged in the available positions around radial arrangement 1060, the bottom or lower positions of radial arrangement 1060 may be reserved for placement of graphic symbols representing the devices coupled to at least one host in order to position these graphic symbols closer to the graphic symbols representing the hosts.

The algorithm also positions the graphic symbols 1034, 1035, and 1036, which represent devices directly coupled to a host, further below the radial arrangement 1060, for example in a radial arrangement that at least partially encircles radial arrangement 1060 and the outside radial arrangement where graphic symbol 1024 is positioned. Using this positioning, the graphic lines representing the interconnections between graphic symbol 1024 with other graphic symbols located within radial arrangement 1060 and with the graphic symbols 1034, 1035, and 1036 may be displayed with a minimum amount of crossovers with other graphic lines and potential "collisions" with other graphic symbols. The positioning of graphic symbols 1034, 1035, and 1036 further outside and below radial arrangement 1060 also allows routing of the graphic lines illustrative of the interconnections between graphic symbols 1034, 1035, and 1036 with the graphic symbols 1040-1044 representing hosts to be made without any crossovers with other graphic lines. This arrangement therefore provides an unclutter and visually easy to understand graphic depiction of the computer network topology being displayed as user interface 1010.

Once the graphic symbols to be included in each of the radial arrangements have been placed, the graphic lines representing the interconnections between the devices and between the devices and the hosts of the computer network may be routed to extend between the appropriate graphic symbols. The algorithm used to determine the routing of the graphic lines may make further adjustments to the positions of one or more of the graphic symbols to allow routing the graphic line or multiple graphic lines between the appropriate graphic symbols while avoiding a "collision" of the routed graphic line with a graphic symbol representative of a device not directly coupled to the particular interconnection being represented by the graphic line. The algorithm used to determine the routing for the graphic lines may automatically adjust one or more aspects of the model of the computer network topology to accommodate the placement of the graphic lines, such as adjusting the location of one or more of graphic symbols representing devices of the computer network. In other examples, the radius value of the any of the radial arrangements included in the model of the computer network may be increased or decreased in order to accommodate the expanse of the computer network topology to fit within the available space provide by main display area 913 and/or to adjust the position(s) of one or more graphic symbols to accommodate the routings of the graphic lines representing the interconnections.

In some examples, the algorithm may adjust the relative rotational orientation of one or more of the radial arrangements in order to better accommodate the routing of the interconnections between graphic symbols representing individual devices and/or between graphic symbols representing individual devices and host(s) included in the computer network being modeled. In various examples, one or more of the features related to the placement of graphic symbols, the relative rotational orientation between radial arrangements, and/or the routing of graphic symbols representing the interconnection between the devices, may be manually manipulated based on user inputs, for example using cursor 1054, and provided to the dashboard controlling the display of user interface 1010. For example, the positioning of a graphic symbol in main display area 913 may be adjusted using a drop-and-drag function provided through the use of cursor 1054 including selecting and dragging the graphic symbol to be repositioned.

The user interface 1010 may be automatically generated by using the algorithms and techniques described herein for placement and interconnections of graphic symbols, and displayed for example as shown as user interface 1010 to provide a compact and easy to understand visual representation of a computer network topology based on a visual representation of the devices and the interconnections between the devices included in the computer network being modeled by the user interface. The display of the computer network topology may be rendered based on a set of default rules, and/or as modified by user inputs, for example user inputs provided through the selection of user selectable buttons and fields provided by the view control area 912 and/or inputs made directly to portions of the main display area for example using cursor 1054.

The graphic depiction provided in main display area 913 may include additional information in addition to the graphic symbols representing the devices of the computer network and the interconnections between these devices. Main display area 913 may display additional graphic symbols and/or text that provide additional information related to the computer network being modeled. For example, the graphic symbols provides in the user interface representing devices of the computer network may be associated with text located proximate to each of the graphic symbols. The text may indicate a device name or a network address assigned to that particular device. For example, as shown in user interface 1010 the graphic symbol 1020 representing a router of the computer network includes a text tag 1021 with a label "QFX8" that is located proximate and to the right-hand side of the graphic symbol. Another example incudes graphic symbol 1030 representing a switch of the computer network that includes a text tag 1031 with the label "QFX4" located proximate to the left-hand side of the graphic symbol. The text tags associated with the graphic symbols may represent a device name assigned to the router or switch being represented by the respective graphic symbols. In other examples, each host may include a text tag representing a name and/or a port address associated with the host. An additional text box, such as text box 1044 shown within graphic symbol 1043, may be included in a user interface to provide additional information associated with a host, displays a number value for a number of instances associated with the host where the box is located.

In addition to displaying a visual representation of a computer network topology, main display area 913 of user interface 1010 may include one or more other types of information and/or user selectable portions of the display. For example, user interface 1010 may include a graphic depiction showing a listing, for example using graphic symbol 1015, of unconnected hosts for the network. As shown in FIG. 10, this list of unconnected hosts is graphically depicted by a set of individual host symbols arranged in a row along the bottom portion of the main display area 913. In some examples, main display area 913 may include a set of statistic blocks 1053 that provide various statistics related to aspects of the computer network being modeled by user interface 1010. User interface 101 includes an example of statistic blocks 1053 arranged in a row along the upper portion of main display area 913. Each statistic block may include text, such as "Network Device Alarm," "Network Devices," "Hosts," "Unconnected Hosts," "Virtual Networks," and "Unconnected Virtual Networks," which describe what the statistic being display with that particular block represents. As shown in FIG. 10, a number value may be provided in each block, respectively, which is representative of a value determined for that particular statistic being depicted. For example, the "Network Device Alarms" block within statistic blocks 1053 indicates that the are "2" network device alarms. The values for these statistics may be updated on some periodic basis or time interval that may be determined by the policy controller and dashboard 203 generating user interface 1010. The type, number, and other aspects of the display of the statistic blocks 1053 may be determined by a s default set of rules accessible by the policy controller and/or may be modified and/or set in their entirety based on user inputs provided to the policy controller that is controlling the dashboard 203 generating the user interface.

Additional user selectable portions of the user interface 1010 may be provided. For example, the user interface may include a "Search Node" text box 1050 that allows a user to provide inputs text to a node or nodes of the computer network. In response to such inputs, the user interface 1010 may be modified to so that the node or nodes searched for is/are indicated in the display of the computer network topology being provide in main display area 913, for example visually by highlighting the graphic symbol representing the node or nodes using color and/or a flashing display of the graphic symbol. The "Edit Placement" selection button 1051 may be actuated based on a user input, that when actuated allows a user to provide additional inputs, such as drag-and-drop inputs using a cursor 1054, to select and move the placement of individual graphic symbols with main display area 913. When a graphic symbol is moved based on user inputs, the interconnections to the graphic symbol may be automatically regenerated by the algorithm based on the previously existing interconnections to the device and the new placement of the graphic symbol representing the device. In addition, user or other inputs to the system may allow the additional of a new device, removal of an existing device, and/or modification of the interconnections between devices, either automatically based on an input of information received by the policy controller or based on user inputs to the system regarding changes to the topology of the computer network being modeled.

The "Result to Default" button 1052 that may be provided as part of a user interface 1010 may allow a user to select the button, and when selected provides a reset of the rules being used to render the user interface to a set of default rules. For example, the pre-defined number of positions available within any given radial arrangement used to place graphic symbols corresponding to devices in a computer network topology may be defined by a default value of each radial arrangement. These values may be altered for example by user input(s), wherein when altered by user input the algorithm used to generate user interface 1010 may regenerate the placements and the interconnects for each of radial arrangements based on the user provided values. Following such changes, the algorithm may be re-rendered the computer network topology using the default value for the number of positions available for each radial arrangement used to display the computer network topology based on receiving a user input indicating selection of the "Reset to Default" button. Another aspect of the display being provided by user interface 1010 may allow the display of the computer network topology to be controlled by and reset to a default setting or set of values based on receipt of a user providing an input to the "Reset to Default" button 1052.

Figure 11:
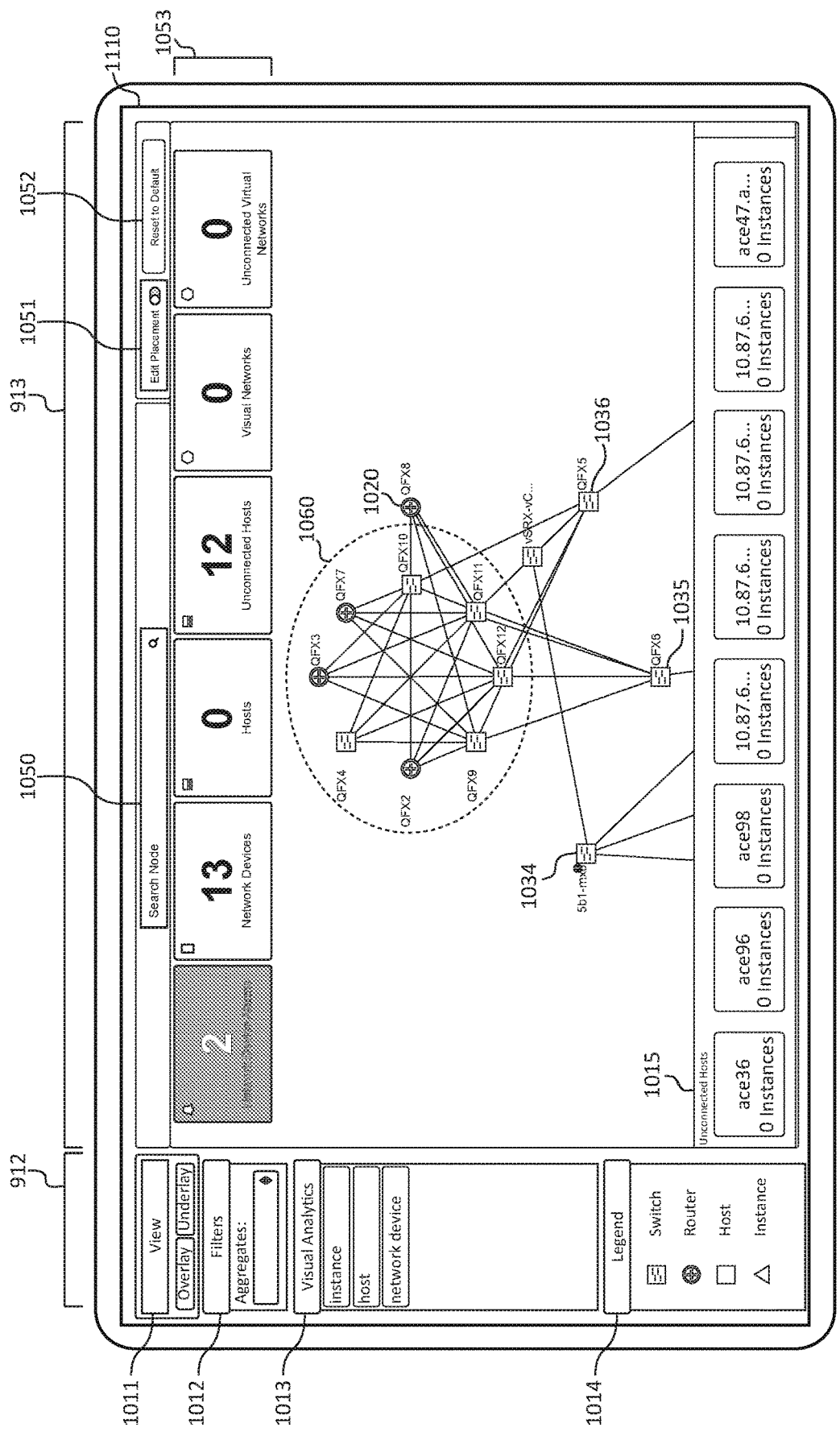
FIG. 11 illustrates an example user interface output by a computing device for a dashboard of network in accordance with one or more aspects of the present disclosure.

FIG. 11 illustrates an example user interface 1110 output by a computing device for dashboard 203 of network 900 in accordance with one or more aspects of the present disclosure. In the example shown in FIG. 11, user interface 1110 includes the same or similar graphic features, including view control area 912 and main display area 913, which may provide the same or similar functions and operate in a same or similar manner as described above with respect to FIG. 10 and user interface 1010, with differences as described below with respect to user interface 1110. For example, user interface 1110 as shown in FIG. 11 does not include the application selection icons 911 along the left-hand side of the user interface. However, examples of user interface 1110 may include the application selection area 911, and when provided may include any of the features described above for area 911. In addition, user interface 1110 includes view control area 912, which may include any of the features and perform any of the functions described above with respect to the view control area 912 and user interface 1010 in FIG. 10. The main display area 913 of user interface 1110 as shown in FIG. 11 may include any of the features and may be configured to perform any of the functions described above with respect to the user interface 1010 of FIG. 10, including the "Unconnected Hosts" 1015, statistic blocks 1053, "Search Node" text field 1050, "Edit Placement" button 1051, and/or "Reset to Default" button 1052.

A portion of the computer network topology being displayed in main display area 913 of user interface 1010 from FIG. 10 has been enlarged as shown in main display area 913 of user interface 1110 in FIG. 11. As shown in FIG. 11, the radial arrangement of graphic symbols included in the innermost radial arrangement generally indicated as radial arrangement 1060 has been enlarged in the view provided by user interface 1110. As such, a dimensional value associated with the radius for this radial arrangement 1060 is larger as shown in user interface 1110 compared to this same dimensional value used to generate the display of radial arrangement 1060 as shown in user interface 1010 of FIG. 10. The enlargement of the computer network topology as shown in FIG. 11 also results in the graphic symbols 1040, 1041, 1042, and 1043 representing host of the computer network to no longer be displayed as part of user interface 1110. However, the same interconnections, represented by graphic lines extending from graphic symbols 1034, 1035, and 1036 toward the bottom of the display, remain to indicate the existence of these connections between devices represented by graphic symbols 1034, 1035, and 1036 and additional devices not currently included in the display being provided by user interface 1110.

Positioning of the portion of a computer network topology being displayed as part of a user interface 1110, and/or the ability to zoom into or out of a view of a computer network topology being displayed as part of a user interface may be controlled for example by inputs provided by a user to dashboard 203 controlling the display of the user interface. In some examples, activation of the "Reset to Default" button 1052 may be configured to resize the display of the existing computer network topology to fit within main display area 913, and to have all graphic symbols including in the computer network be displayed within main display area 913 of user interface 1110.

Figure 12:
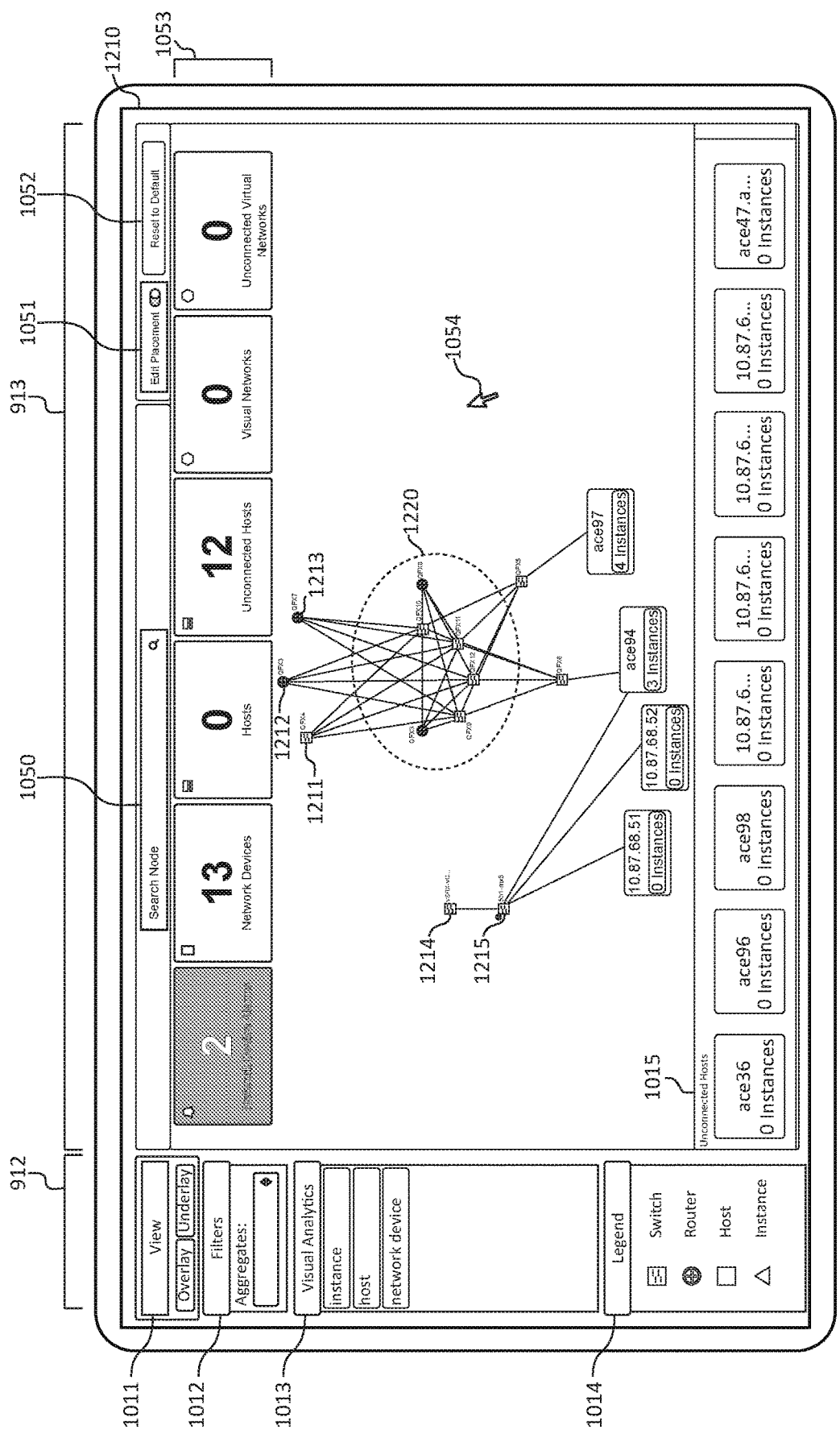
FIG. 12 illustrates an example user interface output by a computing device for a dashboard of network in accordance with one or more aspects of the present disclosure.

FIG. 12 illustrates an example user interface 1210 output by a computing device for dashboard 203 of network 900 in accordance with one or more aspects of the present disclosure. In the example shown in FIG. 12, user interface 1210 may provide the same or similar functions and operate in a same or similar manner as described above with respect to FIG. 10 and user interface 1010, with differences as described below with respect to user interface 1210. Any of the features, including the application selection area 911 and/or view control area 912 that are illustrated and described above with respect to FIG. 10, while not specifically shown in FIG. 12, may be provided by examples of user interface 1210, and may provide any of the features and perform any of the functions as described as related to these feature with respect to FIG. 10.

As shown in FIG. 12, the "Edit Placement" button 1051 has been actuated, as indicated by the graphic switch illustrative of button 1051 being shifted to the right-hand position. When actuated, button 1051 may be configured to enable additional user inputs to the system to allow manual positioning of the graphic symbols and/or manual manipulation of other aspects of the graphic depiction of a computer network topology being provided as part of a user interface. By way of illustrative example, as shown in FIG. 12 the graphic symbol for each of switch 1211, router 1212, and router 1213, which had previously been positioned within a radial arrangement included within dashed circle 1220, have been pulled away from the radial arrangement and are positioned at new locations outside dashed circle 1220. As such, the graphic lines representing the interconnects between the graphic symbols for each of switch 1211, router 1212, and router 1213 have been regenerated based on these new positionings, and now extend beyond the generally circular arrangement indicated as being within dashed circle 1220.

In addition, the graphic symbol for switch 1214, which was previously coupled to three other devices and thus to three other graphic symbols in the display of the user interface, is now coupled only to the graphic symbol representing switch 1215. The graphic lines representing these no longer existing interconnection with switch 1214 have been removed from the display provided by user interface 1210, and the graphic symbol representing switch 1214 has been repositioned closer to the graphic symbol representing switch 1215. In some examples, the repositioning of the graphic symbol representing switch 1214 may be made automatically by the dashboard 203 in response to the removal of the previously existing interconnections to switch 1214. The removal of these interconnections from user interface 1210 may be based on updated information received by policy controller 201 and dashboard 203 regarding the computer network connections, or for example based on user provided inputs. In other examples, the repositioning of the graphic symbol representing switch 1213 may also be in response to manual placement inputs receive as user inputs, for example using cursor 1054.

In some examples, after manual placement of a graphic symbol based on user inputs, the algorithm generating user interface 1210 may still automatically "readjust" the position of the graphic symbol or multiple graphic symbols in order to reroute the graphic lines depicting the interconnections between the devices based on the new and adjusted position(s) in order to avoid "collisions" with the graphic line and other graphic symbols and/or to provide less cluttered and/or less congested visual arrangement of the graphic symbols and the interconnections.

Figure 13:
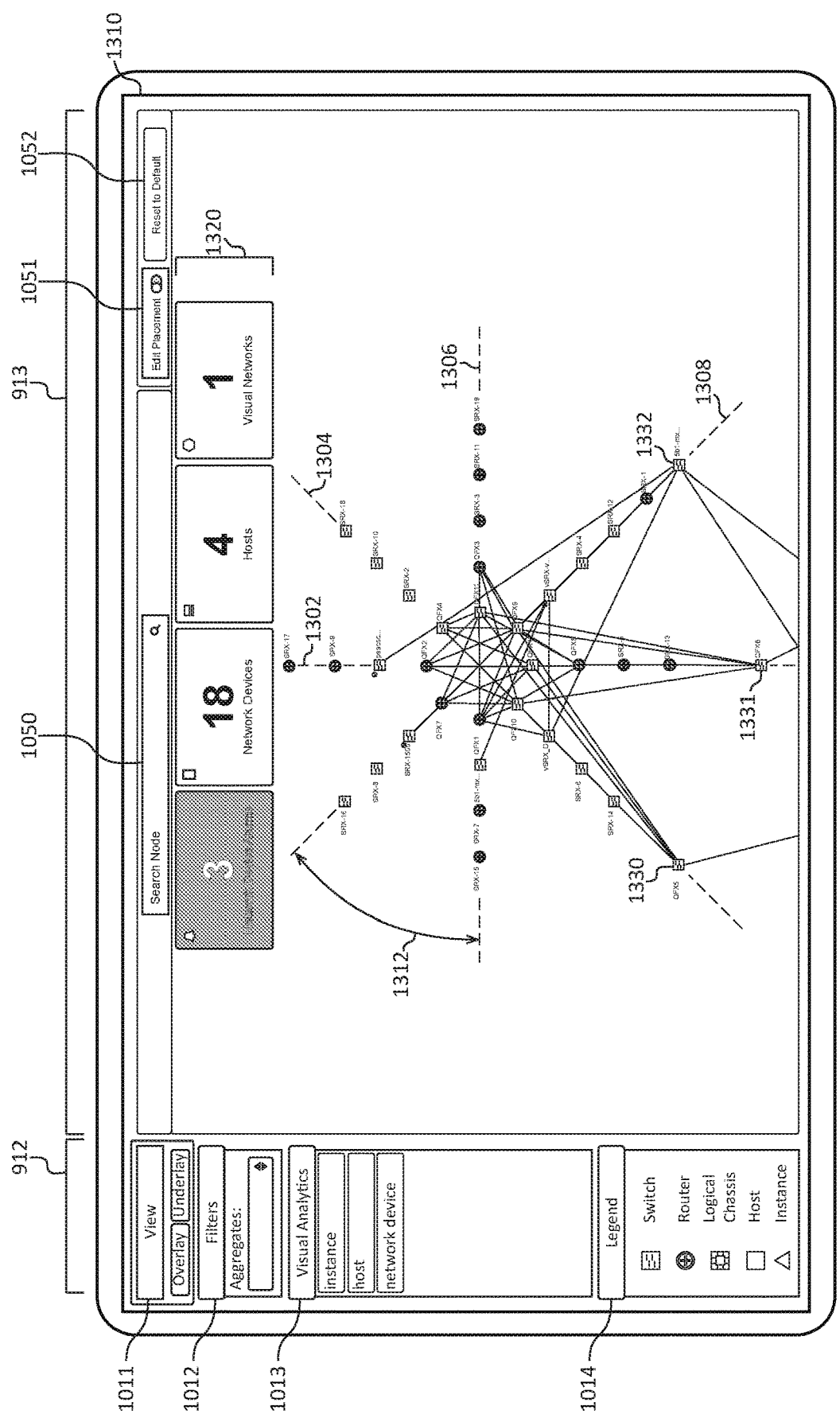
FIG. 13 illustrates an example user interface output by a computing device for a dashboard of network in accordance with one or more aspects of the present disclosure.

FIG. 13 illustrates an example user interface 1310 output by a computing device for dashboard 203 of network 900 in accordance with one or more aspects of the present disclosure. In the example shown in FIG. 13, user interface 1310 includes the same or similar graphic features, including view control area 912 and main display area 913, which may provide the same or similar functions and/or may operate in a same or similar manner as described above with respect to FIG. 10 and user interface 1010, with differences as described below with respect to user interface 1310. For example, user interface 1310 includes a display of statistic blocks 1320 that may include more or less block, and/or block directed to one or more statistics that may differ from the categories of statistic blocks illustrated with respect to user interfaces 1010. Any of the features, including the application selection area 911, view control area 912, and graphic symbols 1015 related to unconnected hosts, which are illustrated and described above with respect to FIG. 10 and while not specifically shown in FIG. 13, may be provided by examples of user interface 1310, and may provide any of the features and perform any of the functions as described above as related to these feature described with respect to FIG. 10.

User interface 1310 as shown in FIG. 13 includes a display of a computer network topology having graphic symbols for devices arranged in multiple sets of radial arrangements formed as concentric circles. As shown in FIG. 13 each radial arrangement has a same number of total positions available around the perimeter of each of the radial arrangements, with each of the radial arrangements formed as a concentric circle having a common origin and different radial dimensional values relative to one another. Each of the available positions located around a perimeter of each of the radial arrangements is positioned on a point of intersection between one of axes 1302, 1304, 1306, or 1308 and the respective perimeter of the radial arrangement. This configuration of graphic symbols representing a model of a computer network topology is a result of maintaining a same value for the angular separation, illustratively represented by angle 1312, between each position of every radial arrangement, while increasing the dimensional value for the radius of the radial arrangements as the radial arrangements progress outward from the innermost radial arrangement to the outermost radial arrangement.

As such, each of the graphic symbols representing devices of the computer network being modeled in user interface 1310 is included in one of the radial arrangements formed in concentric circles, and is positioned along one of axes 1302, 1304, 1306, and 1308. As illustrated in user interface 1310, not every position on every one of the radial arrangements is populated by a graphic symbol, and not all graphic symbols are interconnected to at least one other one of the graphic symbols being displayed as part of user interface 1310. However, the devices having the largest number of interconnections to other devices are represented by the graphic symbols placed around the perimeter of the innermost circle of the radial arrangements illustrated user interface 1310. Thus, the graphic symbols representing devices with the higher numbers of interconnections between other devices are centrally located and have interconnections that in most cases only need to extend across the interior portion of the innermost circle forming the radial arrangements of user interface 1310. In addition, devices represented by graphic symbols 1330, 1331, and 1332 that have graphic lines coupled to the graphic symbols representing hosts of the computer network extend off the display, but include interconnections to one or more hosts (not displayed in FIG. 13). In accordance with the techniques described in this disclosure, the graphic symbols 1330, 1331, and 1332 representing devices directly coupled to at least one host are located at available positions of the outermost radial arrangements that are toward the bottom or lower portions of these outmost radial arrangements to facilitate rending the graphic lines coupling these graphic symbols with graphic symbols representing host (not shown in user interface 1310). This positioning helps minimize the potential for "collisions" between these graphic lines and other graphic symbols that may be included in the computer network topology included in the display of using interface 1310.

The alignment of each of the graphic symbols along one of axis 1302, 1304, 1306, 1308 as shown in user interface 1310 may in some examples be a configuration resulting from use of a default rule for rendering the display of the computer network topology for user interface 1310. However, examples of user interface 1310 do not necessarily require that each of the positions for all of the radial arrangements included in user interface 1310 align along the same set of axes 1302, 1304, 1306, and 1308. In other examples of user interface 1310, one or more of the radial arrangements included in the display may have a different rotational orientation that places the available positions included around the perimeter of these one or more radial arrangements at an axis or along multiple axes that have a different rotational alignment relative to one or more of axes 1302, 1304, 1306, and 1308.

Figure 14:
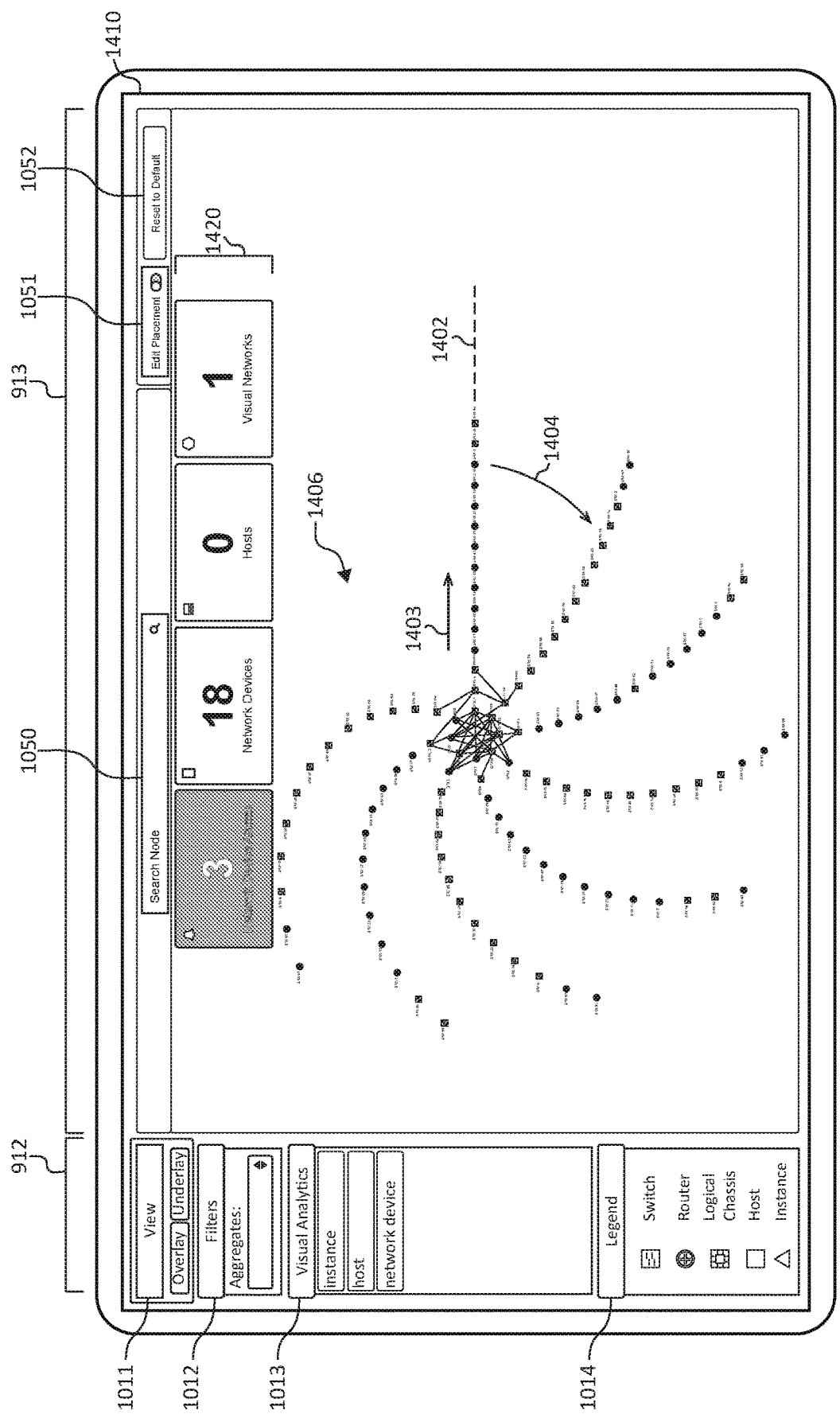
FIG. 14 illustrates an example user interface output by a computing device for a dashboard of network in accordance with one or more aspects of the present disclosure.

FIG. 14 illustrates an example user interface 1410 output by a computing device for dashboard 203 of network 900 in accordance with one or more aspects of the present disclosure. In the example shown in FIG. 14, user interface 1410 includes the same or similar graphic features, including view control area 912 and main display area 913, which may provide the same or similar functions and/or may operate in a same or similar manner as described above with respect to FIG. 10 and user interface 1010, with differences as described below with respect to user interface 1410. For example, user interface 1410 includes a display of statistic blocks 1420 that may include more or less block, and/or block directed to one or more statistics that may differ from the categories of statistic blocks illustrated with respect to user interfaces 1010. Any of the features, including the application selection area 911, view control area 912, and graphic symbols 1015 related to unconnected hosts, which are illustrated and described above with respect to FIG. 10 and while not specifically shown in FIG. 14, may be provided by examples of user interface 1410, and may provide any of the features and perform any of the functions as described as related to these feature with respect to FIG. 10.

User interface 1410 as shown in FIG. 14 includes a display of a computer network topology having graphic symbols for devices arranged in multiple sets of radial arrangements formed as concentric circles. As shown in FIG. 14, each radial arrangement has a same total number of positions available around the respective perimeters of each of the radial arrangements, with each of the radial arrangements formed as concentric circles having a common origin and different dimensional values for the radius associated with each radial arrangement relative to one another. Each of the available positions located around a perimeter of each of the radial arrangements is positioned using an angular value for the separation of adjacent positions that is different from the angular value used to provide the separation between positions in the adjacent radial arrangement(s). For example, each of the radial arrangements depicted using graphic symbols representing computer network devices in user interface 1410 has a position that aligns with axis 1402. Starting with the innermost circle representing a first radial arrangement in user interface 1410, as additional radial arrangements are configured to include progressively larger radius values for the perimeter of each successive radial arrangement (as represented by arrow 1403), the value for the angular separation between positions arranged around the perimeter of a given radial arrangement is decreased. As such, the next set of positions located on the perimeter, respectively each of the radial arrangements when moving around the respective perimeter from axis 1402 in the direction indicated by arrow 1404 provides a smaller angular degree of separation, resulting in a curved alignment of the positions across the radial arrangements other than the positions aligned along axis 1402.

If the total number of positions for each of the radial armaments as shown in user interface 1410 is kept to a constant and same value while decreasing the value used for the angular separation between positions for each successive radial arrangement, an open area, generally indicated by arrow 1406, may be generated above axis 1402. In other examples of user interface 1410, additional positions may be added to the outermore additional radial arrangements while maintaining the progressively decreasing value for the angular separations between adjacent positions of successive radial arrangements to provide additional positions on one or more of these outermost radial arrangements in the area indicated by arrow 1406. In user interface 1410, the graphic symbols representing the devices having the largest number of interconnections to other devices are represented by the graphic symbols may be placed around the perimeter of the innermost circle of the radial arrangements, and the graphic symbols representing devices directly coupled to hosts of the computer network may be positioned at the lower or bottom positions of the outermost radial arrangement(s) in accordance with the techniques described in this disclosure to avoid clutter and provide an easy to visually understand display representing the computer network topology being modeled.

The alignment of each of the graphic symbols as shown in user interface 1410 may in some examples be a configuration resulting from use of a default rule for rendering the display of the computer network topology for user interface 1410. However, examples of user interface 1410 do not necessarily require that each of the positions for all of the radial arrangements included in user interface 1410 align along axis 1402. In other examples of user interface 1410, one or more of the radial arrangement include in the display may have a different rotational orientation that places the available positions included around the perimeter of these one or more radial arrangements at an axis or multiple axes that have a different rotational alignment relative to axis 1402.

FIGS. 15-21 illustrate examples of a series of user interfaces 1510-2110 output by a computing device for dashboard 203 of network 900 in accordance with one or more aspects of the present disclosure. The differences and/or changes in the display of a computer network topology for example in main display area 913 as illustrated by FIGS.

15-21 may represent display animation based on a selection of a network metric or a source for generating a respective user interface. Use of the term "animation" in reference to these user interface does not necessarily imply the portrayal of motion(s) occurring within a given user interface, but refers to any changes that may occur when progressing from one user interface to another user interface being displayed by the examples of the user interface illustrated and described with respect to FIGS. 15-21.

The user interfaces illustrated and described with respect to FIGS. 15-21 may include the same or similar graphic features, including view control area 912 and main display area 913, which may provide the same or similar functions and/or may operate in a same or similar manner as described above with respect to FIG. 10 and user interface 1010, with differences as described below with respect to user interfaces 1510-2110. For example, user interfaces 1510-2110 may include a display of statistic blocks that may include more or less block, and/or block directed to one or more statistics that may differ from the categories of statistic blocks illustrated with respect to user interfaces 1010. Any of the features, including the application selection area 911, view control area 912, and graphic symbols 1015 related to unconnected hosts, which are illustrated and described above with respect to FIG. 10 and while may not be specifically shown in FIGS. 15-21, may be provided by examples of user interfaces 1510-2110, and may provide any of the features and perform any of the functions as described as related to these feature with respect to FIG. 10.

Figure 15:
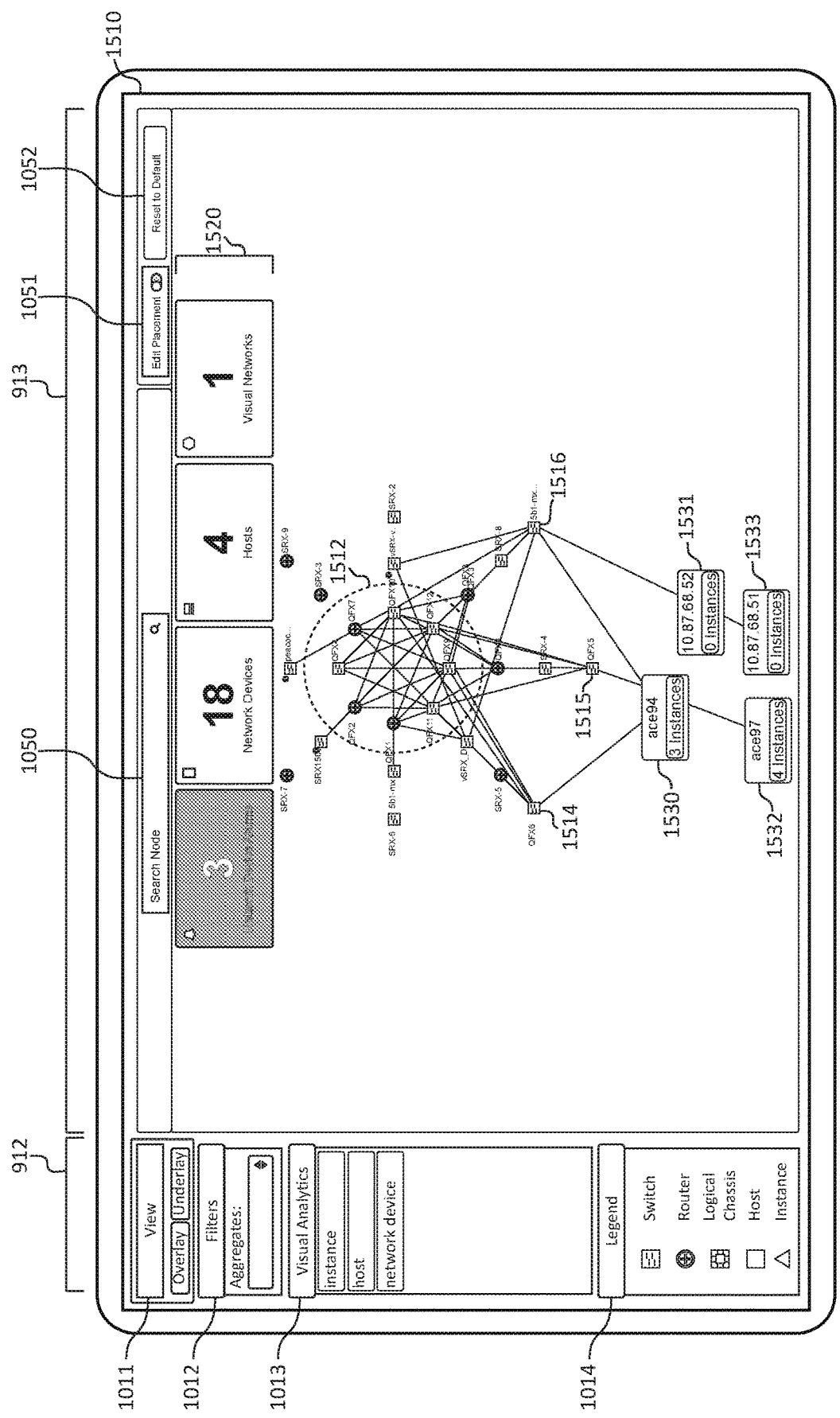
FIGS. 15-21 illustrate an example of a series of user interfaces output by a computing device for a dashboard of network in accordance with one or more aspects of the present disclosure.

As shown in FIG. 15, main display area 913 include a display of graphic symbols representing a computer network topology, including a group of graphic symbols arranged in a plurality of radial arrangements. The plurality of radial arrangements includes graphic symbols positioned around an innermost circle enclosed by dashed circle 1512, and additional graphic symbols located in positions outside dashed circle 1512. Graphic symbols 1514, 1515, and 1516 are located at the lower or bottom positions of an outermost radial arrangement included in user interface 1510, and represent devices that are directly coupled to at least one host device. As shown in user interface 1510, graphic symbols 1514, 1515, and 1516 represent switches of the computer network that are each directly coupled to a host represented by graphic symbol 1530. In addition, the switch represented by graphic symbol 1516 is also directly coupled to a second host represented by graphic symbol 1531. The host represented by graphic symbol 1530 is also coupled to a graphic symbol 1532 representing a third host, and the host represented by graphic symbol 1531 is coupled to a graphic symbol 1533 representing a fourth host of the computer network being modeled by user interface 1510.

Figure 16:
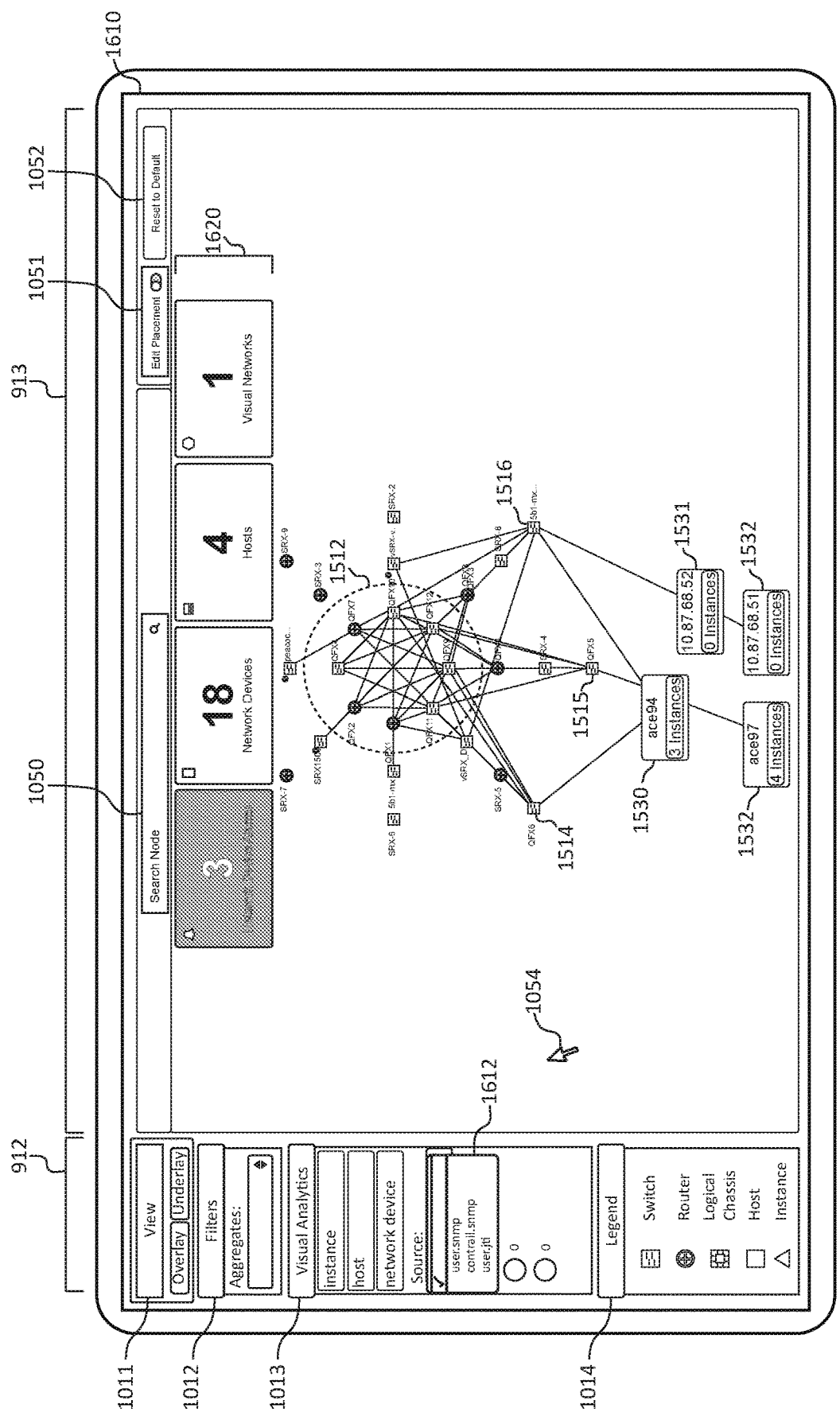
Figure 17:
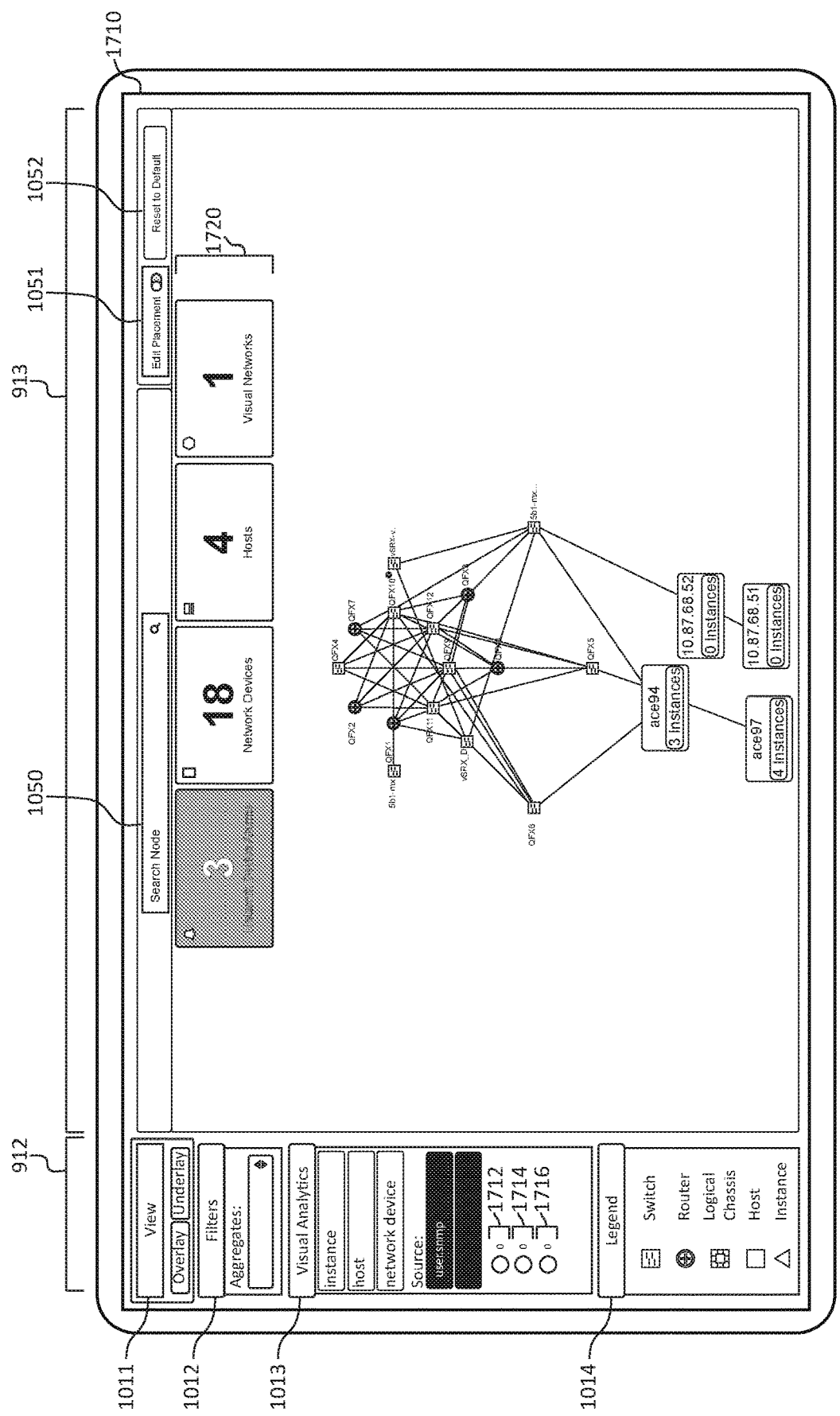

As shown in FIG. 16, a user input, for example made using cursor 1054, may be made to user interface 1510 of FIG. 15 to select a source for the network devices, for example from a source menu 1612 as provided by user interface 1610. By way of example, a selection of "user-.snmp" may be made from the list of available sources provided by menu 1612. Based on the selected source, the computer network topology may be regenerated for example as user interface 1710 as shown in FIG. 17, wherein the network devices with the selected source will be re-rendered in the view provided by user interface 1710, while the network devices that do not have the selected source will be filtered out from the view provided in main display area 913. As shown in FIG. 17, the "View Analytics" box of the view control area 912 may be updated to display a legend including indications 1712, 1714, and 1716 related to various values for a metric that may be selected for display and associated with the network devices having the source picked for display in user interface 1710.

Figure 18:
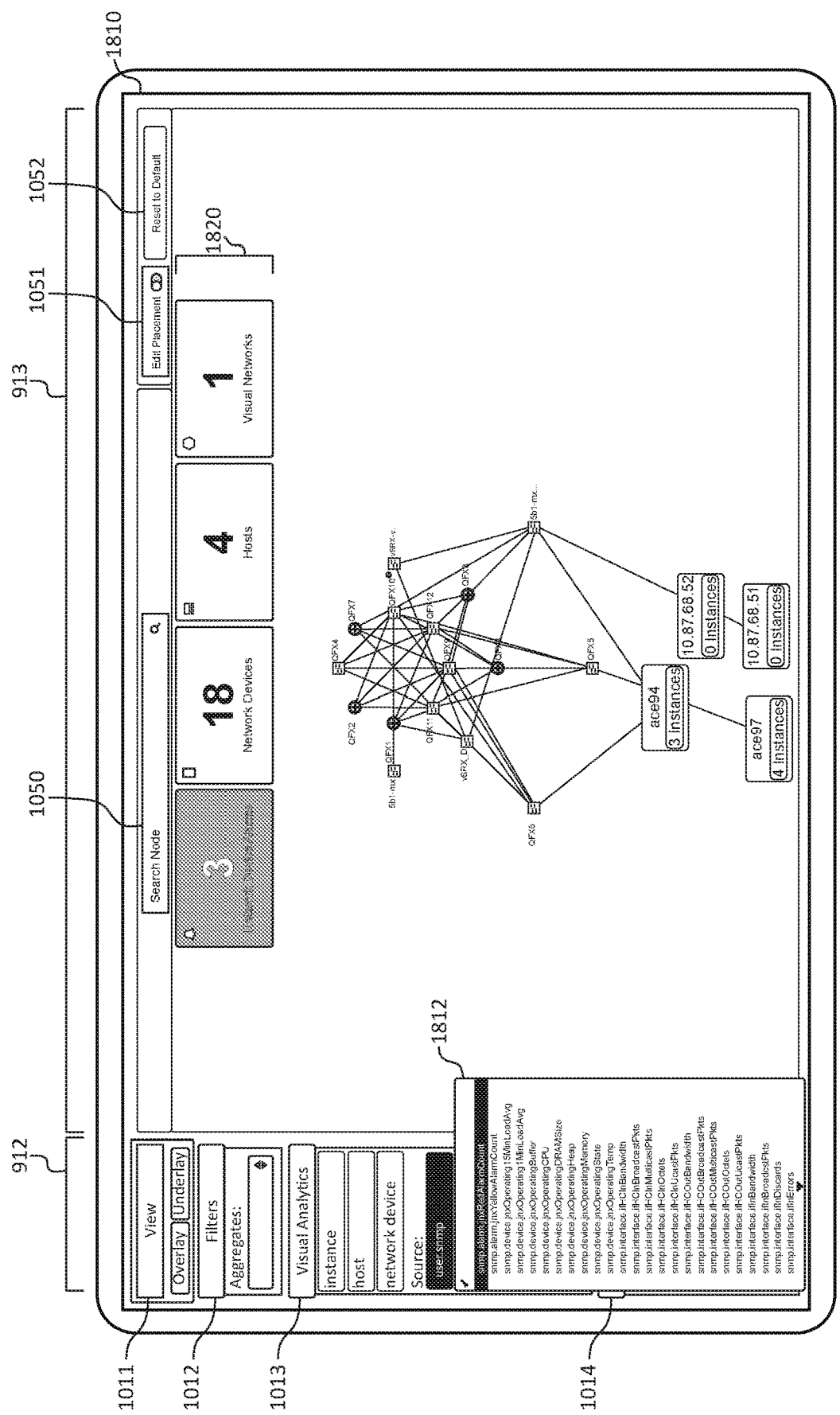
Figure 19:
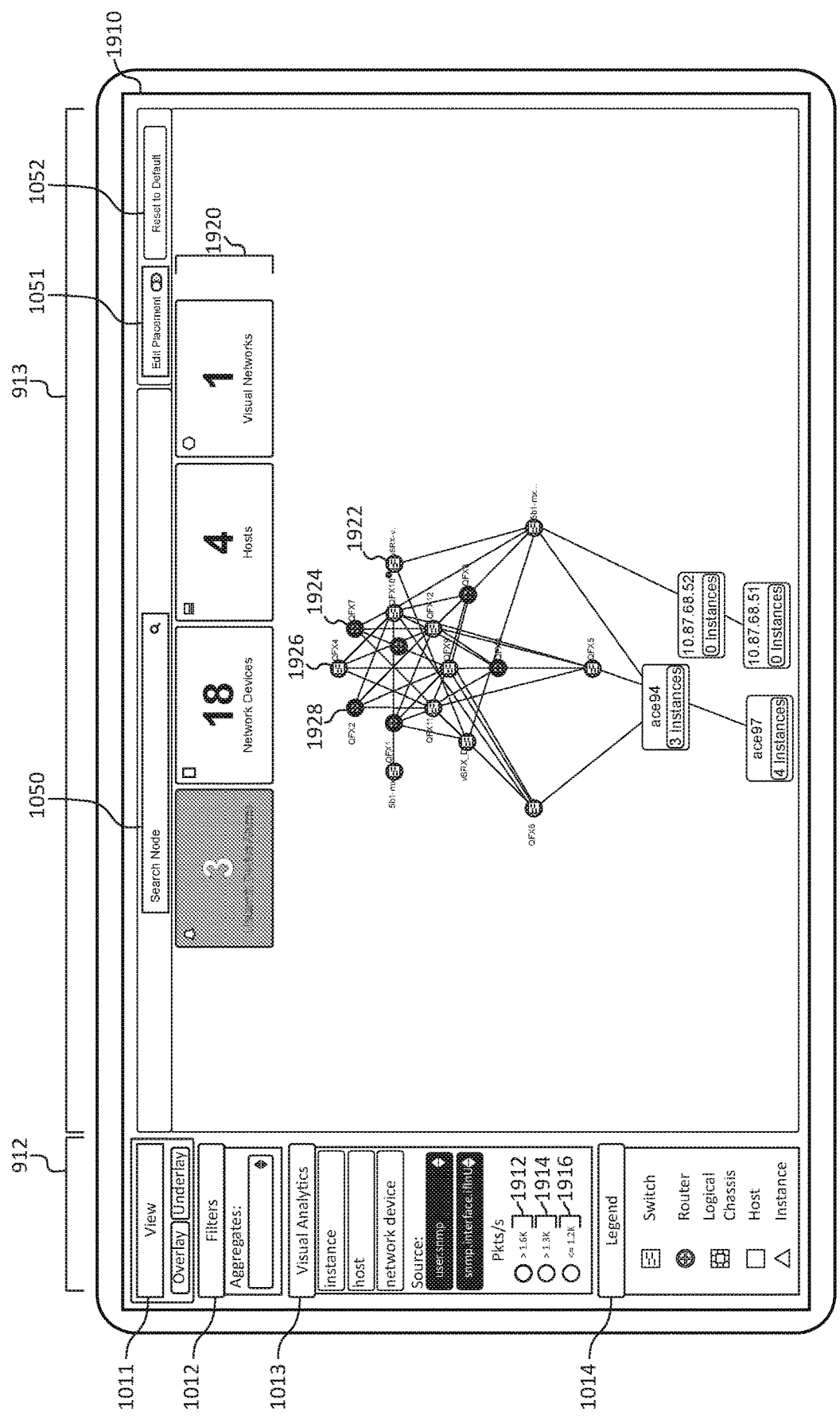

For example, as shown in FIG. 18 a selection may also be made from a menu 1812 listing the available metrics that may be selected and applied to a user interface such as user interface 1810. By way of example, the metric "snmp.interface.ifInUcast" may be selected from menu 1812, and once selected, a new user interface 1910 may be generated in the main display area 913 as shown in FIG. 19. As shown in FIG. 19, a set of indicators 1912, 1914, and 1916 may be displayed in the "Visual Analytics" box of view control area 912. Indicators 1912, 1914, and 1916 may illustrate a color key and associated text defining ranges for values associated with the metric selected from menu 1812 in user interface 1810. For example, as shown in FIG. 19 the metric being depicted may be "Pkts/s" representing ranges of values for the number of packets per second being received and/or transmitted by a particular device represented in the user interface 1910. A color, such as red, may be used as indicator 1912 to highlight graphic symbols representing devices in the computer network having a packet/second rate greater than 1.6 k. A different color, such as yellow, may be used as indicator 1914 to highlight graphic symbols representing devices in the computer network having a packet/second rate greater than 1.3 k, and another different color, such as green, may be used as indicator 1916 to highlight graphic symbols representing devices in the computer network having a packet/second rate of less than or equal to 1.2 k. The proper color code may be represented for each of the devices based on the measurement of the selected metric for the network device by highlighting the graphic symbol representing the device, for example using a colored circle that matches the color of one of indicators 1912, 1914, or 1916 as a background color for each graphic symbol as an indication of the current status the device represented by each graphic symbol respectively in relation to the selected metric.

By way of example, each of the graphic symbols 1922, 1924, 1926, and 1928 displayed in user interface 1910 are surrounded by a colored circle, for example a green colored circle, indicative of a range for the measured or determined value for the rate of packets/second associated with the device being depicted by the respective graphic symbol. The indicators used to depict the statuses associated with a selected metric for devices are not limited to highlighting the graphic symbol provided within main display area 913 using color and/or a particular shape, and may include other techniques for displaying the graphic symbols provided as part of the user interface, such as flashing or altering the size or shape of the graphic symbol as an indication of the measured or determined status for the metric associated with the device being represented by the particular graphic symbol.

The depiction as illustrated by user interface 1910 may allow a user viewing the user interface to quickly visualize and obtain an understanding of the overall status for at least the portion of a computer network being displayed by the user interface and associated with the source and the metric selected in the menus described with respect to user interfaces 1610 and 1810. By also being able to provide inputs to select different sources and/or different metrics used to generate the visual images of the computer network being modeled using the techniques described in this disclosure, a user may quickly search for relevant information that may allow diagnosis of any issues that the compute network may be experiencing for example related to issues that may be negatively affecting system performance.

Figure 20:
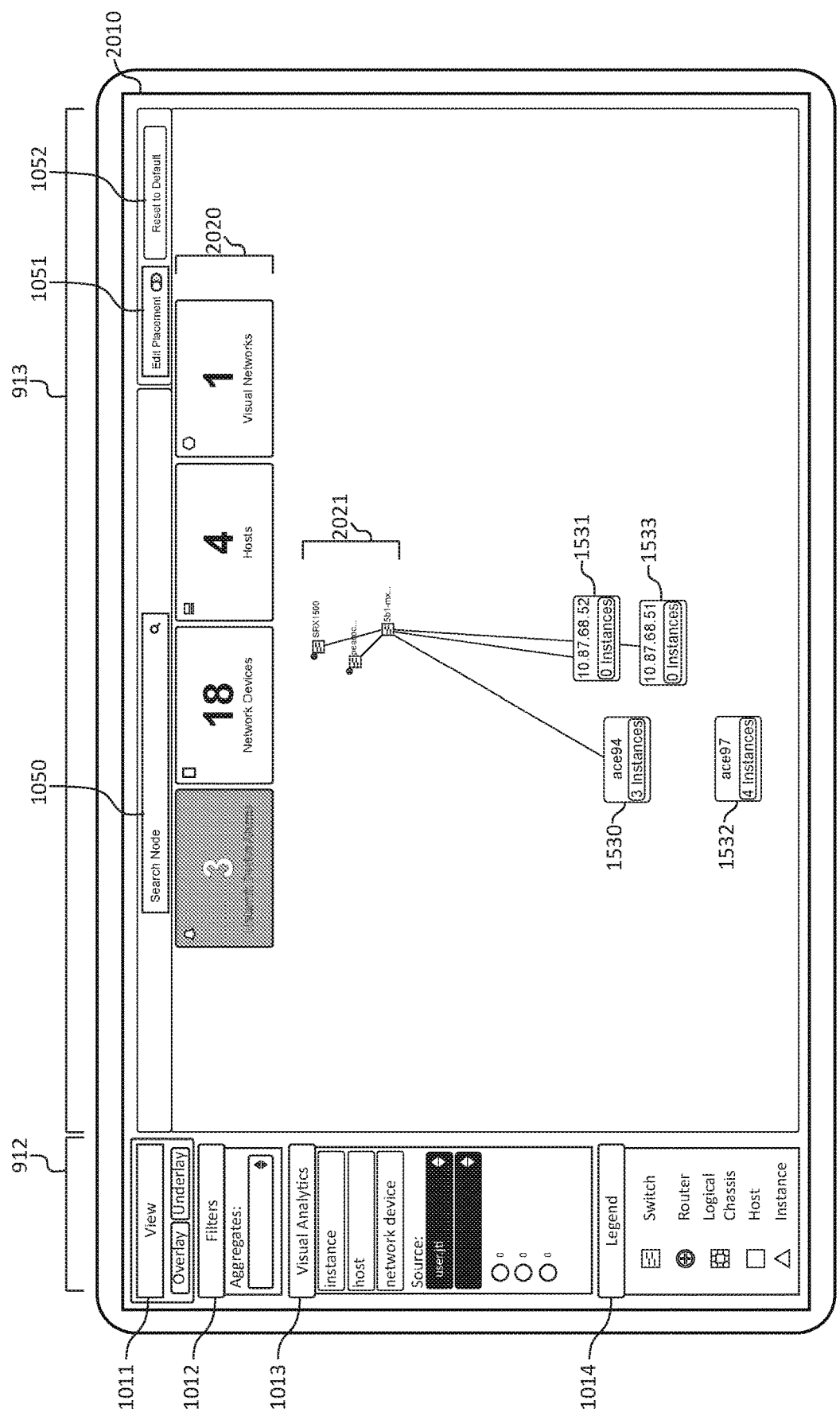

FIG. 20 shows a user interface 2010 that may be regenerated by dashboard 203 of network 900 based on a different source (e.g., "user.jit"), being selected for generation of the computer network topology included as display provided in main display area 913. As shown in FIG. 20, user interface 2010 includes graphic symbols, generally indicated by bracket 2021, depicting a different set of network devices coupled to the hosts represented by graphic symbols 1530-1533, and the different interconnections between the network devices represented by the graphic symbols indicated by bracket 2021 and the graphic symbols 1530-1533 representing hosts of the computer network being modeled. As shown in user interface 2010, the host represented by graphic symbol 1532 is not coupled to any of the network devices generally indicated by bracket 2021.

Figure 21:
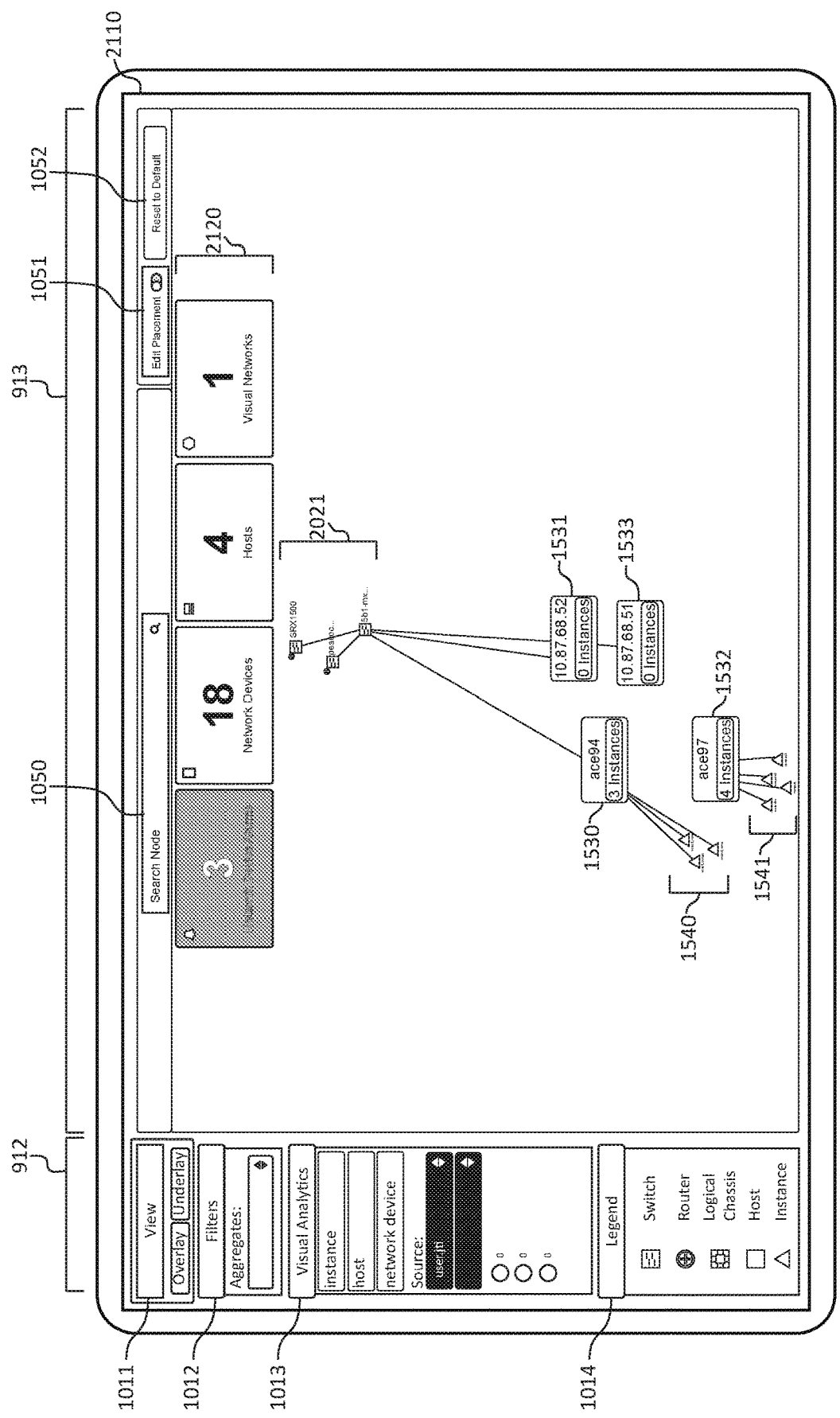

FIG. 21 show a user interface 2110 that illustrates expanded instances, generally indicated by bracket 1540, for the host represented by graphic symbol 1532, and expanded instances, generally indicated by bracket 1541, for the host represented by graphic symbol 1532. In some examples, the expanded instances may be displayed or hidden from view in a toggled fashion by a selection of the graphic symbol representing a respective one of the hosts, for example using cursor 1054.

Figure 22:
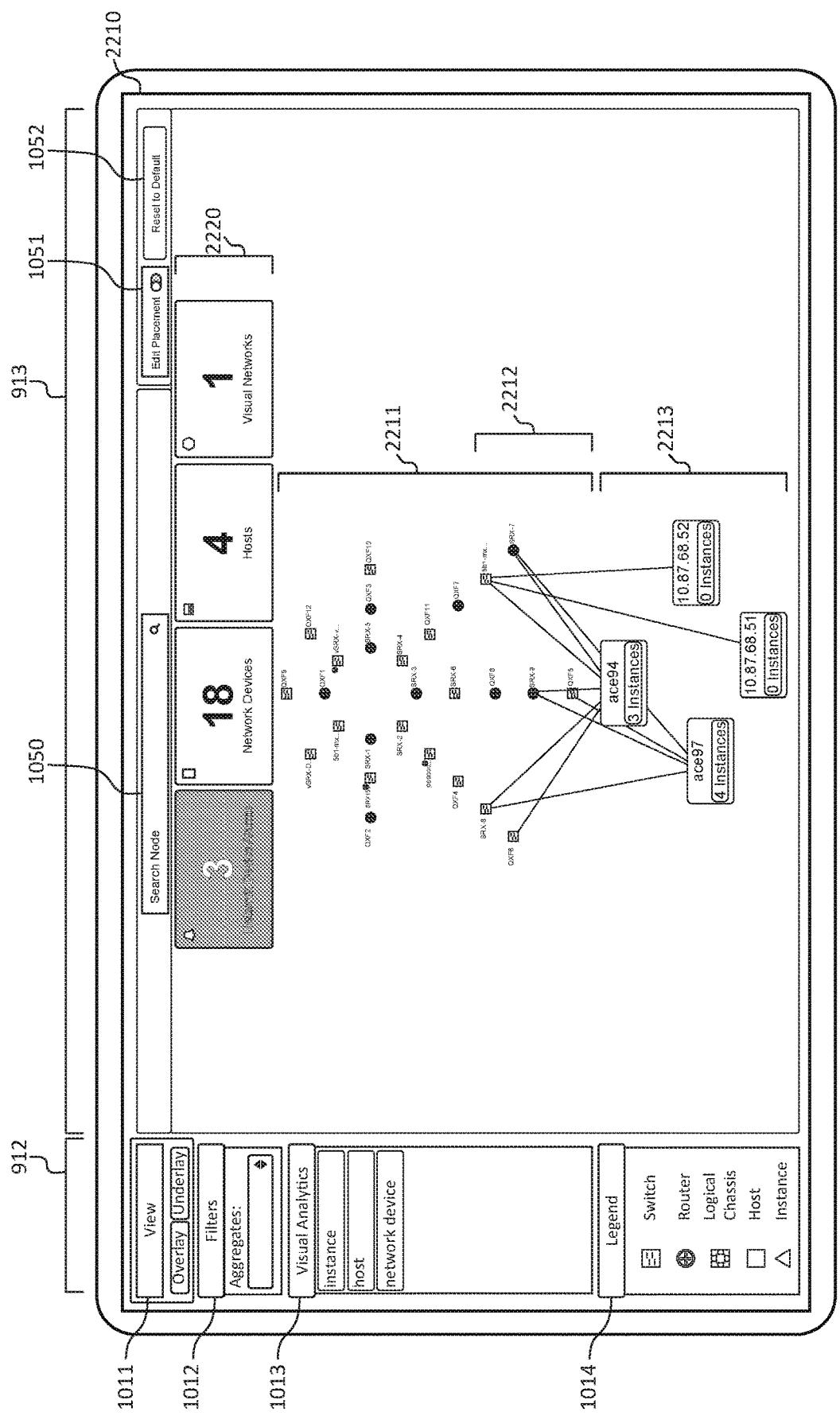
FIG. 22 illustrates an example user interface output by a computing device for a dashboard of network in accordance with one or more aspects of the present disclosure.

FIG. 22 illustrates an example user interface 2210 output by a computing device for dashboard 203 of network 900 in accordance with one or more aspects of the present disclosure. In the example shown in FIG. 22, user interface 2210 includes the same or similar graphic features, including view control area 912 and main display area 913, which may provide the same or similar functions and/or may be configured to perform in the same or in a similar manner as described above with respect to FIG. 10 and user interface 1010, with differences as described below with respect to user interface 2210. Any of the features, including application selection area 911 and/or view control area 912 that are illustrated and described above with respect to FIG. 10, while not specifically shown in FIG. 22, may be provided by examples of user interface 2210, and may provide any of the features and perform any of the functions as described as related to these feature with respect to FIG. 10.

As shown in FIG. 22, user interface 2210 include a plurality of graphic symbols, generally indicated by bracket 2211, arranged in a plurality of radial arrangements, and depicting network devices of a computer network topology. A subset of the graphic symbols, as generally indicated by bracket 2212, represent devices of the computer network that are directly coupled to at least one host of the computer network, the hosts generally indicated by bracket 2213. As illustrated in user interface 2210, the interconnections between the graphic symbols indicated by bracket 2211 are not displayed, and only the graphic lines representing the interconnections between the graphic symbols of bracket 2212 and the hosts indicated by bracket 2213 are displayed as part of user interface 2210. The option to display only the interconnections between the graphic symbols representing the hosts and the graphic symbols representing devices directly coupled to at least one host may be a user selectable option. Another advantage of the view provided by user interface 2210 is the it may further simplify the display of the computer network topology being modeled, and also may provide a quick and easy way for a user viewing user interface 2210 to determine which devices are and which devices are not directly coupled to a host of the computer network being modeled. In some examples, selection of the "Reset to Default" button 1052 may result in the re-generation of user interface 2210, but including the graphic lines showing all of the interconnections between the devices represented by the graphic symbols to be included in main display area 913 of FIG. 22.

Figure 23:
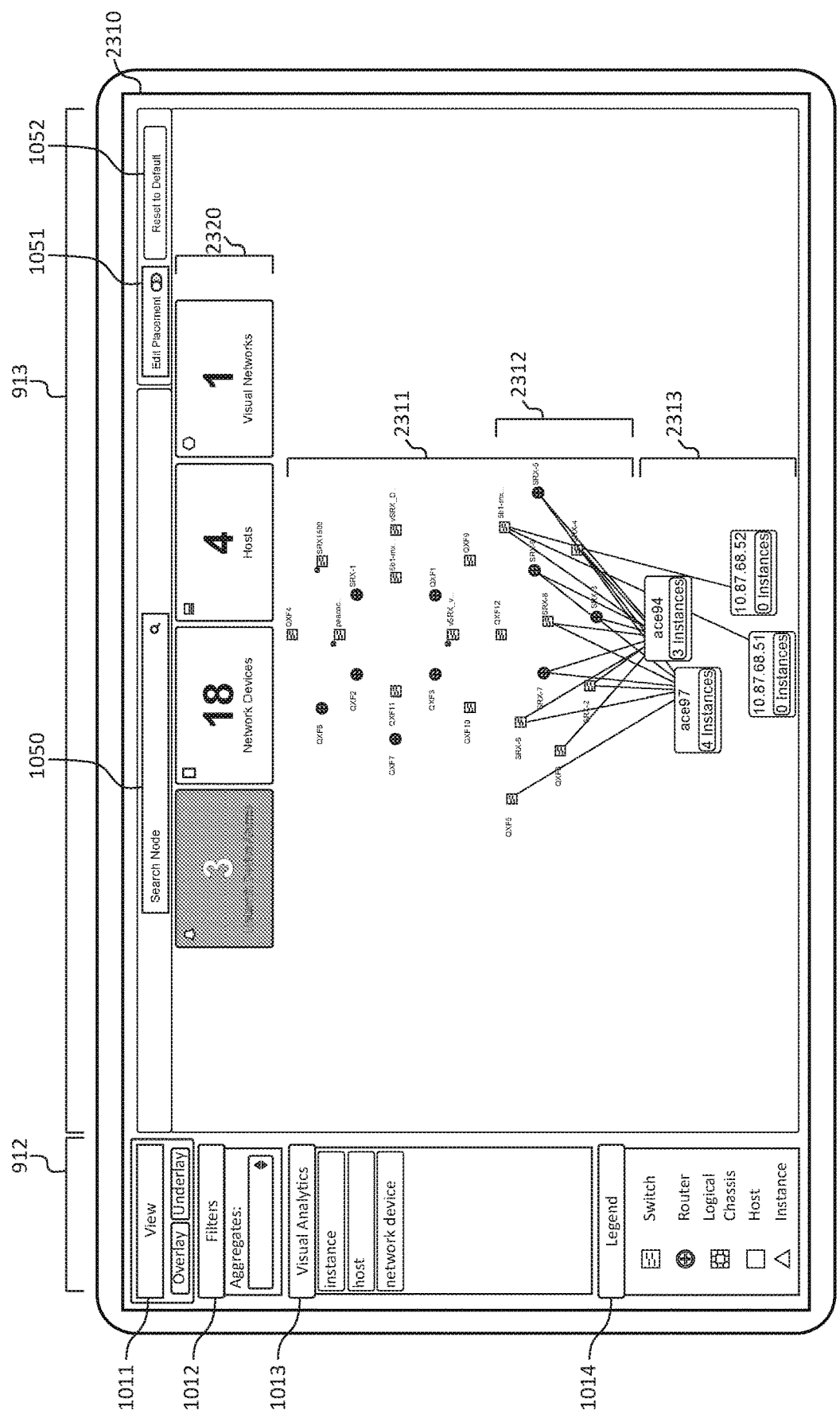
FIG. 23 illustrates another example user interface output by a computing device for dashboard of network in accordance with one or more aspects of the present disclosure.

FIG. 23 illustrates another example user interface 2310 output by a computing device for dashboard 203 of network 900 in accordance with one or more aspects of the present disclosure. User interface 2310 may include features similar to user interface 2210 of FIG. 22, including a set of graphic symbols generally indicated by bracket 2311, a subset of graphic symbols 2312 representing network devices that are directly coupled to at least one host device represented by graphic symbols generally indicated by bracket 2313 in FIG. 23. The graphic symbols included in the subset of graphic symbols indicated by bracket 2312 include an illustration of a larger number of direct connections to hosts compared to the number of direct connections to hosts illustrated in user interface 2210 of FIG. 22.

Figure 24:
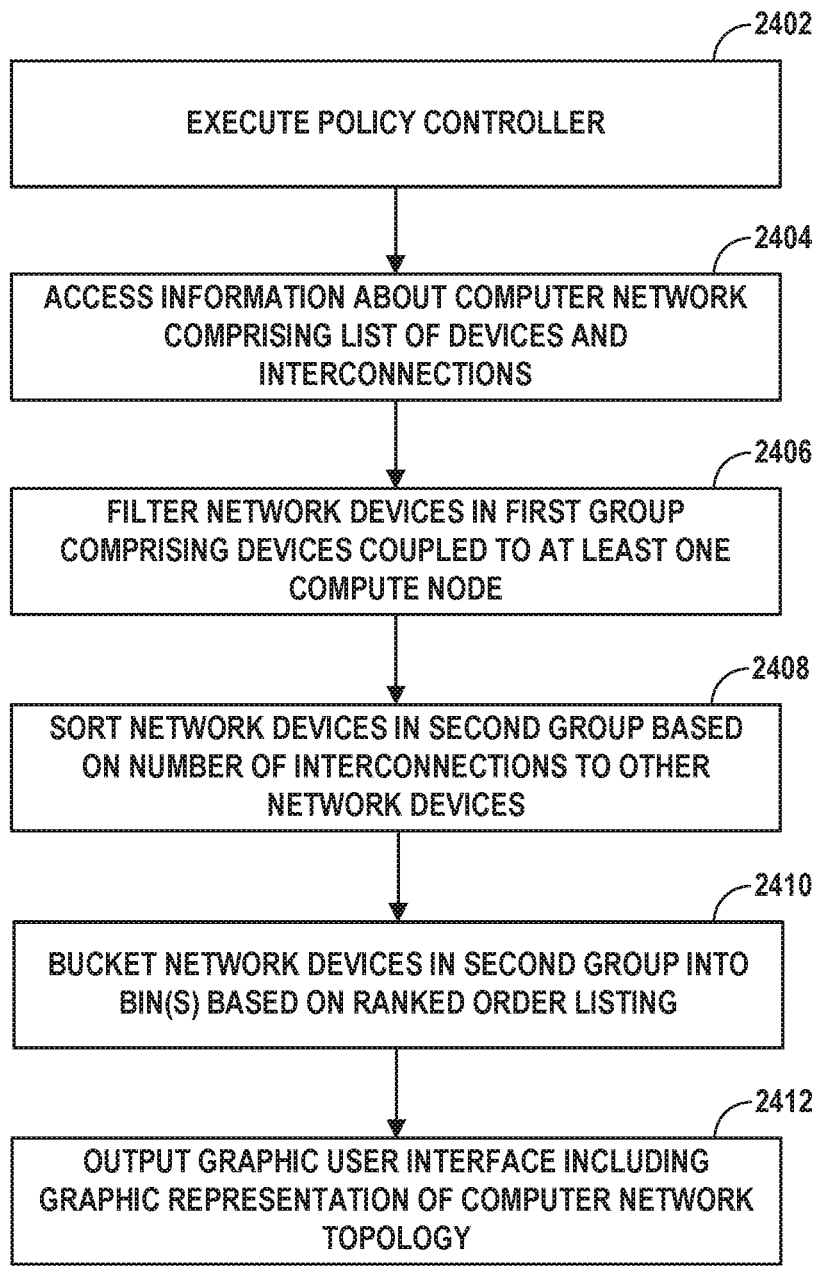
FIG. 24 is a flowchart illustrating example methods for generation and display of user interfaces including graphical depictions of computer network topologies in accordance with the techniques described throughout this disclosure.

FIG. 24 is a flowchart illustrating example methods for generation and display of user interfaces including graphical depictions of computer network topologies in accordance with the techniques described throughout this disclosure. As described, a policy controller (e.g., policy controller 201, FIG. 1) that is coupled to a computer network executes to generate a dashboard 203, and to output one or more user interfaces providing graphical depictions of computer network topologies associated with the computer network (block 2402).

The policy controller 201 accesses information abut the computer network to be modeled by the user interfaces, the information comprising a list of devices that may be included in the computer network, and the interconnections between these devices (block 2404). In some examples, the list of devices includes physical devices, such as switches and/or routers, which may be included in switch fabric (e.g., switch fabric 121, FIG. 1) communicatively coupling one or more hosts or compute nodes (e.g., servers 126A-126N, FIG. 1) to each other and/or to a gateway (e.g., gateway 108, FIG. 1). In some examples, the list of devices includes only physical devices (e.g., chassis switches 122A-122N, TOR switches 123A-123N, FIG. 1). In other examples, the list of devices includes both physical devices and virtual devices (e.g., virtual routers 142A-142N, FIG. 1).

Policy controller 201 filters the list of devices into a first group and a second group, the first group comprising devices that are directly (physically) coupled to at least one host of the computer network (block 2406). In some examples, the devices included in the first group may be directly coupled to two or more hosts of the computer network. The devices filtered into the second group include devices that are not directly coupled to a host of the computer network. Devices in the second group may be coupled to a host of the computer network through another device included in the computer network.

After filtering the list of devices into a first group and a second group, policy controller 201 sorts the devices in the second group into a ranked order listing based on the number of interconnections each of the devices in the second group has to other devices in the second group (block 2408). The ranked order listing in some examples sorts the list of devices in the second group in order from the devices having the largest number of interconnections to other devices in the second group to the devices having the smaller or least number of interconnections to other devices in the second group.

Policy controller 201 then buckets the devices in the second group into one or more bins based on the sorted order listing (block 2410). The number of devices placed in each bin may be determined based on a pre-defined number of positions available at each of a plurality of radial arrangements used to position graphic symbols representing the devices of the second group in a graphic user interface representing a computer network topology of the computer network. The radial arrangements may include radial arrangements formed using any of the techniques and patterns described throughout this disclosure, including but not limited to a series of radial arrangements arranged as concentric circles and having a pre-defined number of available positions for placement of graphic symbols around a respective perimeter of each radial arrangement. The graphic symbol placed on the available positions on a given radial arrangement may include graphic symbols representative of the devices grouped together in a same bin by the policy controller 201.

After bucketing the devices included in the second group into one or more bins, policy controller 201 outputs a dashboard comprising a user interface that includes a graphic representation of a computer network topology (block 2412). The policy controller may arrange the devices included in the one or more bins so that graphic symbols for the devices including in each bin are arranged around the perimeter of a radial arrangement having a predefined number of available positions for locating graphic symbols. The innermost radial arrangement may include the devices having the largest number of interconnections to other devices based on the sorted order list generated by policy controller 201. Graphic symbols representing devices from the first group of devices (i.e., devices having at least one direct interconnection to a host of the computer network) may be positioned at the bottom positions of the outermost radial arrangement(s) including in the user interface. The user interface includes graphic lines extending between the graphic symbols representing some or all of the interconnections between the devices of the computer network and/or at least some of the devices and the hosts of the computer network.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A method comprising:
sorting, by a controller comprising processing circuitry, a plurality of network devices into a first group comprising one or more of the plurality of network devices that are physically coupled to at least one of a plurality of compute nodes and a second group comprising one or more of the plurality of network devices that are not directly coupled to at least one of the plurality of compute nodes, wherein the plurality of compute nodes are interconnected by a packet-based communications network provided by the plurality of network devices;

assigning, by the controller, the network devices in the second group into a plurality of bins based on a number of physical network connections each network device in the second group has with one or more other network devices in the second group, wherein the number of network devices assigned to each of the plurality of bins is determined by a predetermined number of radial positions around a respective one of one or more radial arrangements; and outputting, by the controller, a graphic user interface that includes a graphic representation of a topology of a computer network including a plurality of graphic symbols representing the plurality of network devices and the plurality of compute nodes, wherein the graphic user interface includes a visual representation of the graphic symbols for the network devices in the second group arranged in the one or more radial arrangements.

2. The method of claim 1, wherein the one or more radial arrangements of graphic symbols includes one or more outer radial arrangements of graphic symbols for network devices of the first group that are directly coupled to at least one of the plurality of compute nodes.

3. The method of claim 2, wherein the graphic symbols for the network devices of the first group are positioned at one or more lower positions of the one or more outer radial arrangements.

4. The method of claim 1, wherein the one or more radial arrangements comprises a single radial arrangement in which the outer radial arrangement and the inner radial arrangement are a same radial arrangement.

5. The method of claim 1, wherein a first bin of the one or more bins comprises network devices of the plurality of network devices having a largest number of interconnections to other network devices of the plurality of network devices based on the ranked order listing.

6. The method of claim 5, wherein the one or more radial arrangements comprises at least one innermost radial arrangement comprising a predetermined number of positions arranged around a perimeter of a circle, each of the predetermined number of positions configured to allow positioning of one of the graphic symbols representing a network device from the first bin around the perimeter of the circle.

7. The method of claim 6,
wherein the innermost radial arrangement encircles an interior space of the circle, and
wherein a set of graphic lines representing the physical interconnections between the network devices represented by the graphic symbols positioned around the perimeter of the circle extend across the interior space.

8. The method of claim 6, wherein each of the predetermined number of positions are separated from each other around the perimeter of the circle by a predetermined angular value.

9. The method of claim 1, wherein at least one of the network devices in the second group visually represented in the graphic user interface comprises at least one of a chassis switch or a top-of-rack (TOR) switch.

10. The method of claim 1, wherein at least one of the network devices in the second group visually represented in the graphic user interface comprises a router.

11. A controller executed by processing circuitry and configured to:

sort a plurality of network devices into a first group comprising one or more of the plurality of network devices that are physically coupled to at least one of a plurality of compute nodes and a second group comprising one or more of the plurality of network devices that are not directly coupled to at least one of the plurality of compute nodes, wherein the plurality of compute nodes are interconnected by a packet-based communications network provided by the plurality of network devices;

assign the network devices in the second group into a plurality of bins based on a number of physical network connections each network device in the second group has with one or more other network devices in the second group, wherein the number of network devices assigned to each of the plurality of bins is determined by a predetermined number of radial positions around a respective one of one or more radial arrangements; and output a graphic user interface that includes a graphic representation of a topology of a computer network including a plurality of graphic symbols representing the plurality of network devices and the plurality of compute nodes, wherein the graphic user interface includes a visual representation of the graphic symbols for the network devices in the second group arranged in the one or more radial arrangements.

12. The controller of claim 11, wherein the one or more radial arrangements of graphic symbols includes one or more outer radial arrangements of graphic symbols for network devices of the first group that are directly coupled to at least one of the plurality of compute nodes.

13. The controller of claim 12, wherein the graphic symbols for the network devices of the first group are positioned at one or more lower positions of the one or more outer radial arrangements.

14. The controller of claim 11, wherein a first bin of the one or more bins comprises network devices of the plurality of network devices having a largest number of interconnections to other network devices of the plurality of network devices based on the ranked order listing.

15. The controller of claim 14, wherein the one or more radial arrangements comprises at least one innermost radial arrangement comprising a predetermined number of positions arranged around a perimeter of a circle, each of the predetermined number of positions configured to allow positioning of one of the graphic symbols representing a network device from the first bin around the perimeter of the circle.

16. The controller of claim 15,
wherein the innermost radial arrangement encircles an interior space of the circle, and
wherein a set of graphic lines representing the physical interconnections between the network devices represented by the graphic symbols positioned around the perimeter of the circle extend across the interior space.

17. The controller of claim 16, wherein each of the predetermined number of positions are separated from each other around the perimeter of the circle by a predetermined angular value.

18. The controller of claim 11, wherein at least one of the network devices in the second group visually represented in the graphic user interface comprises at least one of a chassis switch or a top-of-rack (TOR) switch.

19. The controller of claim 11, wherein at least one of the network devices in the second group visually represented in the graphic user interface comprises a router.

20. A non-transitory, computer-readable medium comprising instructions that, when executed, are configured to cause processing circuitry of a controller to:
  sort a plurality of network devices into a first group comprising one or more of the plurality of network devices that are physically coupled to at least one of a plurality of compute nodes and a second group comprising one or more of the plurality of network devices that are not directly coupled to at least one of the plurality of compute nodes, wherein the plurality of compute nodes are interconnected by a packet-based communications network provided by the plurality of network devices;
  assign the network devices in the second group into a plurality of bins based on a number of physical network connections each network device in the second group has with one or more other network devices in the second group, wherein the number of network devices assigned to each of the plurality of bins is determined by a predetermined number of radial positions around a respective one of one or more radial arrangements; and
  output a graphic user interface that includes a graphic representation of a topology of a computer network including a plurality of graphic symbols representing the plurality of network devices and the plurality of compute nodes,
  wherein the graphic user interface includes a visual representation of the graphic symbols for the network devices in the second group arranged in the one or more radial arrangements.

\* \* \* \* \*